United States Patent
Kurabuchi

(10) Patent No.: US 12,198,242 B2
(45) Date of Patent: Jan. 14, 2025

(54) MOVING IMAGE DISTRIBUTION SYSTEM, MOVING IMAGE DISTRIBUTION METHOD, AND MOVING IMAGE DISTRIBUTION PROGRAM

(71) Applicant: GREE, Inc., Tokyo (JP)

(72) Inventor: Aya Kurabuchi, Minato-ku (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/005,977

(22) Filed: Aug. 28, 2020

(65) Prior Publication Data
US 2021/0065421 A1    Mar. 4, 2021

(30) Foreign Application Priority Data

Aug. 28, 2019 (JP) ................ 2019-155593
Aug. 29, 2019 (JP) ................ 2019-157401
Aug. 29, 2019 (JP) ................ 2019-157445

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/248* (2017.01); *G06V 40/103* (2022.01); *G06V 40/23* (2022.01);
(Continued)

(58) Field of Classification Search
CPC .. G06Q 50/01; G06Q 30/0269; G06Q 20/384; H04L 51/32; H04L 67/306;
(Continued)

(56) References Cited

U.S. PATENT DOCUMENTS 7,660,851 B2 * 2/2010 Manion ................ G06Q 10/10
709/204
2005/0071481 A1    3/2005 Danieli
(Continued)

FOREIGN PATENT DOCUMENTS

JP    2007-241929    9/2007
JP    2012-120098 A    6/2012
(Continued)

OTHER PUBLICATIONS

"What is TwitCasting? What kind of service is it? Explanation of Basics/Characteristics", Online, Nov. 24, 2018, retrieved: Jan. 21, 2019, URL: https://appli-world.jp/posts/1497 (24 pages).
(Continued)

*Primary Examiner* — Xiao M Wu
*Assistant Examiner* — Scott E Sonners
(74) *Attorney, Agent, or Firm* — Finnegan, Henderson, Farabow Garrett & Dunner LLP

(57) ABSTRACT

A moving image distribution system includes a computer processor, and may distribute a moving image including an animation of a character object that is generated based on a motion of a first user, transmit an invitation associated with host user information relevant to the first user to a second user that may be one of a plurality of viewing users viewing the moving image, generate a co-starring moving image in which the first user and the second user perform co-starring in accordance with reception of a co-starring request transmitted from the second user who has received the invitation, and distribute the co-starring moving image to one or a plurality of viewing users, by executing a computer-readable command.

25 Claims, 45 Drawing Sheets

(51) Int. Cl.
*G06V 40/10* (2022.01)
*G06V 40/20* (2022.01)
*H04N 21/2743* (2011.01)
*H04N 21/475* (2011.01)

(52) U.S. Cl.
CPC ..... *H04N 21/2743* (2013.01); *H04N 21/4756* (2013.01)

(58) Field of Classification Search
CPC ..... H04L 65/60; G06F 3/048; H04N 21/4788; H04N 21/4532; H04N 21/812; H04N 21/25891; H04N 21/2187; G06T 19/006; G06T 2207/10016; G06T 2200/24; G06T 19/20; G06T 13/40; G06T 7/20; G06T 7/73; G06T 7/70; G06T 2207/30201; G06T 2207/30196; G06T 2219/024; G06T 19/00; G06T 13/00; A63F 13/35; A63F 13/87; A63F 13/795; A63F 13/79; A63F 13/537; G06V 40/23; G06V 40/103
See application file for complete search history.

(56) References Cited

U.S. PATENT DOCUMENTS

| | | | |
|---|---|---|---|
| 2008/0182660 | A1 | 7/2008 | Fulton et al. |
| 2009/0325711 | A1 | 12/2009 | Bronstein et al. |
| 2011/0298827 | A1 | 12/2011 | Perez |
| 2012/0174157 | A1* | 7/2012 | Stinson, III .......... H04N 21/482 725/40 |
| 2013/0074002 | A1 | 3/2013 | Markovic et al. |
| 2013/0335509 | A1 | 12/2013 | Cafferata |
| 2013/0343726 | A1 | 12/2013 | Shackleton et al. |
| 2014/0118474 | A1* | 5/2014 | Fluhr ................. H04L 12/1822 348/14.09 |
| 2016/0286244 | A1 | 9/2016 | Chang et al. |
| 2016/0381427 | A1 | 12/2016 | Taylor et al. |
| 2017/0064014 | A1 | 3/2017 | Nomura |
| 2018/0041551 | A1 | 2/2018 | Ormseth |
| 2019/0066730 | A1 | 2/2019 | Singh et al. |
| 2019/0349625 | A1 | 11/2019 | Watanabe et al. |
| 2020/0023280 | A1 | 1/2020 | Onda et al. |
| 2021/0065421 | A1 | 3/2021 | Kurabuchi |
| 2021/0204014 | A1* | 7/2021 | Kawakami ......... H04N 21/2743 |
| 2021/0248803 | A1* | 8/2021 | Kojima ................. G06F 3/0304 |
| 2021/0321061 | A1* | 10/2021 | Kawakami ......... H04L 12/1813 |
| 2022/0305383 | A1* | 9/2022 | Fuse ..................... G06F 3/0482 |

FOREIGN PATENT DOCUMENTS

| | | | |
|---|---|---|---|
| JP | 2015-184689 | A | 10/2015 |
| JP | 2016-1857 | | 1/2016 |
| JP | 2017045425 | | 3/2017 |
| JP | 2018-171283 | | 11/2018 |
| JP | 6543403 | B1 | 7/2019 |
| JP | 6550522 | B1 | 7/2019 |
| JP | 2015-531107 | | 10/2019 |
| JP | 6420930 | | 11/2019 |
| JP | 2019-157445 | | 3/2021 |

OTHER PUBLICATIONS

"How to block and unblock in TwitCasting! What happens to NG users", Online, May 22, 2017, accessed: Jan. 21, 2019, URL: https://sns-初心者..com/twitcasting-block-4529 (22 pages).
"Complete Guide! "VirtualCast," Where anyone can become a VTuber", Online, Apr. 21, 2018, accessed: Jan. 21, 2019, URL: https://www.moguravr.com/virtualcast-2/ (22 pages).
PCT International Search Report, corresponding with PCT Application No. PCT/JP2019/043639, mailed Dec. 17, 2019. (5 pages).
PCT Written Opinion, corresponding with PCT Application No. PCT/JP2019/043639, mailed Dec. 17, 2019. (15 pages).
Yusuke Hasegawa, Virtual Idol New Age Opening PROJECT MariA, CG World, Japan, Born Digital, Inc., Nov. 10, 2017, vol. 231, pp. 74-79.
Dwango Co., Ltd., "about Burst in [Virtual Cast]", [online], [Searched on Jul. 1, 2019], Internet <URL:https://qa.nicovideo.jp/faq/show/10740?category_id=718&site_domain=default>.
Notice of Reasons for Refusal, issued by Japan Patent Office for Japanese Application No. JP 2019-155593, mailed Oct. 20, 2020. (8 pages).
Notice of Reasons for Refusal, issued by Japan Patent Office for Japanese Application No. JP 2019-157401, mailed Nov. 4, 2020. (3 pages).
Notice of Reasons for Refusal, issued by Japan Patent Office for Japanese Application No. JP 2019-157445, mailed Oct. 20, 2020. (5 pages).
Shoji, Instagram, guest invitation to live video can be delivered together, AV Watch, Impress corporation, Oct. 25, 2017, URL: https://av.watch.impress.co.jp/docs/news/1087944.html (10 pages).
Non-Final Office Action, U.S. Appl. No. 17/414,254 dated Nov. 28, 2022 issued in the United States Patent and Trademark Office.
U.S. Non-Final Office Action, corresponding with U.S. Appl. No. 17/414,254, mailed Mar. 17, 2022 (23 pages).
Notice of Reason for Refusal issued by Japanese Patent Office in corresponding with the Japanese Application No. 2021-007165, mailed Jun. 20, 2023. (4 pages).
Notice of Reason for Refusal issued by Japanese Patent Office in corresponding with the Japanese Application No. 2021-014695, mailed Jul. 18, 2023. (4 pages).
U.S. Non-Final Office Action, corresponding with U.S. Appl. No. 17/414,254, mailed May 18, 2023 (24 pages).
U.S. Non-Final Office Action, corresponding with U.S. Appl. No. 17/453,642, mailed Jun. 1, 2023 (62 pages).
Final Office Action issued by the USPTO, in corresponding with U.S. Appl. No. 17/414,254 mailed Jul. 15, 2022 (18 pages).
Notice of Reason for Refusal, issued by Japanese Patent Office in Japanese Application No. 2022-042105, mailed Apr. 25, 2023 (4 pages with 5 pages translation).
Notice of Reason for Refusal, issued by Japanese Patent Office in Japanese Application No. 2022-136413, mailed Aug. 29, 2023 (4 pages with 5 pages translation).
Final Office Action issued by the USPTO, in corresponding with U.S. Appl. No. 17/453,642 mailed Jan. 17, 2024 (14 pages).
Notice of Reason for Refusal, issued by Japanese Patent Office in Japanese Application No. 2022-136413, mailed Jan. 9, 2024 (4 pages with 6 pages translation).
Non-Final Office Action issued by the USPTO, in corresponding with U.S. Appl. No. 17/414,254 mailed Dec. 15, 2023 (43 pages).
Non-Final Office Action issued by the USPTO, in corresponding with U.S. Appl. No. 17/453,642 mailed Jul. 17, 2024 (11 pages).
Non-Final Office Action issued by the USPTO, in corresponding with U.S. Appl. No. 17/414,254 mailed Jul. 5, 2024 (37 pages).
Notice of Reason for Refusal, issued by Japanese Patent Office in Application No. 2023-176427, mailed Oct. 22, 2024 (2 pages with 4 pages translation).

\* cited by examiner

USER INFORMATION

| ACCOUNT INFORMATION | USER EVALUATION INFORMATION | MOVING IMAGE EVALUATION INFORMATION | VIEWERSHIP INFORMATION | BENEFIT INFORMATION |
|---|---|---|---|---|
| USER ID | USER EVALUATION POINT | MOVING IMAGE EVALUATION POINT | NUMBER OF VIEWERS | POINT, OBJECT, AND THE LIKE |

FIG. 3

CO-STARRING MOVING IMAGE INFORMATION

| CO-STARRING MOVING IMAGE IDENTIFICATION INFORMATION | HOST USER EVALUATION INFORMATION | GUEST USER EVALUATION INFORMATION | CO-STARRING TIME INFORMATION |
|---|---|---|---|
| CO-STARRING MOVING IMAGE ID | EVALUATION POINT OF HOST USER | EVALUATION POINT OF GUEST USER | ELAPSED TIME |

FIG. 4

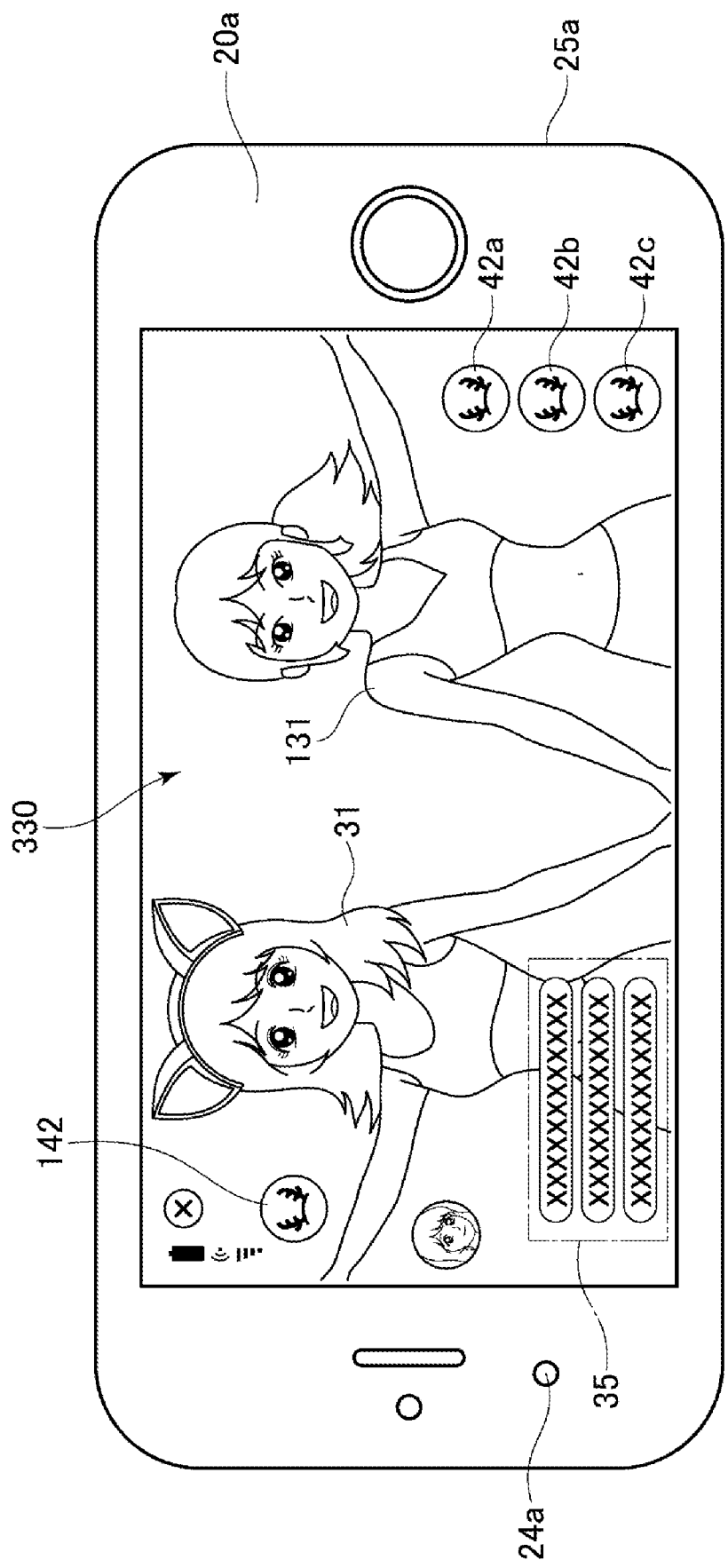

FIG. 16

USER INFORMATION

| ACCOUNT INFORMATION | USER EVALUATION INFORMATION | VIEWERSHIP INFORMATION | VIEWING USER INFORMATION | MOVING IMAGE EVALUATION INFORMATION | CO-STARRING FREQUENCY INFORMATION | ATTRIBUTE INFORMATION | SOCIAL INFORMATION |
|---|---|---|---|---|---|---|---|
| USER ID | USER EVALUATION POINT | MOVING IMAGE EVALUATION POINT | NUMBER OF VIEWERS | USER ID OF VIEWING USER AND NUMBER OF VIEWERS | NUMBER OF CO-STARRINGS | NICKNAME, GENDER, AGE, RESIDENCE, AND OTHERS | FRIEND INFORMATION AND OTHERS |

FIG. 17

CO-STARRING MOVING IMAGE INFORMATION

| CO-STARRING MOVING IMAGE IDENTIFICATION INFORMATION | CO-STARRING TIME INFORMATION |
|---|---|
| CO-STARRING MOVING IMAGE ID | ELASPED TIME |

| OBJECT MANAGEMENT INFORMATION | |
|---|---|
| OBJECT IDENTIFICATION INFORMATION | OBJECT INFORMATION |
| OBJECT ID | IMAGE, TYPE, ATTACHMENT PART, PRICE, AND OTHERS |

FIG. 29

| SELF-RETAINED OBJECT INFORMATION | |
|---|---|
| ACCOUNT INFORMATION | SELF-RETAINED OBJECT |
| USER ID | OBJECT ID |

FIG. 30

| OBJECT DISPLAY INFORMATION | |
|---|---|
| ACCOUNT INFORMATION | DISPLAYED OBJECT |
| USER ID | OBJECT ID |

FIG. 31

MOVING IMAGE DISTRIBUTION SYSTEM, MOVING IMAGE DISTRIBUTION METHOD, AND MOVING IMAGE DISTRIBUTION PROGRAM

CROSS REFERENCE TO RELATED APPLICATIONS

This application claims priority to Japanese Patent Application No. 2019-155593 filed Aug. 28, 2019, Japanese Patent Application No. 2019-157401 filed Aug. 29, 2019, and Japanese Patent Application No. 2019-157445 filed Aug. 29, 2019, the contents of which are incorporated herein by reference in their entireties.

BACKGROUND

Technical Field

The present invention disclosed in this specification relates to a moving image (e.g., video) distribution system, a moving image distribution method, and a moving image distribution program. Some embodiments may relate to a moving image distribution system, a moving image distribution method, and a moving image distribution program in which a moving image including a character that is generated based on the motion of a user is distributed in real time.

Related Art

Various moving image distribution services have been known from the related art. Recently, a moving image distribution system that generates an animation of a character object (e.g., an avatar) on the basis of the motion of a distribution user, and distributes a moving image including such an animation of the character object in real time has attracted attention. Such a moving image distribution system, for example, is disclosed in JP 2015-184689 A and "Yusuke HASEGAWA, Virtual Idol New Age Opening PROJECT MariA, CG WORLD, Japan, Born Digital, Inc., Nov. 10, 2017, Volume 231, pp. 74-79".

"Virtual Cast" provided by DWANGO Co., Ltd. has been known as the moving image distribution service that distributes the moving image including the character object generated on the basis of the motion of the distribution user [DWANGO Co., Ltd., "about Burst in [Virtual Cast]", [online], (Searched on Jul. 1, 2019], Internet <URL:https://qa.nicovideo.jp/faq/show/10740?category_id=718&site_domain=default>). In the virtual cast, a character object of the other user participates in a moving image that is distributed by a certain distribution user, and the two distribution users are capable of virtually performing co-starring in the moving image through each character object.

A moving image distribution system that displays a gift object corresponding to a gift purchased by a viewing user viewing a moving image on a display screen in accordance with a request from the viewing user has also been known. For example, in a moving image distribution system disclosed in JP 2012-120098 A, a viewing user is capable of purchasing a gift item and of providing the purchased gift item to a distribution user as a gift. The gift is displayed on a moving image that is being distributed in accordance with a display request from the viewing user. The display request of the gift may be automatically generated in accordance with the purchase of the gift by the viewing user. In the specification of JP 6543403 B1, it is described that a gifted object is displayed in association with a character that is moved based on the motion of a distribution user.

In a case where a character of a host user and a character of a guest user perform co-starring in a co-starring moving image, the appearance of the character of the host user is determined by the setting of the host user, and the appearance of the character of the guest user is determined by the setting of the guest user. That is, an image of the character included in the co-starring moving image is uniquely determined by each co-star. For this reason, it is difficult to express unity in the co-starring moving image of the related art.

An object of some embodiments of the present disclosure may be to provide technical improvements for addressing (e.g., solving or relaxing) at least a part of the problem or issues of the related art described above. One of more specific objects of the present disclosure may be to provide a moving image distribution system, a moving image distribution method, and a moving image distribution program in which a co-starring moving image with improved unity can be distributed.

Furthermore, in the moving image distribution system of the related art in which the users are capable of virtually performing the co-starring, the user viewing the moving image transmits a co-starring application for applying the co-starring to the distribution user distributing the moving image, and a user to be a co-starring partner is selected based on the co-starring application. That is, in a case where the co-starring application for performing the co-starring with a host user from viewing users viewing a moving image that is distributed by the host user is performed, a guest user performing co-starring with the host user is selected from the viewing users performing the co-starring application. As described above, in the moving image distribution system of the related art, processing for performing the co-starring is started in a case where the co-starring application is performed from the viewing user. This is a passive mechanism for the host user to enable the co-starring to be performed only when the co-starring application is performed from the viewing user.

In order to accelerate the user of a co-starring function in the moving image distribution system, it would be desirable to provide a moving image distribution system in which the co-starring with the other user can be actively started from the host user. In order to start the processing for performing the co-starring from the host user, it is necessary to specify the co-starring partner. In order to retain the quality of the moving image of the host user, it is necessary to suitably select the co-starring partner. However, a method for the distribution user to suitably search the co-starring partner from a plurality of users using the moving image distribution system has not been known.

As described above, in the moving image distribution system of the related art in which virtual co-starring of the users can be performed, it is difficult for the distribution user who is the host user to perform the co-starring with a suitable co-starring partner.

An object of some embodiments of the present disclosure may be to provide technical improvement for addressing at least a part of the issues of the related art described above. One of more specific objects may be to provide a moving image distribution system, a moving image distribution method, and a moving image distribution program in which a suitable co-starring partner of a host user can be easily selected. Other objects of the present disclosure will be apparent with reference to the entire specification.

Furthermore, a process for attaining co-starring may face issues, such as those exemplified below. A first issue may be that the user viewing the moving image wants to perform the co-starring with a popular distribution user, and thus, the co-starring application is concentrated on some popular distribution users. The moving image is usually distributed in real time, and thus, the co-starring application tends to be concentrated in a short time. Therefore, a processing load for processing the co-starring application that is performed by being concentrated in a short time increases. In a case where the user viewing the moving image is capable of performing the co-starring application without any conditions, the problem of the processing load for processing the co-starring application becomes remarkable.

A second issue may be that there are few or no viewing users performing the co-starring application with respect to a less popular distribution user, and thus, it is difficult to utilize a co-starring function.

A third issue may be that it is a major concern for the distribution user what kind of distribution user is to be a co-starring partner in order to retain the quality of a distribution moving image, but in a case where the co-starring is virtually performed through the character object, it is necessary to perform the co-starring application nearly without any knowledge about the distribution user to be the co-starring partner, unless the co-starring is demanded with a famous distribution user of the moving image. Then, the user may hesitate to perform the co-starring application with respect to the distribution user, because the user does not know well about the distribution user. In this way, in the co-starring application process of the related art, the disclosure of information relevant to the distribution user is insufficient, and thus, the co-starring application is likely to be performed with respect to a well-known popular distribution user, and as a result thereof, the co-starring application tends to be further concentrated on the popular distribution user.

As described above, the co-starring function in the moving image distribution system is not sufficiently utilized. In addition to the above, the co-starring function of the moving image distribution system of the related art has unsolved problems. Some of the problems will be apparent with reference to this specification.

An object of some embodiments of the present disclosure may be to provide technical improvement for addressing at least a part of the issues of the related art, such as those described above. One of more specific objects of the present disclosure may be to provide a moving image distribution system, a moving image distribution method, and a moving image distribution program in which the utilization of a co-starring function can be accelerated. One of more specific objects of the present disclosure is to provide a moving image distribution system, a moving image distribution method, and a moving image distribution program in which a processing load or a traffic for providing a co-starring function can be reduced.

SUMMARY

One aspect of the present disclosure relates to a moving image distribution system including one or a plurality of computer processors. In the moving image distribution system of one embodiment, the one or the plurality of computer processors distribute a moving image including an animation of a character object that is generated based on a motion of a first user, transmit an invitation associated with host user information relevant to the first user to a second user of a plurality of viewing users viewing the moving image, generate a co-starring moving image in which the first user and the second user perform co-starring in accordance with reception of a co-starring application for applying the co-starring with the first user from the second user who has received the invitation, and distribute the co-starring moving image to one or a plurality of viewing users, by executing a computer-readable command.

In one aspect of the present disclosure, the co-starring application is received only from one or a plurality of invited users who has received the invitation in the plurality of viewing users. The second user is included in the one or the plurality of invited users.

In one aspect of the present disclosure, the host user information is presented to the second user.

In one aspect of the present disclosure, the host user information includes user evaluation information indicating evaluation with respect to the first user. In one aspect of the present disclosure, the host user information includes viewership information indicating the number of viewing users of the moving image. In one aspect of the present disclosure, the host user information includes host user evaluation information indicating evaluation with respect to the first user in the co-starring moving image. In one aspect of the present disclosure, the host user information includes moving image evaluation information indicating evaluation with respect to the moving image.

In one aspect of the present disclosure, the invitation includes first benefit information indicating a first benefit that is offered to the second user in a case where the second user performs the co-starring application. In one aspect of the present disclosure, the invitation includes second benefit information indicating a second benefit that is offered to the second user in the case of generating the co-starring moving image in which the second user and the first user perform the co-starring.

In one aspect of the present disclosure, at least one of the first benefit and the second benefit is changed in accordance with evaluation with respect to the co-starring moving image. In one aspect of the present disclosure, at least one of the first benefit and the second benefit is changed in accordance with evaluation of the second user during distribution of the co-starring moving image.

In one aspect of the present disclosure, at least one of the first benefit and the second benefit is an object capable of being used in the co-starring moving image by the second user.

In one aspect of the present disclosure, the co-starring moving image is a character co-starring moving image including a first character object that is generated based on the motion of the first user and a second character object that is generated based on a motion of the second user.

In one aspect of the present disclosure, the co-starring moving image is a sound co-starring moving image including the first character object that is generated based on the motion of the first user and a sound of the second user.

In one aspect of the present disclosure, the co-starring moving image is the character co-starring moving image including the first character object that is generated based on the motion of the first user and the second character object that is generated based on the motion of the second user or the sound co-starring moving image including the first character object that is generated based on the motion of the first user and the sound of the second user, and the character co-starring moving image and the sound co-starring moving image are capable of being alternately switched.

In one aspect of the present disclosure, one or a plurality of computer processors distribute a moving image including an animation of a character object that is generated based on a motion of a first user, transmit an invitation to one or a plurality of viewing users viewing the moving image, receive a co-starring application only from one or a plurality of invited users who have received the invitation in the plurality of viewing users, generate a co-starring moving image in which the first user and a second user included in the one or the plurality of invited users perform co-starring in accordance with reception of the co-starring application, and distribute the co-starring moving image to the one or the plurality of viewing users, by executing a computer-readable command.

One aspect of the present disclosure relates to a moving image distribution method to be executed by allowing one or a plurality of computer processors to execute a computer-readable command. In one embodiment, the moving image distribution method includes: a step of distributing a moving image including an animation of a character object that is generated based on a motion of a first user; a step of transmitting an invitation associated with host user information relevant to the first user to a second user of a plurality of viewing users viewing the moving image; a step of generating a co-starring moving image in which the first user and the second user perform co-starring in accordance with reception of a co-starring application for applying the co-starring with the first user from the second user who has received the invitation; and a step of distributing the co-starring moving image to one or a plurality of viewing users.

A moving image distribution program according to one aspect of the present disclosure allows one or a plurality of computer processors to execute: a step of distributing a moving image including an animation of a character object that is generated based on a motion of a first user; a step of transmitting an invitation associated with host user information relevant to the first user to a second user of a plurality of viewing users viewing the moving image; a step of generating a co-starring moving image in which the first user and the second user perform co-starring in accordance with reception of a co-starring application for applying the co-starring with the first user from the second user who has received the invitation; and a step of distributing the co-starring moving image to one or a plurality of viewing users.

According to an embodiment of the present disclosure, it is possible to provide a moving image distribution system, a moving image distribution method, and a moving image distribution program in which the utilization of a co-starring function can be accelerated.

BRIEF DESCRIPTION OF DRAWINGS

FIG. 3 is a diagram illustrating user information that is stored in the moving image distribution system of FIG. 1;

FIG. 4 is a diagram illustrating co-starring moving image information that is stored in the moving image distribution system of FIG. 1;

FIG. 10A is a diagram illustrating a display screen of a co-starring moving image that is displayed on the distribution user device in one embodiment;

FIG. 16 is a diagram illustrating user information that is stored in the moving image distribution system of FIG. 15;

FIG. 17 is a diagram illustrating co-starring moving image information that is stored in the moving image distribution system of FIG. 14;

FIG. 29 is a diagram illustrating gift object information that is stored in the moving image distribution system of FIG. 27;

FIG. 30 is a diagram illustrating self-retained object information that is stored in the moving image distribution system of FIG. 27;

FIG. 31 is a diagram illustrating object display information that is stored in the moving image distribution system of FIG. 27;

FIG. 34 illustrates a normal object that is displayed in an image;

FIG. 35 illustrates an attachment object that is displayed in an image;

DETAILED DESCRIPTION

Figure 1:
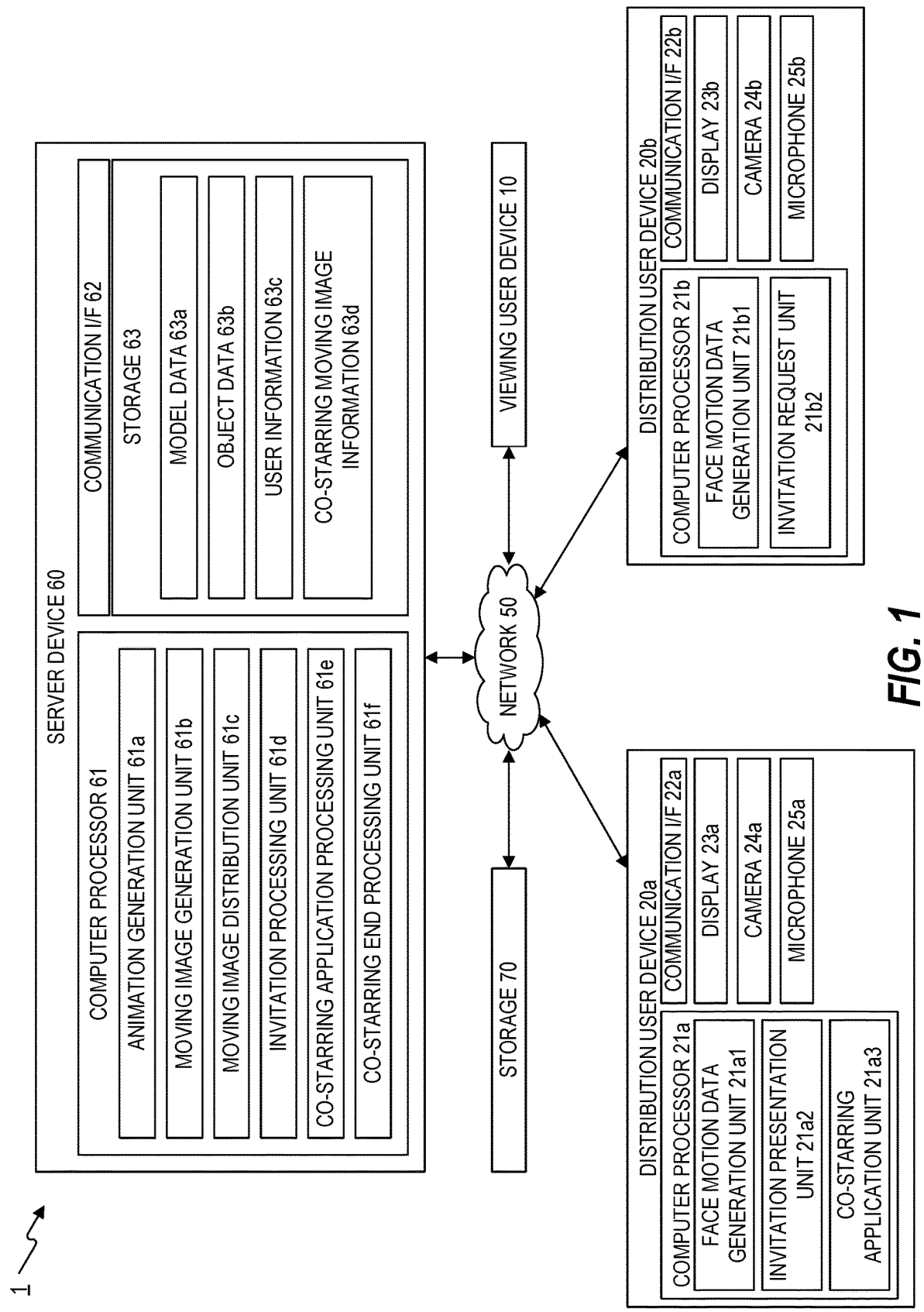
FIG. 1 is a block diagram illustrating a moving image distribution system according to one embodiment.

Hereinafter, various embodiments of the present disclosure will be described with suitable reference to the drawings. In a plurality of drawings, the same reference numerals are applied to the same or similar constituents. As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

Figure 2:
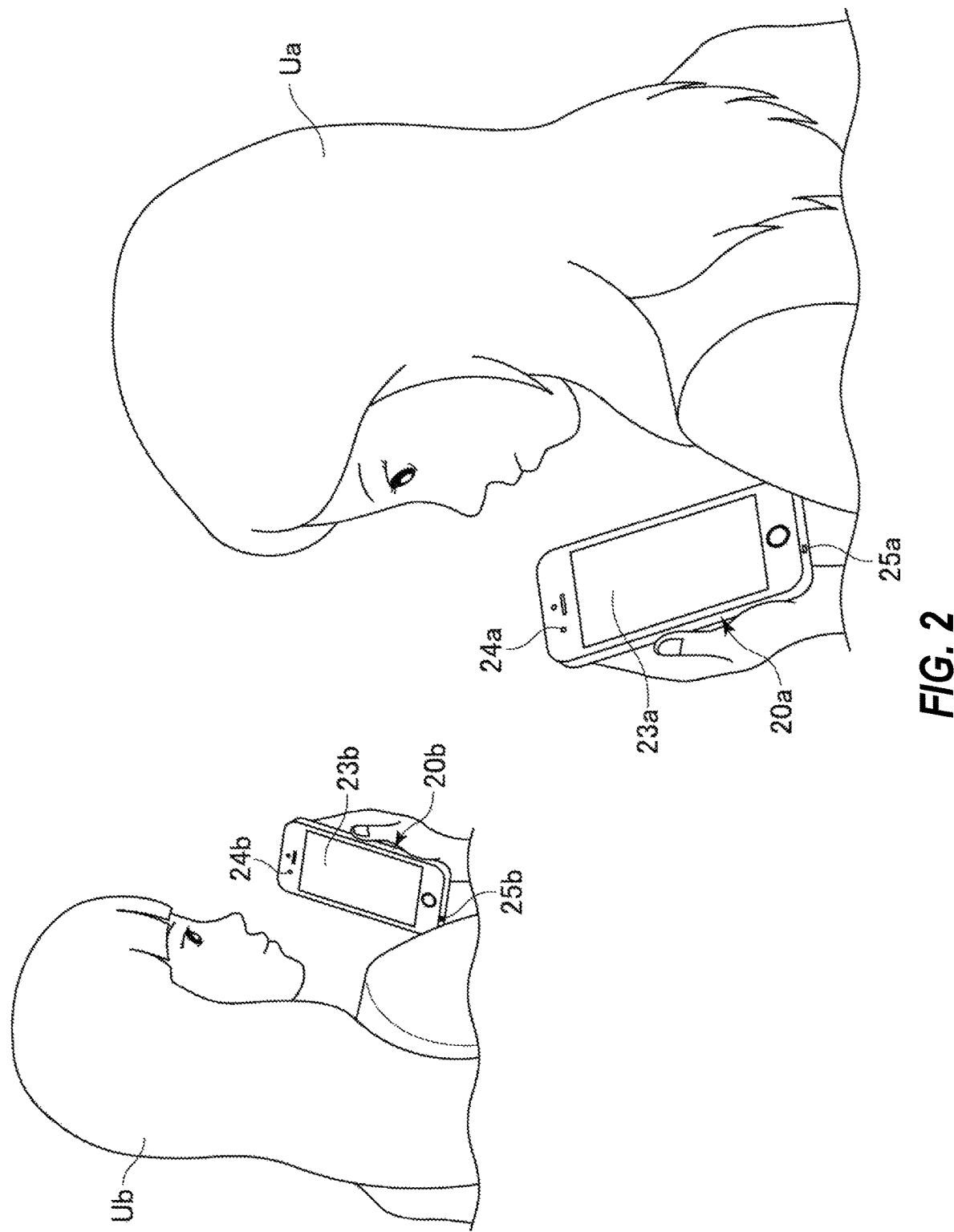
FIG. 2 is a schematic view schematically illustrating a distribution user distributing a moving image that is distributed by the moving image distribution system of FIG. 1 and a distribution user device that is used by the distribution user.

A moving image distribution system according to one embodiment will be described with reference to FIG. 1 and FIG. 2. FIG. 1 is a block diagram illustrating a moving image distribution system 1 according to one embodiment, and FIG. 2 is a schematic view schematically illustrating users Ua and Ub distributing a moving image by the moving image distribution system 1 and distribution user devices 20a and 20b that are used by the users Ua and Ub. The distribution user device 20a has a functions for distributing a moving image including a character object that is generated based on the motion of the user Ua in the moving image distribution system 1, and the distribution user device 20b has a function for distributing a moving image including a character object that is generated based on the motion of the user Ub in the moving image distribution system 1. Specifically, as described below, the moving image distribution system 1 is capable of generating the moving image including the character objects of two or more distribution users and of distributing the moving image. In other words, in the moving image distribution system 1, two or more distribution users are capable of virtually performing co-starring in the moving image through each of the character objects. As described above, in a case where two or more distribution users virtually perform the co-starring in the moving image through each of the character objects, the moving image is referred to as a co-starring moving image.

Both of the user Ua and the user Ub may be the distribution user distributing the moving image including the character object that is generated based on motion, and may be a viewing user viewing a moving image of the other distribution user. For this reason, the distribution user devices 20a and 20b may have a function of viewing the moving image to be distributed in the moving image distribution system 1. There may be a plurality of viewing users viewing the moving image, including the user Ua, the user Ub, and users using viewing user device 10.

The user Ua and the user Ub are each capable of transmitting, to a viewing user, an invitation for inviting the user to one's own moving image. For example, when the moving image of the character object that is generated based on the motion of the user Ub is distributed, an invitation for inviting to the moving image of the user Ub can be transmitted to the user Ua from the user Ub. The user Ua is capable of transmitting a request to perform co-starring (e.g., a co-starring request), which may be in response to receiving the invitation. For example, the user Ua is capable of performing a co-starring application for applying the co-starring with the user Ub based on the invitation. In a case where the co-starring application is allowed, the co-starring moving image including the character object of the user Ub and the character object of the user Ua is generated, and the co-starring moving image is distributed. An invitation for the co-starring in the moving image can be transmitted to another arbitrary viewing user from the distribution user. In a case where the user Ua participates in the moving image that is distributed by the user Ub in accordance with the invitation from the user Ub, and the user Ub and the user Ua perform the co-starring, the user Ub sending the invitation may be referred to as a "host user", and the user Ua performing the co-starring with the user Ub in accordance with the invitation may be referred to as a "guest user". The concepts of the host user and the guest user are relative. For example, on the contrary to the example described above, in a case where the user Ub performs the co-starring in the moving image of the user Ua, based on the invitation sent to the user Ub from the user Ua, the user Ua is the host user, and the user Ub is the guest user. In this specification, for convenience of description, it is assumed that an invitation is transmitted to the user Ua from the user Ub. That is, it is assumed that the user Ub is the host user, and the user Ua is the guest user. However, the description relevant to the user Ua in this specification can be maximally extended to the description relevant to the general guest user. Similarly, the description relevant to the user Ub in this specification can be maximally extended to the description relevant to the general host user. For example, even in a case where the distribution user Ua is described in this specification, the description can be understood as the description relevant to the general guest user, and the description relevant to the distribution user Ub can be understood as the description relevant to the general host user.

The moving image distribution system 1 includes the viewing user device 10, the distribution user devices 20a and 20b, a server device 60, and a storage 70. The viewing user device 10, the distribution user devices 20a and 20b, the server device 60, and the storage 70 are connected to each other through a network 50 such that communication can be performed. As described below, the server device 60 is configured to distribute the moving image including the animation of the character object of the distribution user Ua and the distribution user Ub. The server device 60 may be configured to be capable of distributing a moving image other than the moving image including the animation of the character object. The server device 60 may provide a social networking service for users to interact with each other or platform function for such a service, in addition to a moving image distribution service.

In the moving image distribution system 1, the moving image is distributed to the viewing user device 10 and the distribution user devices 20a and 20b from the server device 60. The distributed moving image is displayed on a display of the viewing user device 10. The viewing user who is the user of the viewing user device 10 is capable of viewing the distributed moving image by the viewing user device 10. The distribution users Ua and Ub are capable of performing a performance (e.g., a song or dance) while checking the moving image that is being distributed, by viewing the distributed moving image. In addition, the distribution users Ua and Ub are capable of viewing a moving image including a character object of the other user by the distribution user devices 20a and 20b. In order to simplify the description, only one viewing user device 10 is illustrated in FIG. 1, but the moving image distribution system 1 may include a plurality of viewing user devices. In addition, only two distribution user devices are illustrated in FIG. 1, but the moving image distribution system 1 may include three or more distribution user devices. As described above, the distribution users Ua and Ub may be the viewing user. Accordingly, in a case where a user's own moving image is not distributed, it is possible to view the moving image that is distributed by another distribution user by the distribution user devices 20a and 20b.

In the illustrated embodiment, the distribution user device 20a includes a computer processor 21a, a communication I/F (interface) 22a, a display 23a, a camera 24a, and a microphone 25a. Similarly, the distribution user device 20b includes a computer processor 21b, a communication I/F 22b, a display 23b, a camera 24b, and a microphone 25b. The distribution user device 20a and the distribution user device 20b have the same configuration and the same function, and thus, in the case of not particularly distinguishing the distribution user devices 20a and 20b, both of the distribution user devices 20a and 20b may be collectively referred to as the distribution user device 20, and the constituents thereof may be referred to as the computer processor 21, and the like.

The computer processor 21 is an arithmetic device that loads various programs for attaining operating systems or various functions in a memory from the storage, and executes commands included in the loaded programs. The computer processor 21, for example, is a CPU, an MPU, a DSP, a GPU, and other various arithmetic devices, or a combination thereof. The computer processor 21 may be attained by an integrated circuit such as an ASIC, a PLD, an FPGA, and an MCU. In FIG. 1, the computer processor 21 is illustrated as a single constituent, but the computer processor 21 may be an assembly of a plurality of physically separate computer processors.

The communication I/F 22 is mounted as a hardware, firmware, or communication software such as a TCP/IP driver or a PPP driver, or a combination thereof. The distribution user device 20 is capable of performing the transmission and reception of data with respect to the other device through the communication I/F 22.

The display 23 includes a display panel and a touch panel. The touch panel is configured to be capable of detecting a touch operation (a contact operation) of a player. The touch panel is capable of detecting various touch operations such as a tap, a double tap, and a drag of the player. The touch panel includes a capacitive proximity sensor, and may be configured to be capable of detecting a non-contact operation of the player.

The camera 24 continuously images the face of the distribution users Ua and Ub, and acquires imaging data of the face of the distribution users Ua and Ub. The imaging data of the face of the distribution users Ua and Ub, which is imaged by the camera 24, is transmitted to the server device 60 through the communication I/F 22. The camera 24 may be a 3D camera that is capable of detecting the depth of the face of a figure. The camera 24 may acquire the imaging data by imaging a part other than the face of the distribution users Ua and Ub, for example, hands, legs, fingers, or other parts.

The microphone 25 is a sound collecting device configured to convert input sound into sound data. The microphone 25 is configured to be capable of acquiring the sound input of the distribution users Ua and Ub. The sound input of the distribution users Ua and Ub, which is acquired by the microphone 25, is converted into the sound data, and the sound data is transmitted to the server device 60 through the communication I/F 22.

The viewing user device 10 may include the same constituents as those of the distribution user device 20. For example, the viewing user device 10 may include a computer processor, a communication I/F, a display, and a camera. The viewing user device 10 has the same function as that of the distribution user device 20 by downloading and installing predetermined application software.

The viewing user device 10 and the distribution user device 20 are an information processing device such as a smart phone. The viewing user device 10 and the distribution user device 20 may be a mobile phone, a tablet terminal, a personal computer, an electronic book reader, a wearable computer, a game console, and other various information processing devices that are capable of reproducing a moving image, in addition to the smart phone. Each of the viewing user device 10 and the distribution user device 20 may include a sensor unit provided with various sensors such as a gyroscope sensor, and a storage storing various information items, in addition to the constituents described above.

Next, the server device 60 will be described. In the illustrated embodiment, the server device 60 includes a computer processor 61, a communication I/F 62, and a storage 63.

The computer processor 61 is an arithmetic device that loads various program for attaining operating systems or various functions in a memory from the storage 63 or the other storage, and executes commands included in the loaded programs. The computer processor 61, for example, is a CPU, an MPU, a DSP, a GPU, and other various arithmetic devices, or a combination thereof. The computer processor 61 may be attained by an integrated circuit such as an ASIC, a PLD, an FPGA, and an MCU. In FIG. 1, the computer processor 61 is illustrated as a single constituent, but the computer processor 61 may be an assembly of a plurality of physically separate computer processors.

The communication I/F 62 is mounted as a hardware, firmware, or communication software such as a TCP/IP driver or a PPP driver, or a combination thereof. The server device 60 is capable of performing the transmission and reception of data with respect to the other device through the communication I/F 62.

The storage 63 is a storage device that is accessed by the computer processor 61. The storage 63, for example, is a magnetic disk, an optical disk, a semiconductor memory, or the other various storage devices that are capable of storing data. In the storage 63, various programs can be stored. At least a part of the programs and various data items that can be stored in the storage 63 may be stored in a storage that is physically separated from the server device 60 (for example, the storage 70).

In this specification, each of the programs or the commands included in the program that is described as being executed by the computer processor 21 or the computer processor 61 may be executed by a single computer processor, or may be executed by being dispersed in a plurality of computer processors. In addition, each of the programs or the commands included in the program that is described as being executed by the computer processor 21 or the computer processor 61 may be executed by a plurality of virtual computer processors.

Next, the data stored in the storage 63 will be described. In the illustrated embodiment, the storage 63 stores model data 63*a*, object data 63*b*, user information 63*c*, co-starring moving image information 63*d*, and the other various data items necessary for generating and distributing a distribution moving image.

The model data 63*a* is model data for generating the animation of the character. The model data 63*a* may be three-dimensional model data for generating a three-dimensional animation, or may be two-dimensional model data for generating two-dimensional model data. The model data 63*a*, for example, includes rig data indicating the skeleton of the face of the character and a part other than the face (may be referred to as "skeleton data"), and surface data indicating the shape or the texture of the surface of the character. The surface data may be referred to as skin data. The model data 63*a* is capable of including a plurality of model data items that are different from each other. The plurality of model data items may include rig data items that are different from each other, or may include the same rig data. The plurality of model data items may include surface data items that are different from each other, or may include the same surface data.

The object data 63*b* includes asset data for constructing a virtual space that configures the moving image. The object data 63*b* includes data for drawing the background of the virtual space that configures the moving image, data for drawing various objects that are displayed in the moving image, and data for drawing various objects that are displayed in other moving images. The object data 63*b* may include object position information indicating the position of the object in the virtual space.

An example of the user information 63*c* is illustrated in FIG. 3. As illustrated, various data items relevant to the user are stored in association with account information of the distribution user using the moving image distribution system 1, as the user information 63*c*. As described below, host user information is generated based on the user information 63*c*. The user information 63*c* of a certain user may include user evaluation information indicating evaluation with respect to the user, viewership information indicating viewership of the moving image that is distributed or is being distributed by the user, moving image evaluation information indicating evaluation with respect to the moving image that is distributed by the user, and benefit information that is offered to the guest user in a case where the co-starring with the user is performed. The user information 63*c* may include information other than the above.

The account information of the user, for example, is user identification information (a user ID) for identifying the user. The user ID is allocated to the user when the user first performs use registration of the moving image distribution system 1.

The user evaluation information that is associated with the account information of the user is information indicating evaluation with respect to the user from the other user. The user evaluation information, for example, is a user evaluation point that is represented by a natural number. The user of the moving image distribution system 1 is capable of distributing the moving image including one's own character object through the server device 60. A user evaluation point of a certain user may be updated based on feedback from the viewing user on the moving image that is distributed by the user. For example, the feedback from the viewing user includes the selection of a "Like" button that is displayed on a viewing screen, the selection of a "Boo" button indicating negative evaluation, the gifting of an item that is displayed on the viewing screen (giving a gift), the transmission of a comment from the viewing screen, and other various feedbacks. It is assumed that the "Like" button is selected when a viewer has a favorable impression with respect to a viewing moving image or the distribution user distributing the viewing moving image. In the viewing screen, the "Like" button may be indicated as an icon including letters indicating the favorable impression, such as "Good" or "Like". It is assumed that the "Boo" button is selected when the viewer has a negative impression such as an unfavorable impression with respect to the viewing moving image or the distribution user distributing the viewing moving image. In the viewing screen, the "Boo" button may be indicated as an icon including letters indicating the unfavorable impression, such as "Bad" or "Dislike". In this specification, the button and the icon for indicating the favorable impression may be referred to as a "favorable impression button" and a "favorable impression icon", respectively, and the button and the icon for indicating the unfavorable impression may be referred to as an "unfavorable impression button" and an "unfavorable impression icon", respectively. In the evaluation point, the number of selections of the favorable impression button, the number of selections of the unfavorable impression button, the number of giftings of the gift (or a gifting amount), the number of comments, or other parameters associated with the feedback from the viewing user can be included. For example, in a case where positive feedback or negative feedback is given from the viewing user, the user evaluation point may be increased. The user evaluation point may evaluate the number or amount of positive feedbacks from the viewing user as the number of points, or may evaluate the number or amount of negative feedbacks from the viewing user as the number of points. Further, the user evaluation point may be increased or decreased in accordance with each of the number of positive feedbacks and the number of negative feedbacks. More specifically, in a case where the positive feedback is given, the user evaluation point is increased, and in a case where the negative feedback is given, the user evaluation point is decreased, or vice versa. The user evaluation point of a certain user may be updated in a case other than the feedback with respect to the moving image distributed by the user. For example, when a certain user interacts with the other user through a social networking service that is provided by the server device 60, the user evaluation point may be updated based on an activity using the social networking service.

The moving image evaluation information that is associated with the account information of the user is information indicating evaluation from the other user with respect to the moving image distributed by the user. The moving image evaluation information, for example, is a moving image evaluation point that is represented by a natural number. The moving image evaluation point of a certain user may be updated based on the feedback from the viewing user with respect to the moving image distributed by the user. In a case where the positive feedback is given from the viewing user viewing the moving image or the negative feedback is given from the viewing user viewing the moving image, with respect to the moving image distributed by a certain user, the moving image evaluation point of the user may be increased. In a case where the feedback is given with respect to the moving image distributed by a certain user, both of the user evaluation point and the moving image evaluation point may be updated.

The viewership information that is associated with the account information of the user indicates the number of viewing users who have viewed or are viewing the moving image distributed by the user. The viewership information of a certain user may be a cumulative number of the viewing users viewing the moving image distributed by the user. For example, in a case where a certain user has distributed the moving image 10 times so far, the viewership information may be the sum of the number of viewing users in each of 10 distributions. The viewing user may newly start the viewing in the middle of the distribution of the moving image, or the user viewing the moving image may stop the viewing in the middle of the viewing. For this reason, the number of viewing users of a certain moving image can be different in accordance with when the measurement is performed from the start of the viewing of the moving image. The log of the number of viewing users at constant time intervals may be obtained, the average of the viewing users may be obtained based on the log, and the obtained average may be set to the number of viewing users of the moving image. For example, in the moving image for 10 minutes, the viewership may be recorded at 1 minute intervals 10 times in total, and the average of the viewership recorded 10 times may be set to the number of viewing users of the moving image. In another embodiment, the number of viewing users viewing the moving image at the time of ending the distribution of the moving image may be set to the number of viewing users. The viewership information of the moving image may be information other than the above relevant to the number of viewing users of the moving image.

The benefit information that is associated with the account information of the user indicates a benefit that is offered to the guest user performing the co-starring application for performing the co-starring with the user in the moving image that is distributed by the user. A benefit that is associated with the account information of a certain user may be set by the user. The benefit that is associated with the account information of a certain user may be set by other than the user. For example, the benefit that is associated with the account information of a certain user may be determined by an operator of the moving image distribution system 1. The operator of the moving image distribution system 1 is capable of determining the benefit based on a use situation of the service of the user or the user of the moving image distribution system 1 other than the user, and other information items. The benefit may be offered to all users performing the co-starring application, or may be offered to only a part thereof. For example, the benefit may be offered to only the guest user actually performing the co-starring with the host user, in the users performing the co-starring application. In a case where the co-starring application is performed, a first benefit is offered, and in a case where the co-starring is actually performed by the co-starring application, a second benefit different from the first benefit may be offered. In the benefit that is offered to the guest user, a point that can be used in the moving image distribution service provided by the distribution system 1, a point that can be used in a specific platform other than the distribution system 1, crypto-assets such as a bitcoin, a gift to be gifted to the distribution user (for example, the distribution user Ub), an object that can be displayed in the moving image to be distributed, and other various benefits can be included. The object that can be displayed in the moving image, for example, may be an object that can be used only in the co-starring moving image.

An example of the co-starring moving image information is illustrated in FIG. 4. As illustrated, various data items relevant to the co-starring moving image are stored in association with co-starring moving image identification information for identifying the co-starring moving image, as the co-starring moving image information 63$d$. The co-starring moving image information 63$d$ of a certain co-starring moving image may include host user evaluation information indicating evaluation with respect to the host user in the co-starring moving image, guest user evaluation information indicating evaluation with respect to the guest user in the co-starring moving image, and co-starring time information indicating an elapse time from the start of the co-starring of the co-starring moving image.

The host user evaluation information indicates evaluation with respect to the host user in the co-starring moving image. The host user evaluation information of a certain host user, for example, is a host user evaluation point that is represented by a natural number.

The guest user evaluation information indicates evaluation with respect to the guest user. The guest user evaluation information of a certain guest user, for example, is a guest user evaluation point that is represented by a natural number.

The co-starring time information indicates an elapse time from the start of the co-starring between the guest user and the host user.

Next, functions that are attained by the computer processors 21a and 21b will be described in more detail. The computer processor 21a functions as a face motion data generation unit 21a1, an invitation presentation unit 21a2, and a co-starring application unit 21a3, by executing a computer-readable command included in a distribution program. Similarly, the computer processor 21b functions as a face motion data generation unit 21b2 and an invitation request unit 21b2, by executing the computer-readable command included in the distribution program. At least a part of the functions that are attained by the computer processors 21a and 21b may be attained by a computer processor other than the computer processors 21a and 21b of the moving image distribution system 1. At least a part of the functions that are attained by the computer processors 21a and 21b, for example, may be attained by the computer processor 61 installed in the server device 60.

The face motion data generation unit 21a1 generates face motion data that is a digital expression of a face motion of the distribution user Ua, based on imaging data of the camera 24a. Similarly, the face motion data generation unit 21b1 generates face motion data that is a digital expression of a face motion of the distribution user Ub, based on imaging data of the camera 24b. The face motion data is continually generated over time. The face motion data may be generated at predetermined sampling time intervals. As described above, the face motion data that is generated by the face motion data generation unit 21a1 is capable of digitally expressing the face motion (a change in a neutral expression) of the distribution user Ua on a time-series basis, and the face motion data that is generated by the face motion data generation unit 21b1 is capable of digitally expressing the face motion (a change in a neutral expression) of the distribution user Ub on a time-series basis. The face motion data that is generated by the face motion data generation units 21a1 and 21b1 is transmitted to the server device 60 through the communication I/Fs 22a and 22b.

In the distribution user device 20, body motion data that is a digital expression of the position and the direction of each part other than the face of the distribution users Ua and Ub may be generated in addition to the face motion data that is generated by the face motion data generation unit 21a1. The distribution user device 20 may transmit the body notion data to the server device 60, in addition to the face motion data. In order to generate the body motion data, the distribution users Ua and Ub may be mounted with a motion sensor. The distribution user device 20 may be configured to be capable of generating the body motion data, based on detection information of the notion sensor mounted on the distribution users Ua and Ub. The body motion data may be generated at predetermined sampling time intervals. As described above, the body motion data expresses a body motion of the distribution users Ua and Ub on a time-series basis, as digital data. The generation of the body motion data based on the detection information of the motion sensor mounted on the distribution users Ua and Ub, for example, may be performed in a picture studio. In the picture studio, a base station, a tracking sensor, and a display may be provided. The base station may be a multiaxial laser emitter. The motion sensor mounted on the distribution users Ua and Ub, for example, may be a Vive Tracker that is provided from HTC CORPORATION. The base station provided in the picture studio, for example, may be a base station that is provided from HTC CORPORATION. In addition, a supporter computer may be provided in a room separated from the picture studio. The display of the picture studio may be configured to display information that is received from the support computer. The server device 60 may be provided in a room identical to the room in which the supporter computer is provided. The room in which the supporter computer is provided and the picture studio may be separated by a glass window. In this case, an operator of the supporter computer (in this specification, may be referred to as a "supporter") is capable of visibly recognizing the distribution users Ua and Ub. The supporter computer may be configured to be capable of changing the setting of various devices provided in the picture studio, in accordance with the operation of the supporter. The supporter computer, for example, is capable of changing the setting of a scanning interval of the base station, the setting of the tracking sensor, and various settings of other various devices. The supporter is capable of inputting a message to the supporter computer and of displaying the input message on the display of the picture studio.

In the distribution user device 20b, the invitation request unit 21b2 requests the transmission of the invitation with respect to the server device 60, in accordance with the operation of the distribution user Ub. The invitation is transmitted to the distribution user device 20a and other distribution user devices from the server device 60. The server device 60 may transmit host user information relevant to the distribution user Ub requesting the transmission of the invitation, in association with the invitation from the distribution user Ub. The invitation may be included in the moving image that is distributed, or may be transmitted separately from the moving image that is distributed.

In the distribution user device 20a, the invitation presentation unit 21a2 presents the invitation with respect to the distribution user Ua at the time of receiving the invitation from the other distribution user from the server device 60. The invitation, for example, is an invitation for inviting the user Ua to the moving image that is being distributed by the user Ub. The invitation presentation unit 21a2 may present the host user information relevant to the distribution user requesting the transmission of the invitation, along with the invitation. The invitation presentation unit 21a2 may display the contents of the invitation and the host user information relevant to the distribution user transmitting the invitation on the display 23a.

The co-starring application unit 21a3 transmits the co-starring application for applying the co-starring with the other distribution user to the server device 60, based on the operation of the distribution user Ua with respect to the distribution user device 20a.

As described below, the distribution user device 20a may display an operation button for performing the co-starring application in accordance with the reception of the invitation, or may display an operation button for performing the co-starring application regardless of the reception of the invitation.

In this specification, it is assumed that the invitation is transmitted to the distribution user Ua using the distribution user device 20a from the distribution user Ub using the distribution user device 20b, and thus, the invitation request unit 21b2 is described as a function that is executed by the computer processor 21b of the distribution user device 20b. It is also assumed that the distribution user Ua transmits the invitation, and thus, the distribution user device 20a may execute the same function as that of the invitation request unit 21b2. Similarly, it is also assumed that the distribution user Ub receives the invitation, and thus, the distribution user device 20b may execute the same function as that of the invitation presentation unit 21a2 and the co-starring application unit 21a3.

The distribution user device 20 may attain functions other than that of the face motion data generation unit 21a1 by executing the distribution program or other programs with the computer processor. For example, the distribution user device 20 may attain a function of reproducing the received moving image by executing a viewing program for viewing a moving image. The distribution program and the viewing program nay be packaged in one application software, or may be provided a separate application software.

The viewing user device 10 may be configured to provide the same function as that of the distribution user device 20. For example, the viewing user device 10 may attain a function of reproducing the received moving image by executing the viewing program for viewing a moving image, or may attain the same function as the function of the face motion data generation unit 21a1 by executing the distribution program.

Next, the functions that are attained by the computer processor 61 will be described in more detail. The computer processor 61 functions as an animation generation unit 61a, a moving image generation unit 61b, a moving image distribution unit 61c, an invitation processing unit 61d, a co-starring application processing unit 61e, and a co-starring end processing unit 61f, by executing the computer-readable command included in the distribution program.

The animation generation unit 61a is configured to generate the animation of the character object by applying the face motion data that is generated by the face motion data generation unit 21a1 of the distribution user device 20a or the face motion data generation unit 21b1 of the distribution user device 20b to predetermined model data included in the model data 63a. The animation generation unit 61a is capable of generating the animation of the character object such that the neutral expression of the character object is changed based on the face motion data. Specifically, the animation generation unit 61a is capable of generating the animation of the character object moving in synchronization with the motion of the neutral expression of the distribution user Ua, based on the face motion data relevant to the distribution user Ua. Similarly, the animation generation unit 61a is capable of generating the animation of the character object moving in synchronization with the motion of the neutral expression of the distribution user Ub, based on the face motion data relevant to the distribution user Ub.

In a case where the body motion data relevant to the distribution users Ua and Ub is provided from the distribution user device 20, the animation generation unit 61a is capable of generating the animation of the character object moving in synchronization with the motion of the body and the neutral expression of the distribution users Ua and Ub, based on the body motion data and the face motion data relevant to the distribution users Ua and Ub.

In a case where the moving image of the distribution user Ua is distributed, the moving image generation unit 61b is capable of generating a background image indicating the background by using the object data 63b, and of generating a moving image including the background image and the animation of the character object corresponding to the distribution user Ua. The moving image generation unit 61b is capable of synthesizing the generated moving image with the sound of the distribution user Ua that is generated based on sound data received from the distribution user device 20a. Similarly, in a case where the moving image of the distribution user Ub is distributed, the moving image generation unit 61b is capable of generating a background image indicating the background by the object data 63b, and of generating a moving image including the background image and the animation of the character object corresponding to the distribution user Ub. The moving image generation unit 61b is capable of synthesizing the generated moving image with the sound of the distribution user Ub that is generated based on the sound data received from the distribution user device 20b. In the moving image that is generated by the moving image generation unit 61b, the characters corresponding to the distribution users Ua and Ub object is displayed to be superimposed on the background image. As described above, the moving image generation unit 61b is capable of generating the animation of the character object moving in synchronization with the motion of the neutral expression of the distribution user Ua or the distribution user Ub, and of generating a moving image for distribution in which the animation is synthesized with the sound of the distribution user Ua or the distribution user Ub.

The moving image distribution unit 61c distributes the moving image that is generated in the moving image generation unit 61b. The moving image is distributed to the viewing user device 10 and other viewing user devices through the network 50. The generated moving image is also distributed to the distribution user devices 20a and 20b. The received moving image is reproduced in the viewing user device 10 and the distribution user devices 20a and 20b. The moving image distribution unit 61c may monitor at least one of a distribution time and the number of times of the distribution of the moving image, for each distribution user.

Figure 5:
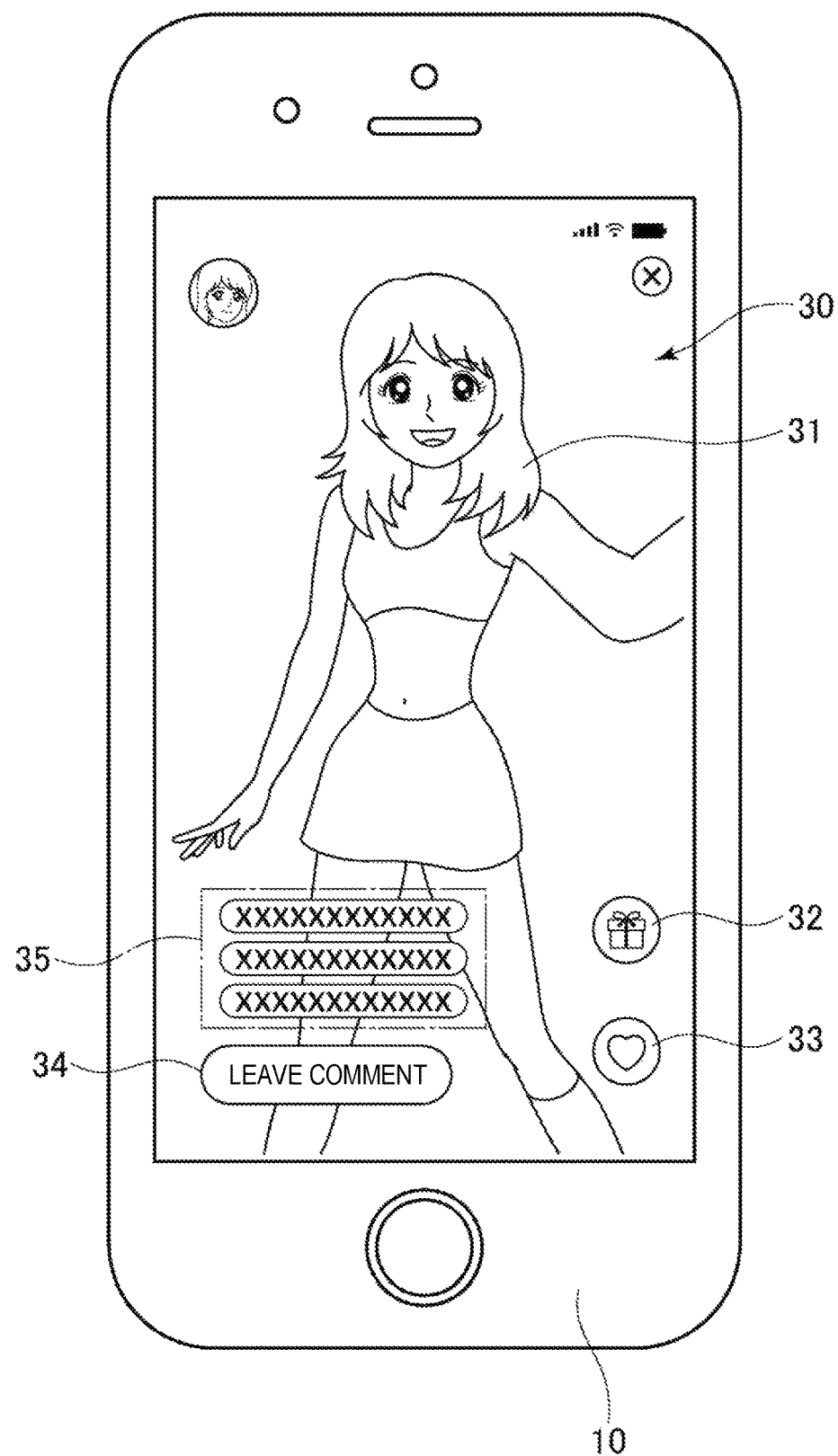
FIG. 5 is a diagram illustrating an example of a display screen that is displayed on a viewing user device in one embodiment.
Figure 6A:
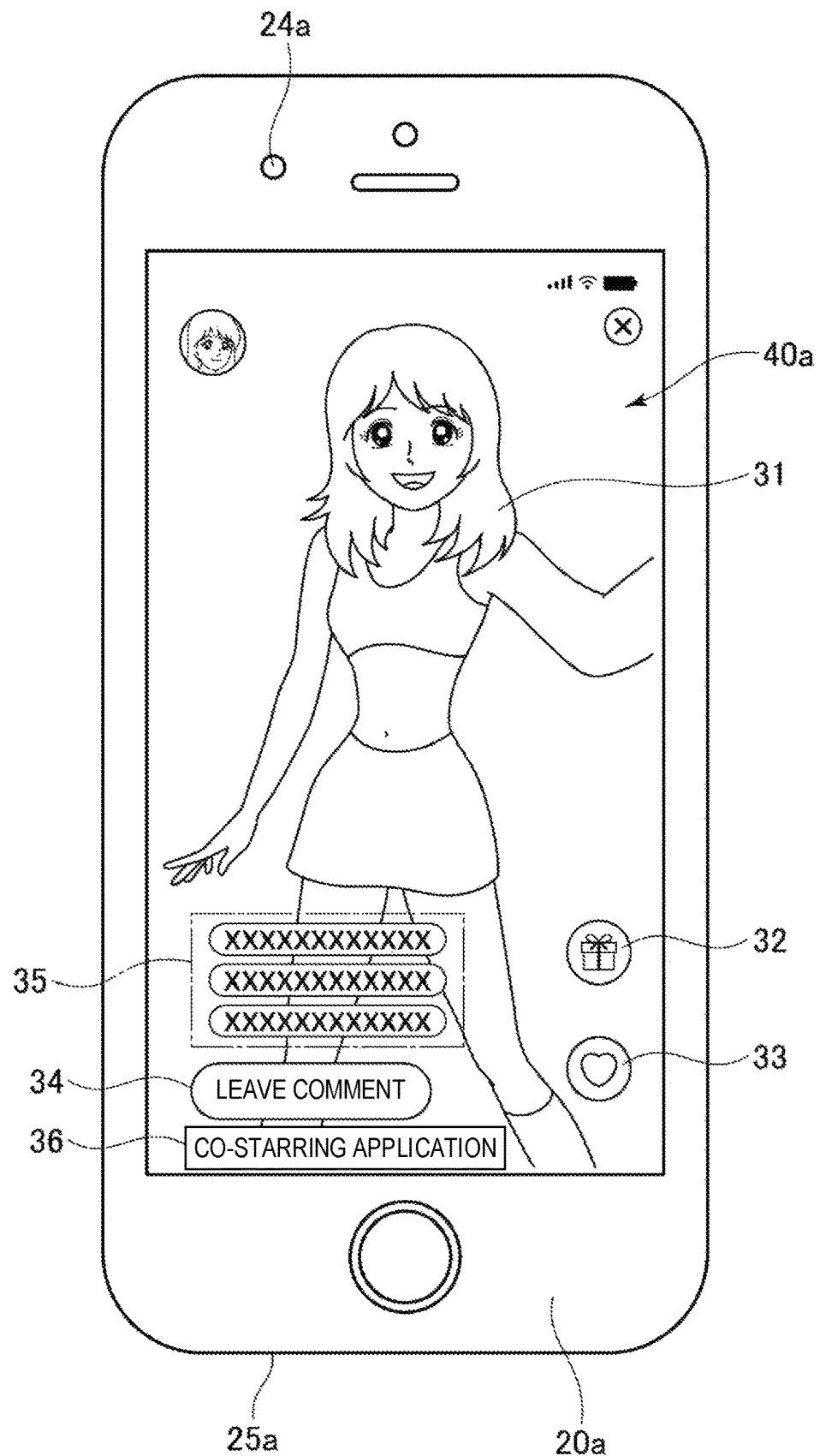
FIG. 6A is a diagram illustrating an example of a display screen that is displayed on a distribution user device in one embodiment.
Figure 6B:
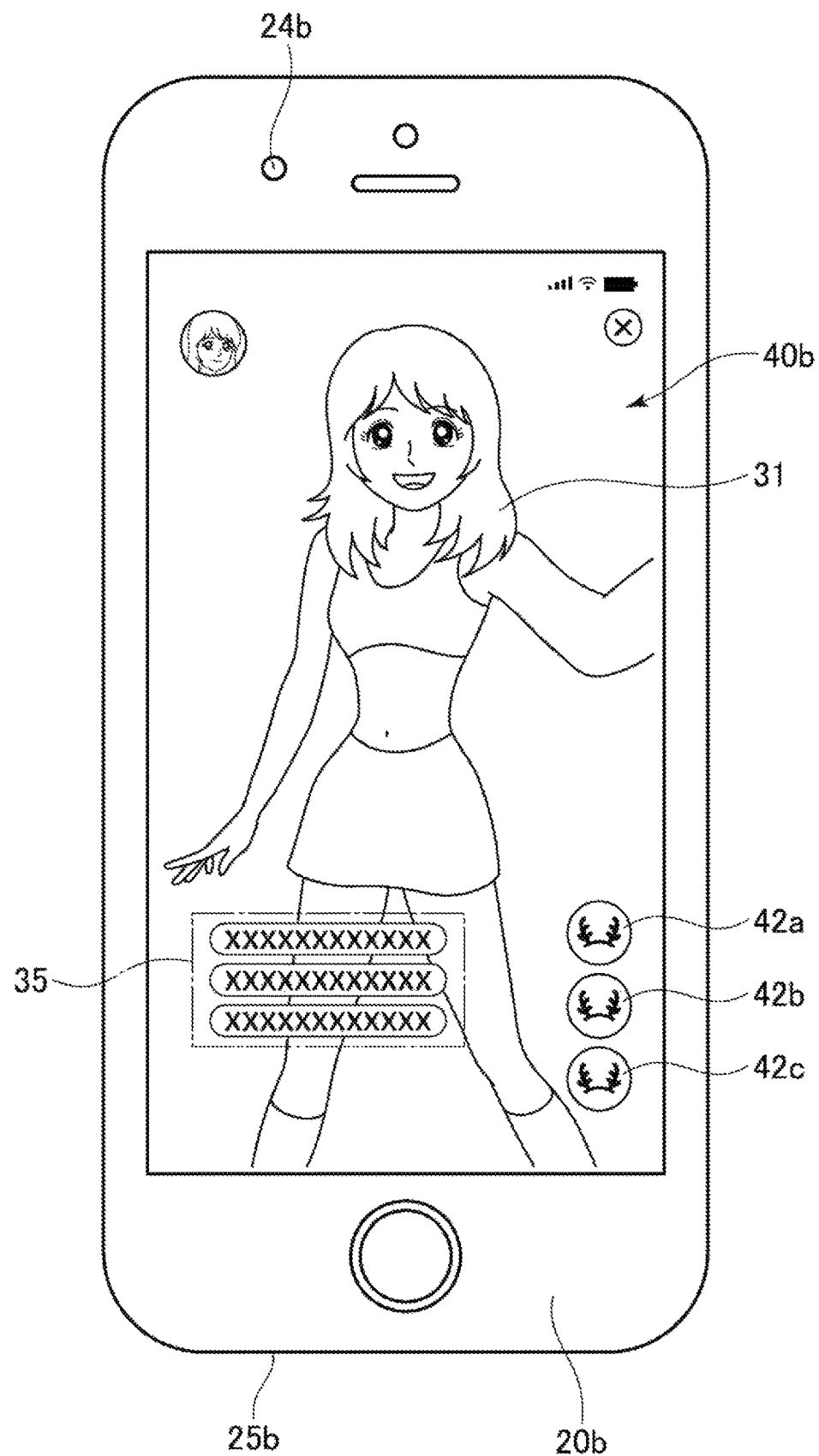
FIG. 6B is a diagram illustrating an example of a display screen that is displayed on a distribution user device in one embodiment.

A display example of the moving image that is distributed from the moving image distribution unit 61c is illustrated in FIG. 5, and FIG. 6A and FIG. 6B. In such drawings, it is assumed that the distribution user Ub distributes the moving image including its own character object by using the distribution user device 20b, and the moving image is reproduced in the viewing user device 10 and the distribution user devices 20a and 20b. In FIG. 6A, it is assumed that the distribution user Ua views the moving image that is distributed by the distribution user Ub who is another distribution user, without performing moving image distribution. For this reason, in the description relevant to FIG. 5, and FIG. 6A and FIG. 6B, the distribution user Ua may be referred to as the viewing user. FIG. 5 illustrates a display example of the moving image that is reproduced in the viewing user device 10, FIG. 6A illustrates a display example of the moving image that is reproduced in the distribution user device 20a, and FIG. 6B illustrates a display example of the moving image that is reproduced in the distribution user device 20b.

As illustrated in FIG. 5, in the display of the viewing user device 10, an image 30 including the moving image that is distributed from the server device 60 is displayed. The viewing user device 10 may include a display screen that includes the image 30. The image 30 that is displayed on the viewing user device 10 includes a character object 31 of the distribution user Ub that is generated by the animation generation unit 61*a*, a gift button 32, an evaluation button 33, a comment button 34, and a comment display region 35.

As illustrated in FIG. 6A, in the display 23*a* of the distribution user device 20*a*, an image 40*a* including the moving image that is distributed from the server device 60 is displayed. As with the image 30, the image 40*a* includes a character object 31 of the distribution user Ub, the gift button 32, the evaluation button 33, the comment button 34, and the comment display region 35. In addition, the image 40*a* may include a co-starring application button 36. The co-starring application button 36 is an operation button for transmitting the co-starring application for applying the co-starring with the distribution user Ub in the moving image that is distributed by the distribution user Ub. The distribution user Ua is capable of transmitting the co-starring application for applying the co-starring with the distribution user Ub to the server device 60 from the distribution user device 20*a* by selecting the co-starring application button 36 in the distribution user device 20*a*. The distribution user device 20*a*, for example, is capable of displaying the image 40*a* of the distributed moving image by executing the application software including the viewing program.

As illustrated in FIG. 5, the co-starring application button 36 may not be included in the image 30 that is displayed on the viewing user device 10. For example, in a case where including the application software including the distribution program is not downloaded or installed in the viewing user device 10, and in a case where the application software including the distribution program is not activated in the viewing user device 10, the image 30 is generated such that the co-starring application button 36 is not included. In another embodiment, the co-starring application button 36 may be displayed in the image 30 of the viewing user device 10. For example, in a case where the application software including the distribution program is downloaded or installed in the viewing user device 10, or in a case where the application software including the distribution program is activated in the viewing user device 10, the image 30 is generated such that the co-starring application button 36 is included.

As described above, the character object 31 is generated by applying the face motion data of the distribution user Ub to the model data included in the model data 63*a*, and thus, the neutral expression is changed in synchronization with the motion of the neutral expression of the distribution user Ub. In a case where the body motion data is provided from the distribution user device 20, the character object 31 can be controlled such that parts other than the face are also changed in synchronization with body motion of the distribution user Ub.

The gift button 32 is displayed in the image 30 that can be selected by an operation with respect to the viewing user device 10. The gift button 32, for example, can be selected by a tap operation with respect to a region in which the gift button 32 is displayed, in the touch panel of the viewing user device 10. In one embodiment, in a case where the gift button 32 is selected, a window for selecting a gift to be gifted to the distribution user distributing the moving image that is being viewed (here, the distribution user Ub) is displayed in the image 30. The viewing user is capable of purchasing a gift that is a gifting target from gifts displayed in the window. In another embodiment, a window including a list of purchased gifts is displayed in the image 30 in accordance with the selection of the gift button 32. In this case, the viewing user is capable of selecting the gift that is the gifting target from the gifts displayed in the window. In a case where the gift button 32 is selected in the viewing user device 10, the gifting information may be transmitted to the server device 60. The gifting information may include gift identification information (a gift ID) for specifying the gift that is gifted. As described above, the viewing user viewing the moving image is capable of providing (gifting) a desired gift to the distribution user distributing the moving image by selecting the gift button 32.

The evaluation button 33 is displayed in the image 30 such that the evaluation button 33 can be selected by the viewing user using the viewing user device 10. The evaluation button 33, for example, can be selected by a tap operation with respect to a region in which the evaluation button 33 is displayed, in the touch panel of the viewing user device 10. In a case where the evaluation button 33 is selected by the viewing user viewing the moving image, evaluation update information indicating positive evaluation with respect to the distribution user distributing the moving image (in the illustrated example, the distribution user Ub) or positive evaluation with respect to the moving image that is distributed may be transmitted to the server device 60. In the server device 60, the user information 63*c* can be updated based on the evaluation update information from the viewing user. For example, at least one of the user evaluation information and the moving image evaluation information that are included in the user information 63*c* may be updated based on the evaluation update information from the viewing user. For example, in a case where the evaluation button 33 included in the image 30 illustrated in FIG. 5 is selected by the viewing user, at least one of the user evaluation information and the moving image evaluation information of the distribution user Ub distributing the moving image that is displayed on the viewing user device 10 may be updated. Evaluation information indicating negative evaluation with respect to the moving image may be transmitted to the server device 60, by the selection of the evaluation button 33. The evaluation information indicating the positive evaluation with respect to the moving image may be referred to as positive evaluation information, and the evaluation information indicating the negative evaluation with respect to the moving image may be referred to as negative evaluation information. In a case where the positive evaluation information is received, the server device 60 may increase at least one of the user evaluation information and the moving image evaluation information. In a case where the negative evaluation information is received, the server device 60 may decrease at least one of the user evaluation information and the moving image evaluation information.

The comment button 34 is displayed in the image 30 such that the comment button 34 can be selected by the user. In a case where the comment button 34, for example, is selected by a tap operation, a comment input window for inputting a comment is displayed on the image 30. The viewing user is capable of inputting the comment through an input mechanism of the viewing user device 10 or the distribution user device 20*a*. The input comment is transmitted to the server device 60 from the viewing user device 10 and the distribution user device 20*a*. The server device 60 receives the comment from the viewing user device 10, the distribution user device 20*a*, and other user devices, and displays the comment in the comment display region 35 in the image 30. In the comment display region 35, comments posted from each user, for example, are displayed in chronological order. The comment display region 35 occupies a partial region of the image 30. There is an upper limit in the number of comments that can be displayed in the comment display region 35. In the illustrated example, up to three comments can be displayed in the comment display region 35. In a case where the comments exceeding the upper limit set in the comment display region 35 are posted, the comments are deleted from the comment display region 35 in order from the oldest posting time. For this reason, the display time of each of the comments in the comment display region 35 is shortened as the frequency of the comment to be received increases. In one embodiment, a scroll bar is provided in the image 30, and the comment is scrolled by operating the scroll bar, and thus, the comment deleted from the comment display region 35 can be browsed.

As illustrated in FIG. 6B, in the display of the distribution user device 20b, an image 40b distributed from the server device 60 is displayed. The image 40b that is displayed on the distribution user device 20b includes the character object 31 corresponding to the distribution user Ub, display instruction buttons 42a to 42c for displaying the gift received from the viewing user in the moving image, and the comment display region 35. The image 40b that is displayed on the distribution user device 20b includes the same background image, the same character object image, and the same comment as those of the image 30 and the image 40a. On the other hand, the image 40b is different from the image 30 and the image 40a in that the gift button 32, the evaluation button 33, the comment button 34, and the co-starring application button 36 are not provided, but the display instruction buttons 42a to 42c are provided. The display instruction buttons 42a to 42c, for example, are displayed in the image 40 in accordance with the reception of the gift from the viewing user. In the illustrated embodiment, three display instruction buttons 42a to 42c are displayed in the image 40. Each of the display instruction buttons 42a to 42c is displayed on the image 40 such that the display instruction buttons 42a to 42c can be selected by the distribution user. In a case where any of the display instruction buttons 42a to 42c, for example, is selected by the tap operation, an operation for displaying a gift corresponding to the selected display instruction button is performed. As described above, the display instruction buttons 42a to 42c are a display instruction object for performing an instruction for displaying the gift in the moving image that is being distributed.

Figure 7:
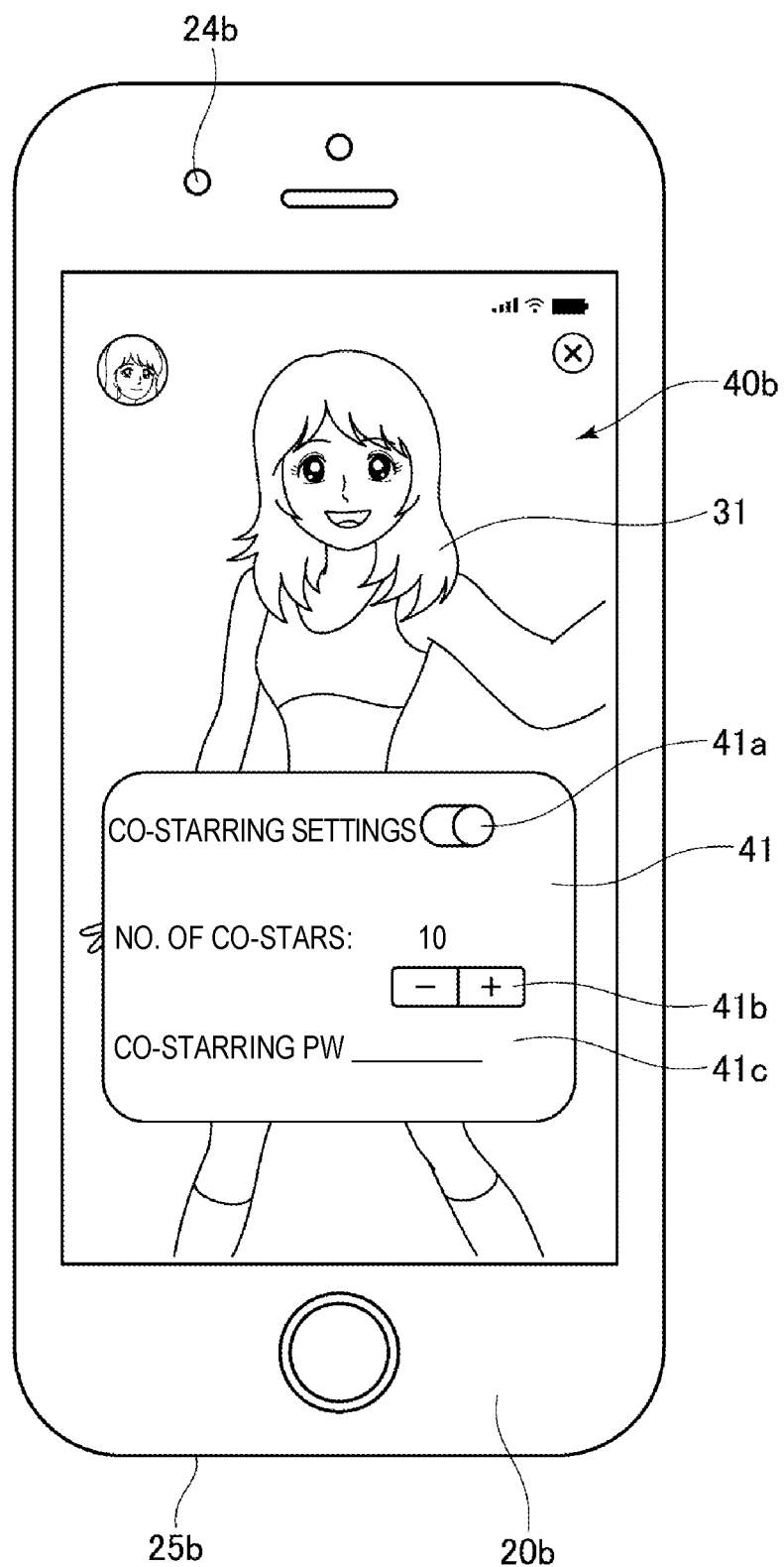
FIG. 7 is a diagram illustrating a setting window that is displayed on the distribution user device.

The invitation processing unit 61d transmits an invitation to one or a plurality of distribution user devices included in the moving image distribution system 1, based on an invitation request from the invitation request unit 21b2. The invitation may be transmitted to the viewing user device 10. As described above, the invitation is a notification for inviting the other distribution user to the moving image that is distributed by the distribution user Ub. An invitation request that is transmitted from the distribution user device 20b will be further described with reference to FIG. 7. FIG. 7 is a diagram illustrating a window for setting the invitation request to be displayed on the distribution user device 20b. A setting window 41 is displayed on the distribution user device 20b before the start of the distribution of the moving image or after the start of the distribution of the moving image. The setting window 41 may be displayed in accordance with the operation of the user, or may be displayed at a predetermined timing before the start of the distribution of the moving image or after the start of the distribution of the moving image, without the operation of the user.

In the illustrated embodiment, the setting window 41 includes a switch 41a, a stepper 41b, and a password setting region 41c. The switch 41a is a switch for switching whether or not to transmit the invitation. The switch 41a is switched on or off, in accordance with the operation of the user. When the switch 41a is switched on, setting is switched such that the invitation request is transmitted to the server device 60. When the switch 41a is switched off, the invitation request is not transmitted to the server device 60. For example, the invitation request is transmitted to the server device 60 after the switch 41a is switched on in a case where the window 41 is closed.

The stepper 41b is an operation unit for increasing or decreasing a numerical value to be input in accordance with the operation of the user. In the illustrated embodiment, the number of co-stars capable of performing the co-starring in the moving image that is to be distributed or the moving image that is being distributed can be increased or decreased by the stepper 41b. In the example of FIG. 7, 10 is set as the number of co-stars capable of performing the co-starring. In a case where "−" is selected in the stepper 41b, the number of co-stars that is set decreases, for example, to 9 from 10, and in a case where "+" is selected in the stepper 41b, the number of co-stars that is set increases, for example, to 11 from 10. In one embodiment, the number of co-stars may indicate the upper limit number of users simultaneously performing the co-starring in the moving image that is distributed. In the embodiment, in a case where the number of co-stars is set to 10, 10 users are capable of simultaneously performing the co-starring in the moving image through the character thereof. In another embodiment, the number of co-stars capable of simultaneously performing the co-starring is set to a number smaller than the upper limit number of co-stars that is set (for example, 2). In this case, the upper limit number of co-stars indicates an upper limit of the number of users capable of performing co-starring within the distribution time. For example, in a case where the number of co-stars capable of simultaneously performing co-starring in the moving image is set to 2, and the upper limit of the number of co-stars is set to 10, an appearance order of 10 guest users is set, and each of the guest users performs co-starring with the host user in accordance with the appearance order. The distribution user Ub may designate an invitation destination, instead of the setting of the number of co-stars or in addition to the setting of the number of co-stars. For example, the candidate of the distribution user to be the invitation destination is displayed in the window 41 to be selectable by the distribution user Ub, and the distribution user selected by the distribution user Ub may be set as the invitation destination.

A co-starring password to be provided to the guest user demanding the co-starring is set in the password setting region 41c. The co-starring password, for example, is a number string of 4 digits. The distribution user Ub is capable of performing the co-starring only with specific distribution user by notifying the co-starring password only to the specific distribution user in the distribution users using the distribution system 1. In other words, the distribution user Ub is capable of avoiding the co-starring with the distribution user to which the co-starring password is not notified. In a case where the co-starring password is notified only to the specific distribution user, the distribution user Ub is capable of designating the specific distribution user by inputting the user ID of the distribution user who is a notification target. A designation method of the specific distribution user to which the co-starring password is notified is not particularly limited. In a case where the password input is not requested at the time of performing the co-starring application, the password setting region 41c is omitted.

The invitation request unit 21b2 generates an invitation request based on the setting that is determined through the setting window 41, and as necessary, other input interfaces, and transmits the invitation request to the server device 60. The invitation request also includes the user ID of the distribution user Ub. In the invitation request, the number of co-stars, the co-starring password, information for specifying the distribution user to be the invitation destination, and other information items necessary for performing the invitation can be included.

The invitation processing unit 61d generates an invitation based on the invitation request from the invitation request unit 21b2, and transmits the generated invitation to one or a plurality of distribution user devices. For example, in a case where the invitation destination is designated in the invitation request, the invitation processing unit 61d transmits the invitation to the distribution user device of the designated distribution user. In a case where the number of co-stars is set, the invitation processing unit 61d selects the distribution user to be the invitation destination until reaching the number of co-stars that is set, and transmits the invitation to the selected distribution user. The distribution user to be the invitation destination, may be randomly selected, or may be selected based on a predetermined algorithm. In a case where the invitation request includes the co-starring password, the invitation processing unit 61d notifies the co-starring password to the distribution user who is the notification target of the invitation.

In a case where the invitation request from the distribution user Ub is received, the invitation processing unit 61d generates the host user information of the distribution user Ub, with reference to the user information 63c that is stored in the storage 63. In one embodiment, the host user information of the distribution user performing the invitation request (the distribution user Ub) is at least a part of the user evaluation information, the moving image evaluation information, the viewership information, and the benefit information, which are stored in association with the user account information of the distribution user (the distribution user Ub) in the user information 63c, or is generated based on such information items. In other words, the host user information of the distribution user performing the invitation request may be at least one of the user evaluation information, the moving image evaluation information, the viewership information, and the benefit information, which are stored in association with the user account information of the distribution user, or may be a store generated based on such information items. It is desirable that the host user information is an index that can be referred to by the distribution user who has received the invitation in order to determine whether or not to apply the co-starring with the distribution user Ub, and for example, it is desirable that the host user information is an index representing the profile of the distribution user Ub as the host user.

The invitation processing unit 61d is capable of transmitting the host user information of the distribution user Ub to the distribution user Ua and other distribution users in association with the invitation for inviting to the co-starring with the distribution user Ub. Accordingly, the distribution user who has received the invitation from the distribution user Ub is capable of accessing the host user information of the distribution user Ub. In other words, the host user information of the distribution user Ub is associated with the invitation such that the host user information can be presented to the distribution user who has received the invitation from the distribution user Ub. In one embodiment, the host user information is transmitted to the distribution user as a part of the invitation. The host user information may be transmitted to the distribution user, along with the invitation. In another embodiment, the host user information is stored in the server device 60, and a link to the host user information stored in the server device 60 may be included in the invitation.

Figure 8:
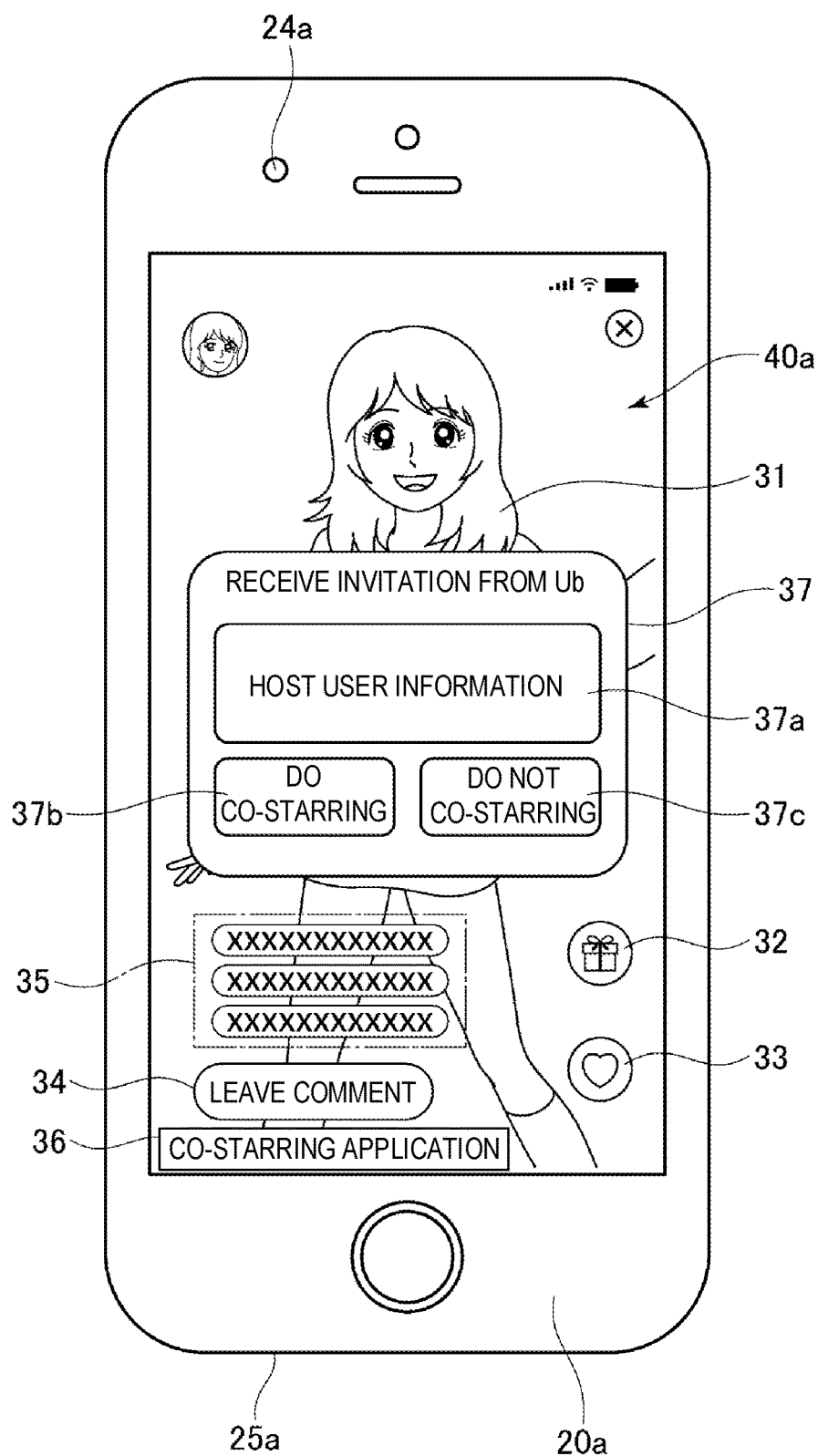
FIG. 8 is a diagram illustrating a display example of an invitation of the distribution user device which received the invitation.

Next, processing in the distribution user device of the distribution user who has received the invitation will be described with reference to FIG. 8. FIG. 8 illustrates a display example of the invitation in the distribution user device 20a of the distribution user Ua who has received the invitation from the distribution user Ub. In a case where the invitation from the distribution user Ub is received, as illustrated, the invitation presentation unit 21a2 of the distribution user device 20a displays a window 37 on the display 23a of the distribution user device 20a. The window 37 includes a letter string indicating that the invitation is received, such as "Receive invitation from Ub". Accordingly, the distribution user Ua is capable of recognizing that the invitation from the distribution user Ub is received. In the window 37, a display region 37a, a co-starring application button 37b, and a co-starring declination button 37c can be included, in addition to the letter string.

The invitation presentation unit 21a2 displays the host user information of the distribution user Ub in the display region 37a. As described above, the host user information in one embodiment is the index representing the profile of the distribution user Ub as the host user. The host user information, for example, may be the viewership information. In a case where the number of viewing users of the moving image that is distributed by the distribution user Ub is large, there is a possibility that the distribution user Ua is capable of acquiring many viewing users by the co-starring with the distribution user Ub. The host user information may be the user evaluation information. The fact that the user evaluation information of the distribution user Ub is high indicates that the distribution user Ub acquires a high reputation from the other user. Accordingly, in a case where the user evaluation information of the distribution user Ub is high, there is a possibility that the distribution user Ua is capable of obtaining high evaluation by oneself, by performing the co-starring with the distribution user Ub. The host user information may be the moving image evaluation information. The fact that the moving image evaluation information of the distribution user Ub is high indicates that the moving image distributed by the distribution user Ub acquires a high reputation. Accordingly, in a case where the moving image evaluation information of the distribution user Ub is high, there is a possibility that the distribution user Ua is capable of obtaining high evaluation by oneself, by appearing in the moving image of the distribution user Ub. The host user information may be the benefit information. The benefit information indicates a benefit that the distribution user Ua obtains by applying the co-starring with the distribution user Ub or a benefit that the distribution user Ua obtains by attaining the co-starring with the distribution user Ub. Such a benefit is an incentive for performing the co-starring with the distribution user Ub.

The host user information nay be a score that is calculated by a predetermined algorithm, based on a part or all of the viewership information, the user evaluation information, the moving image evaluation information, and the benefit information. For example, it is considered that many distribution users try to acquire more viewing users, and thus, there is a possibility that the viewership information is more important for the guest user than the other information items included in the user information 63c. Therefore, in the viewership information, the user evaluation information, and the moving image evaluation information, a weighted average in which the viewership information is further weighted can be calculated, and a score represented by the weighted average can be used as the host user information. A calculation method of the score indicating the host user information is not limited to the method that is clearly specified in this specification.

As described above, the viewership information, the user evaluation information, the moving image evaluation information, and the benefit information of the distribution user Ub, and the score calculated based on such information items can be an index indicating the profile of the distribution user Ub as the host user or the attractivity as a co-starring partner. By displaying such host user information in the display region 37a, it is possible to offer information that can be referred to at the time of determining whether or not to perform the co-starring with the distribution user Ub who has sent the invitation to the distribution user Ua who has received the invitation. The distribution user Ua is capable of determining whether or not to perform the co-starring with the distribution user Ub, based on the host user information.

The co-starring application button 37b included in the window 37 is an operation button for transmitting the co-starring application for applying the co-starring with the distribution user Ub in the moving image that is distributed by the distribution user Ub. The co-starring application is transmitted to the server device 60 by selecting the co-starring application button 37b, and the transmitted co-starring application is received by the server device 60. In the server device 60, not only the co-starring application from the distribution user Ua but also co-starring applications from various distribution users can be received. In a case where any of the co-starring application button 37b and the co-starring declination button 37c is not selected within a predetermined time after the display of the window 37, the window 37 may be deleted from the screen. As described above, the co-starring application button 36 may be displayed in the moving image that is displayed on the distribution user device 20a. Accordingly, the window 37 may not include the co-starring application button 37b. In a case where the window 37 does not include the co-starring application button 37b, the distribution user Ua is capable of selecting the co-starring application button 36 at the time of applying the co-starring with the distribution user Ub.

In the illustrated embodiment, the co-starring application button 36 is displayed before the display of the window 37. In this case, even in a case where the invitation has not been received yet, the distribution user Ua is capable of applying the co-starring with the distribution user Ub by selecting the co-starring application button 36. As described above, in the case of receiving the co-starring application from the distribution user who has not received the invitation, there is a possibility that an excessive number of co-starring applications are performed. In particular, in a case where the distribution user Ub is a popular distribution user, there is a possibility that numerous co-starring applications are performed. Therefore, in another embodiment of the present disclosure, the co-starring application button 36 may be displayed only on the distribution user device of the distribution user who has received the invitation, after receiving the invitation. In a case where the invitation is received, the co-starring application button 37b is displayed in the window 37, and the co-starring application button 36 may be displayed in the image 40a after the window 37 disappears from the image. Accordingly, the co-starring application can be received only from the user who has received the invitation (hereinafter, may be referred to as an "invited user").

In one embodiment of the present disclosure, the co-starring application button 36 may be displayed in the image 40a, regardless of whether or not the invitation is received. In this case, the input of the co-starring password may be requested when the co-starring application button 36 is selected, and the co-star request may be transmitted to the server device 60 only in a case where the co-starring password is authenticated. The distribution user Ub is capable of controlling the number of co-starring applications by notifying the co-starring password only to a user accepting the co-starring application. The co-starring password can be notified to the user by a messaging function that is used in the moving image distribution system 1, a messaging function different from that of the moving image distribution system 1 (for example, LIKE provided by LIKE Corporation), and other channels. As described above, the co-starring password can be transmitted to the user viewing the moving image that is distributed by the associated user Ub or other users, without being associated with the invitation from the distribution user Ub. The co-starring password is included in the moving image, and thus, the co-starring password may be notified to all of the viewing users viewing the moving image. The distribution user who is not capable of ensuring sufficient viewing users is capable of increasing a possibility for receiving the co-starring application by transmitting the co-starring password to many viewing users (which may be all of the users). Accordingly, the distribution user who is not popular also easily uses the co-starring function as the host user.

In a case where from the co-starring application a certain user (for example, the distribution user Ua) is received, the co-starring application processing unit 61e determines whether or not the co-starring application of the user is allowed. The co-starring application processing unit 61e may determine whether or not the co-starring between the distribution user Ua and the distribution user Ub is allowed, based on at least a part of the user information 63c of the distribution user Ua performing the co-starring application. For example, in a case where the user evaluation point of the distribution user Ua performing the co-starring application is greater than a predetermined threshold value, the co-starring between the distribution user Ua and the distribution user Ub may be allowed, and in a case where the user evaluation point is less than or equal to the threshold value, the co-starring between the distribution user Ua and the distribution user Ub may be rejected. Such a determination reference is not particularly limited.

In a case where the host user information includes the benefit information, and the benefit is an object that can be displayed in the moving image, the co-starring application processing unit 61e may perform processing for offering the benefit to the user performing the co-starring application. In a case where the benefit is a point that can be used in the moving image distribution system 1, the co-starring application processing unit 61e is capable of performing processing for offering the point to the user performing the co-starring application. In a case where the benefit is the object that can be displayed in the moving image, processing for offering the object to the user performing the co-starring application is performed. For example, an object ID for specifying the object that is offered as the benefit is stored in association with the user ID of the user performing the co-starring application.

In a case where the co-starring application from the distribution user Ua is allowed, the co-starring application processing unit 61e generates the co-starring moving image in which the distribution user Ua and the distribution user Ub perform the co-starring based on the co-starring application. In order to generate the co-starring moving image, the co-starring application processing unit 61e acquires the face motion data and the sound data of the distribution user Ua from the distribution user Ua. The face motion data of the distribution user Ua may be transmitted to the server device 60 from the distribution user device 20a, along with the co-starring application, or may be transmitted to the server device 60 from the distribution user device 20a, in accordance with the request from the server device 60, after the co-starring application is allowed. In a case where the body motion of the distribution user Ua is also expressed as the animation, the body motion data nay be provided to the server device 60, along with the face motion data of the distribution user Ua. In a case where the face motion data is not capable of being acquired from the distribution user Ua, the co-starring application processing unit 61e may acquire only the sound data from the distribution user Ua. For example, in a case where the distribution user device 20a that is used by the distribution user Ua does not have the function of the face motion data generation unit 21a1 or other functions for distributing the moving image, in a case where the function is disabled, and in other cases, the co-starring application processing unit 61e may acquire the sound data without acquiring the face motion data (and the body motion data) from the distribution user Ua.

In one embodiment, the co-starring application processing unit 61e generates a co-starring moving image by adding the animation of the character object of the distribution user Ua to the moving image being distributed, which includes the character object 31 of the distribution user Ub, based on the face motion data of the distribution user Ua. In the animation generation unit 61a, the animation of the character object of the distribution user Ua may be generated based on the face motion data of the distribution user Ua. The animation of the character object of the distribution user Ua may be generated by applying the face motion data of the distribution user Ua to the model data for the distribution user Ua that is included in the model data 63a. For example, the co-starring application processing unit 61e is capable of generating the co-starring moving image including the character object of the distribution user Ua and the character object 31 of the distribution user Ub by generating a layer including the animation of the character object of the distribution user Ua, and by superimposing the layer on the moving image including the character object 31 of the distribution user Ub. The co-starring moving image including the character object of the distribution user Ua and the character object 31 of the distribution user Ub is generated, and thus, in the case of using the moving image distribution system 1 from a spot at which the distribution user Ua and the distribution user Ub are separated from each other, it is possible to virtually perform the co-starring in the co-starring moving image. In a case where the sound data is acquired without acquiring the face motion data (and the body motion data) from the distribution user Ua, the co-starring application processing unit 61e is capable of generating the co-starring moving image including the character object 31 of the distribution user Ub and the sound of the distribution user Ua by superimposing the sound to be generated based on the sound data that is acquired from the distribution user Ua on the moving image including the character object 31 of the distribution user Ub. Even in a case where the model data for the distribution user Ua is not set as the model data 63a, the co-starring application processing unit 61e is capable of generating the co-starring moving image including the character object 31 of the distribution user Ub and the sound of the distribution user Ua by superimposing the sound to be generated based on the sound data that is acquired from the distribution user Ua on the moving image including the character object 31 of the distribution user Ub. As described above, the distribution user Ua is capable of performing the co-starring with the distribution user Ub by the user's own sound.

In a case where the face motion data is not capable of being acquired from the distribution user Ua, the co-starring application processing unit 61e is capable of generating the co-starring moving image including the character object of the distribution user Ua and the character object 31 of the distribution user Ub by distributing the co-starring moving image including the sound of the distribution user Ua and the character object 31 of the distribution user Ub, and then, by generating the character object of the distribution user Ua based on the face motion data of the distribution user Ua at a timing when the face motion data is acquired from the distribution user Ua. As described above, the co-starring application processing unit 61e is capable of switching the co-starring moving image including the sound of the distribution user Ua and the character object 31 of the distribution user Ub to the co-starring moving image including a character object 131 of the distribution user Ua and the character object 31 of the distribution user Ub. On the contrary, the co-starring application processing unit 61e is capable of switching the co-starring moving image including the character object 131 of the distribution user Ua and the character object 31 of the distribution user Ub to the co-starring moving image including the sound of the distribution user Ua and the character object 31 of the distribution user Ub. As described above, the co-starring moving image in which the co-starring is performed by the sound (may be referred to as a "sound co-starring moving image") and the co-starring moving image in which co-starring is performed by the character object (may be referred to as a "character co-starring moving image") may be alternately switchable.

The generated co-starring moving image is distributed by the moving image distribution unit 61c. The co-starring moving image may be prepared by the distribution user device 20a. In a case where the co-starring moving image is generated by the distribution user device 20a, the co-starring moving image is transmitted to the server device 60 from the distribution user device 20a, and is distributed by the moving image distribution unit 61c of the server device 60.

Figure 9:
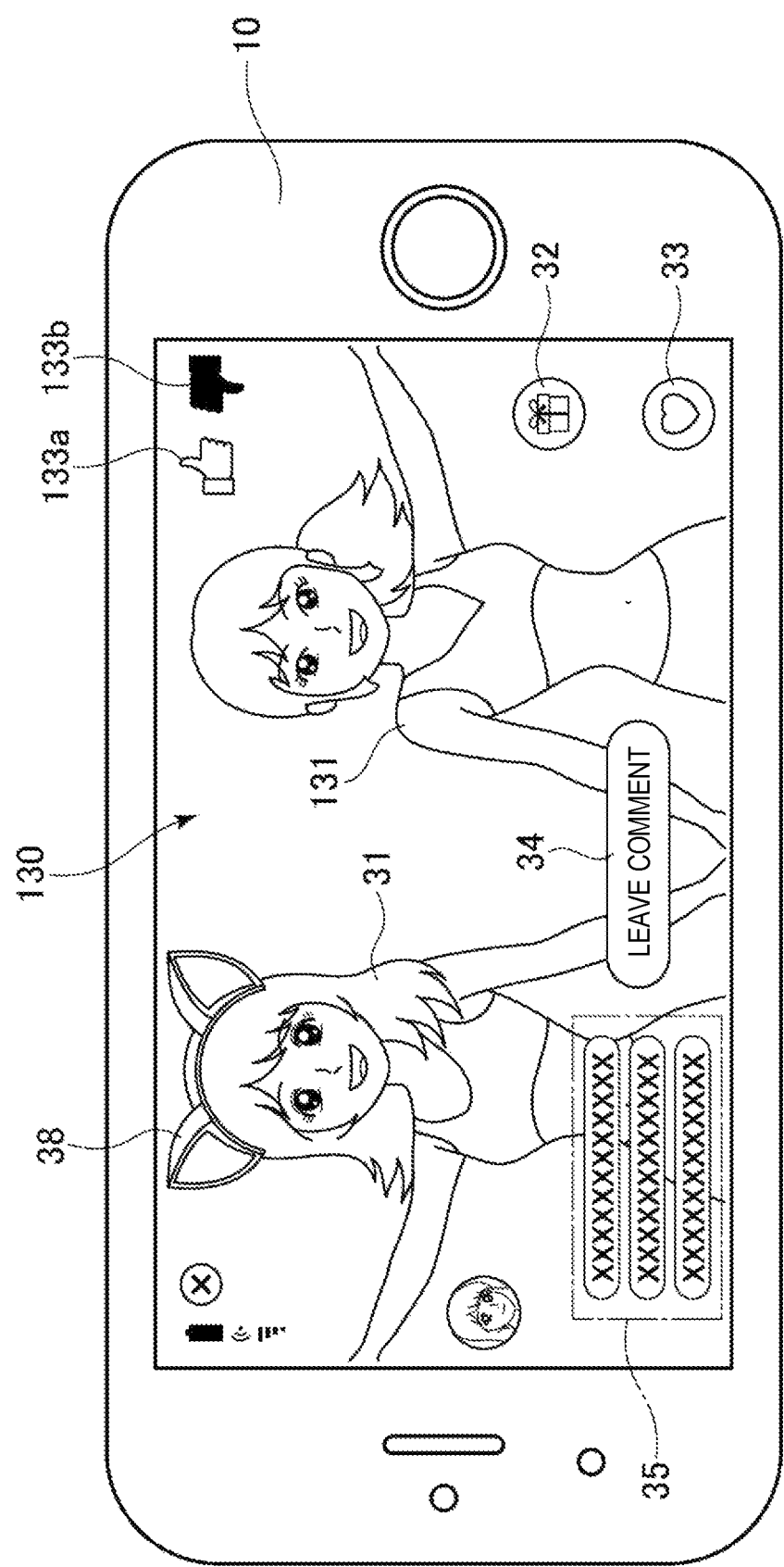
FIG. 9 is a diagram illustrating an example of a display screen of a co-starring moving image that is displayed on the viewing user device in one embodiment.
Figure 10B:
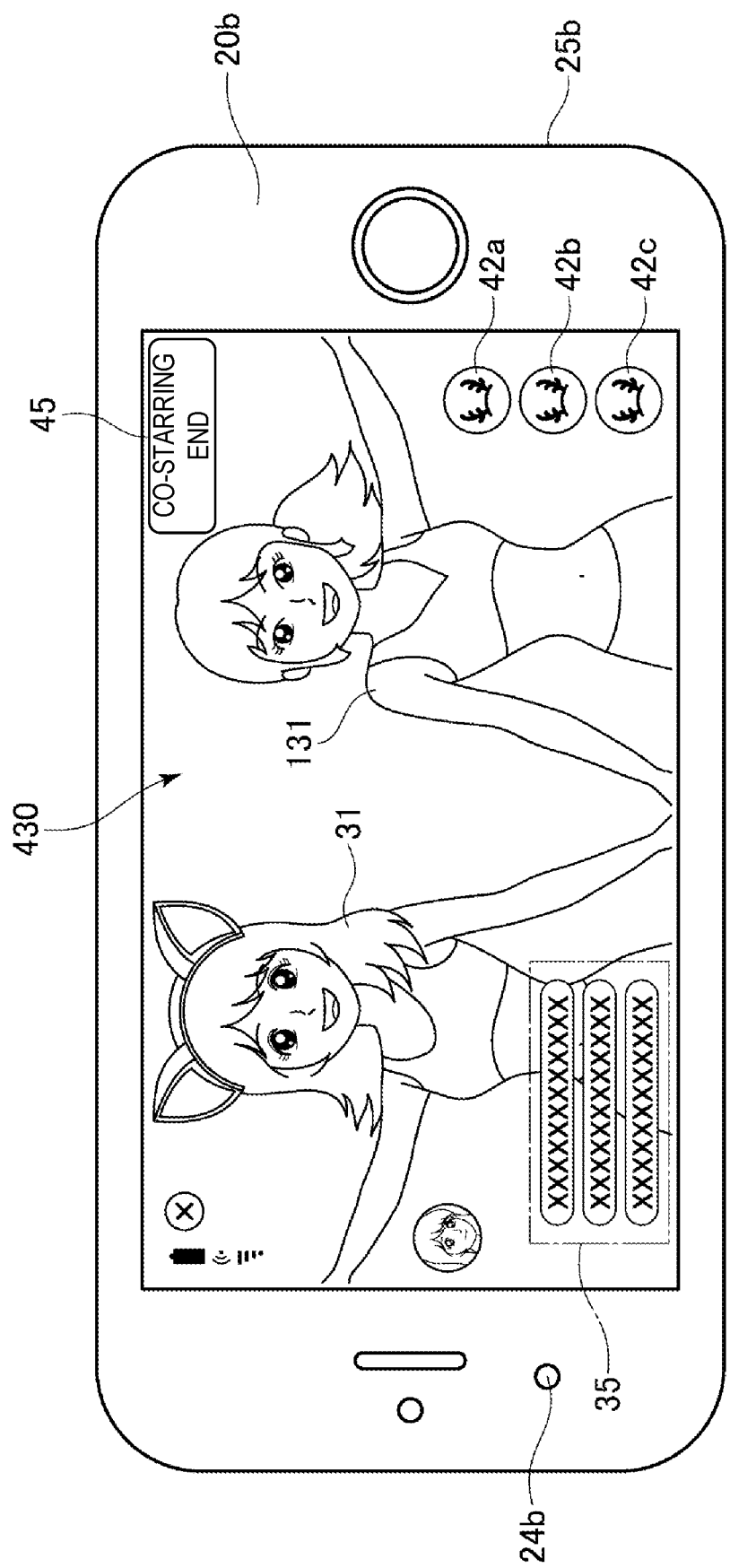
FIG. 10B is a diagram illustrating an example of a display screen of a co-starring moving image that is displayed on the distribution user device in one embodiment.

A display example of the co-starring moving image that is distributed from the moving image distribution unit 61c is illustrated in FIG. 9, and FIG. 10A and FIG. 10B. In such drawings, it is assumed that the co-starring application with respect to the distribution user Ub from the distribution user Ua is allowed, and thus, the co-starring moving image including the character object 131 of the distribution user Ua and the character object 31 of the distribution user Ub is distributed.

As illustrated in FIG. 9, in the display of the viewing user device 10, an image 230 of the co-starring moving image that is distributed from the server device 60 is displayed. The image 230 of the co-starring moving image that is displayed in the display of the viewing user device 10 includes a character object 131 of the distribution user Ua, in addition to the character object 31 of the distribution user Ub. As described above, the character object 131 of the distribution user Ua is generated in the animation generation unit 61a or the co-starring application processing unit 61e. The image 230 of the co-starring moving image includes the gift button 32, the evaluation button 33, the comment button 34, and the comment display region 35, as with the original distribution image illustrated in FIG. 5. In addition, the image 230 of the co-starring moving image may include guest evaluation buttons 133a and 133b. The guest evaluation button 133a is a button for transmitting positive evaluation information indicating positive evaluation with respect to the guest user (in the illustrated example, the distribution user Ua is the guest user) to the server device 60, and the guest evaluation button 133b is a button for transmitting negative evaluation information indicating negative evaluation with respect to the guest user to the server device 60. In a case where the guest evaluation button 133a is selected by the viewing user viewing the moving image, guest evaluation information indicating positive evaluation with respect to the guest user may be transmitted to the server device 60, and in a case where the guest evaluation button 133b is selected, the guest evaluation information indicating the positive evaluation with respect to the guest user may be transmitted to the server device 60. In the server device 60, the guest user evaluation information in the co-starring moving image information 63d may be updated based on the guest evaluation information from the viewing user. Even though it is not illustrated, one or a plurality of host evaluation buttons for performing evaluation with respect to the host user may be displayed along with the co-starring moving image. In a case where the host evaluation button is selected by the viewing user viewing the moving image, host evaluation information indicating positive evaluation or negative evaluation with respect to the host user (the distribution user Ub) may be transmitted to the server device 60. In the server device 60, the host user evaluation information in the co-starring moving image information 63d may be updated based on the host evaluation information from the viewing user. In one embodiment, the host user information of the distribution user transmitting the invitation (for example, the distribution user Ub) may be generated based on the co-starring moving image information 63d, in addition to the user information 63c or instead of the user information 63c. For example, the host user information of the distribution user Ub may include the host user evaluation information of the co-starring moving image information 63d, or may be generated based on the score that is generated based on the host user evaluation information, and as necessary, other information items. The host user evaluation information reflects the positive or negative feedback from the viewing user with respect to the action as the host user in the co-starring moving image. The distribution user who has received the invitation is capable of performing the co-starring with an excellent host user by performing the co-starring application when the host user evaluation information of the distribution user who has transmitted the invitation is a high value (that is, in a case where the distribution user obtains high evaluation as the host user).

The image 230 of the co-starring moving image is a horizontal image, as illustrated. The co-starring application processing unit 61e or the moving image distribution unit 61c may distribute the co-starring moving image as a horizontal moving image. Accordingly, the image 230 of the co-starring moving image is displayed on the viewing user device 10, as the horizontal image. In one embodiment, as illustrated in FIG. 5, even in a case where the original moving image (image) is a vertical image, the co-starring moving image is distributed by being converted into the horizontal image. The co-starring moving image includes the character objects of two distribution users, and thus, character objects of two users are likely to be displayed without an overlap by setting the horizontal image. For example, in the co-starring moving image, the left half from the viewpoint of the viewing user may be set to a region that is allocated to the character object of the original distribution user, and the right half may be set to a region that is allocated to the character object of the distribution user performing the co-starring application. The allocation of the region with respect to each of the distribution users may be arbitrarily determined such that the character objects do not overlap with each other.

As illustrated in FIG. 10A, an image 330 of the co-starring moving image that is distributed from the server device 60 is displayed on the distribution user device 20a of the distribution user Ua. The image 330 of the cc-starring moving image that is displayed on the distribution user device 20a includes the same background image, the same character object image, and the same comment as those of the image 230 of the co-starring moving image that is displayed on the viewing user device 10. On the other hand, the image 330 of the co-starring moving image is different from the image 230 in that the gift button 32, the evaluation button 33, the comment button 34, and the co-starring application button 36 are not provided, but the display instruction buttons 42a to 42c are provided.

A benefit display button 142 may be displayed in the image 330 of the co-starring moving image that is displayed on the distribution user device 20a. The benefit display button 142 is displayed in the image 330 such that the benefit display button 142 can be selected by the distribution user Ua. The benefit display button 142, for example, is displayed in the image 330 in a case where the host user information includes the benefit information, and the benefit is an object that can be displayed in the moving image. In this case, the benefit display button 142 is associated with an object that is a benefit acquired by the distribution user Ua performing the co-starring application in accordance with the invitation from the distribution user Ub. The benefit display button 142 may be selected, and thus, the object associated with the benefit display button 142 may be displayed in the co-starring moving image. For example, the object may be an object indicating an accessory that can be attached to the character. In this case, the benefit display button 142 is selected, and thus, an accessory that is the object associated with the display instruction button is attached to the character. In a case where the host user information does not include the benefit information, the benefit display button 142 may not be displayed in the image 330.

In a case where the host user information of the distribution user Ub that is associated with the invitation received by the distribution user Ua includes the benefit information, as described above, a benefit is offered to the distribution user Ua at least one of when the co-starring application is performed and when the co-starring is performed. The benefit that is offered to the distribution user Ua may be changed in accordance with the evaluation with respect to the co-starring moving image after the distribution of the co-starring moving image is started. For example, in a case where a point of 100 points that is used in the distribution system 1 is offered as the benefit information, it is possible to increase the point when the evaluation of the co-starring moving image is high. The evaluation of the co-starring moving image may be determined based on the evaluation update information transmitted by selecting the evaluation button 33 after the distribution of the co-starring moving image is started. In another embodiment, the benefit that is offered to the distribution user Ua may be changed in accordance with the evaluation with respect to the distribution user Ua during the distribution of the co-starring moving image. The evaluation with respect to the distribution user Ua during the distribution of the co-starring moving image may be determined based on the guest user evaluation information of the co-starring moving image information 63d.

As illustrated in FIG. 10B, in the display of the distribution user device 20b, an image 430 of the co-starring moving image that is distributed from the server device 60 is displayed. The image 430 of the co-starring moving image that is displayed on the distribution user device 20b includes the same background image, the same character objects 31 and 131, the same comment display region 35, and the same display instruction buttons 42a to 42c as those of the image 330 that is displayed on the distribution user device 20a of the distribution user Ua who is the co-starring partner. On the other hand, a co-starring end button 45 for ending the co-starring is displayed in the image 430. In one embodiment, the co-starring end button 45 may be displayed not only in the image 430 of the co-starring moving image on the distribution user device 20b of the distribution user Ub who has received the co-starring application, but also in the image 330 of the co-starring moving image on the distribution user device 20b of the distribution user Ua performing the co-starring application. In a case where the co-starring end button 45 is selected, in the co-starring moving image, processing for ending the co-starring with the distribution user Ua is performed. For example, a co-starring end instruction is transmitted to the server device 60 from the distribution user device 20b, in accordance with the selection of the co-starring end button 45 in the distribution user device 20b. The distribution user Ub is capable of setting the distribution user Ua who is the guest user while the co-starring moving image is reproduced, as a co-starring prohibited user. For example, when the distribution user Ua performs undesirable action or behavior in the co-starring moving image, it is possible to set the distribution user Ua as the co-starring prohibited user. The distribution user Ua may be set as the co-starring prohibited user by recording the user ID of the distribution user Ub in appearance prohibition information of the user information 63c of the distribution user Ua. In a case where the co-starring end instruction is received from the distribution user device 20b, the server device 60, for example, is capable of automatically registering the distribution user Ua in the user information 63c of the distribution user Ub, as the co-starring prohibited user. The distribution user Ub may set as the distribution user Ua as an appearance prohibited user, other than when the co-starring moving image is reproduced. For example, the distribution user Ua may be set as the appearance prohibited user, in accordance with the check of the posting of an undesirable message of the distribution user Ua in a messaging service provided by the moving image distribution system 1. On the contrary to the example described above, when the distribution user Ub performs undesirable action or behavior, the host user may be set as the co-starring prohibited user, in accordance with the selection of the co-starring end button 45 in the distribution user device 20a.

In the image 430 of the co-starring moving image on the distribution user device 20b of the distribution user Ub who is the host user, an alarm button (not illustrated) for offering an alarm to the guest user may be displayed. The alarm button may be displayed in the image 330 of the co-starring moving image on the distribution user device 20a of the distribution user Ua who is the guest user. Unlike the co-starring end button 45, the alarm button does not immediately end the co-starring, but it is assumed that the alarm button is selected in a case where the guest user performs undesirable action with respect to the host user or in a case where the host user performs undesirable action with respect to the guest user. In a case where the alarm button is selected in the distribution user device of the host user (for example, the distribution user device 20b of the distribution user Ub), an alarm instruction is transmitted to the server device 60 from the distribution user device 20b. In a case where the alarm button is selected in the distribution user device of the host user, alarm information indicating an alarm from the host user may be displayed in the image 330 of the co-starring moving image that is displayed on the distribution user device of the guest user (for example, the distribution user device 20a of the distribution user Ua). The alarm information may be displayed in the image 230 on the viewing user device 10. A co-starring moving image including the alarm information may be generated in the server device 60. It is possible to indicate that the host user deals with undesirable action of the guest user with respect to the viewing user, by displaying the alarm information in the image 230 of the viewing user. The server device 60 may perform processing for ending the co-starring between the host user and the guest user when the number of times of performing the alarm instruction with respect to a certain guest user from a certain host user is counted, and the number of times of performing the alarm instruction is set to a predetermined number of times (for example, 3 times). The number of times of performing the alarm instruction with respect to a certain guest user from a certain host user may be stored as the user information 63c in association with the user account of the host user. Processing for ending the co-starring based on the alarm instruction performed greater than or equal to a predetermined number of times may be processing identical to the processing for ending the co-starring based on the co-starring end instruction described above.

The co-starring application processing unit 61e may issue a moving image ID for identifying the prepared co-starring moving image. The co-starring moving image information relevant to the co-starring moving image can be stored in the storage 63, in association with the moving image ID. As described above, the co-starring time information of the co-starring moving image may be updated in association with the moving image ID of the co-starring moving image that is distributed. A distribution time of the co-starring moving image in the moving image distribution unit 61c may be monitored, and the co-starring time information may be updated based on a monitoring result.

The guest user evaluation information in the co-starring moving image information may be updated based on the positive evaluation information indicating the positive evaluation with respect to the distribution user Ua who is the guest user from the viewing user device 10 and the negative evaluation information indicating the negative evaluation with respect to the distribution user Ua. For example, the server device 60 may increase the guest user evaluation point in a case where the positive evaluation information indicating the positive evaluation with respect to the distribution user Ua from the viewing user device 10 is received, and may decrease the guest user evaluation point in a case where the negative evaluation information indicating the negative evaluation with respect to the distribution user Ua is received. In a case where the viewing user stops the viewing of the co-starring moving image in the middle of the viewing, there is a possibility that the viewing user does not satisfy with the co-starring moving image. Accordingly, in a case where the viewing user stops the viewing of the co-starring moving image in the middle of the viewing, the guest user evaluation point of the guest user may be decreased by assuming that there is negative evaluation with respect to the guest user. At least one of the positive evaluation information and the negative evaluation information may be updated to decrease over time. For example, even in a case where the distribution user Ua includes the positive evaluation information of 100 points at a certain time, the positive evaluation information may be updated to approach zero over time. In a case where the negative evaluation information with respect to a certain user is greater than a predetermined value, the user may be prohibited from co-starring with the other user. For example, in the image that is displayed on the distribution user device of the user of which the negative evaluation information is greater than the predetermined value, processing for not displaying the co-starring application button may be performed.

In a case where a co-starring end condition for ending the co-starring between the distribution user Ua who is the guest user and the distribution user Ub who is the host user is satisfied, the co-starring end processing unit 61f performs the processing for ending the co-starring between the distribution user Ua who is the guest user and distribution user Ub who is the host user. In one embodiment, in a case where the co-starring end instruction is received from the distribution user device 20b of the distribution user Ub who is the host user, the co-starring end processing unit 61f determines that the co-starring end condition is satisfied, and performs processing for ending the distribution of the co-starring moving image. For example, in a case where the co-starring end instruction is received, the co-starring end processing unit 61f stops the generation of the animation of the character object 131 of the distribution user Ua, and generates a moving image including the character object 31 of the distribution user Ub but not the character object 131 of the distribution user Ua. In other words, the character object 131 of the distribution user Ua who is the guest user is excluded from the moving image that is distributed. The character object 131 of the distribution user Ua who is the guest user is excluded, and thus, the co-starring between the distribution user Ua and the distribution user Ub is ended. After the co-starring is ended, the moving image including the character object 31 but not the character object 131 may be continuously distributed. The moving image that is distributed after the co-starring is ended may be, as illustrated in FIG. 5, generated as a vertical moving image. That is, the direction of the moving image may be changed in accordance with the end of the co-starring. In one embodiment, the direction of the moving image may be changed to a vertical direction from a horizontal direction, in accordance with the end of the co-starring. In another embodiment, the distribution of the moving image of the distribution user Ub who is the host user may be ended in accordance with the end of the co-starring. In one embodiment, in a case where the co-starring application from the other user is received in advance when the co-starring with the distribution user Ub is ended, the co-starring application processing unit 61e nay determine the availability of the co-starring of the other user, based on the co-starring application.

In one embodiment, the co-starring end processing unit 61f determines whether or not the character object 131 of the distribution user Ua who is the guest user is in a non-active state, and determines that the co-starring end condition is satisfied in a case where it is determined that the character object 131 is in the non-active state. In one embodiment, whether or not the character object 131 of the distribution user Ua is in the non-active state is determined based on at least one of the face motion data, the body motion data, and the sound data that are received from the distribution user device 20a of the distribution user Ua. Ail of the face motion data, the body motion data, and the sound data are data indicating the motion of the distribution user, and thus, in this specification, such data items may be collectively referred to as "motion data". Whether or not the character object 131 of the distribution user Ua is in the non-active state is determined based on the motion data, that is, based on at least one of the face motion data, the body motion data, and the sound data. For example, in a case where the face motion data is not input for a constant period from the distribution user device 20a of the distribution user Ua, the neutral expression of the character object 131 of the distribution user Ua does not move for the constant period in the co-starring moving image, and thus, it may be determined that the character object 131 is in the non-active state. In a case where the body motion data is not input for a constant period from the distribution user device 20a of the distribution user Ua, the body motion of the character object 131 of the distribution user Ua does not move for the constant period in the co-starring moving image, and thus, it may be determined that the character object 131 is in the non-active state. In a case where the sound data is not input for a constant period from the distribution user device 20a of the distribution user Ua, the character object 131 of the distribution user Ua is silent for the constant period in the co-starring moving image, and thus, it may be determined that the character object 131 is in the non-active state.

In one embodiment, the co-starring end processing unit 61f ends the co-starring by excluding the character object 131 of the distribution user Ua who is the guest user from the moving image in accordance with the co-starring moving image information of the co-starring moving image that is distributed. For example, in a case where the guest user evaluation information is the guest user evaluation point, the co-starring end processing unit 61f is capable of ending the co-starring with the distribution user Ua by excluding the character object 131 of the distribution user Ua from the moving image in a case where the guest user evaluation point is less than a predetermined threshold value. The guest user evaluation point decreases as the negative evaluation information with respect to the distribution user Ua who is the guest user is received from the viewing user. Accordingly, whether or not to end the co-starring with the distribution user Ua is determined based on the guest user evaluation point, and thus, it is possible to prevent the co-starring with a user having low evaluation from the viewing user from being performed for a long period.

Figure 11:
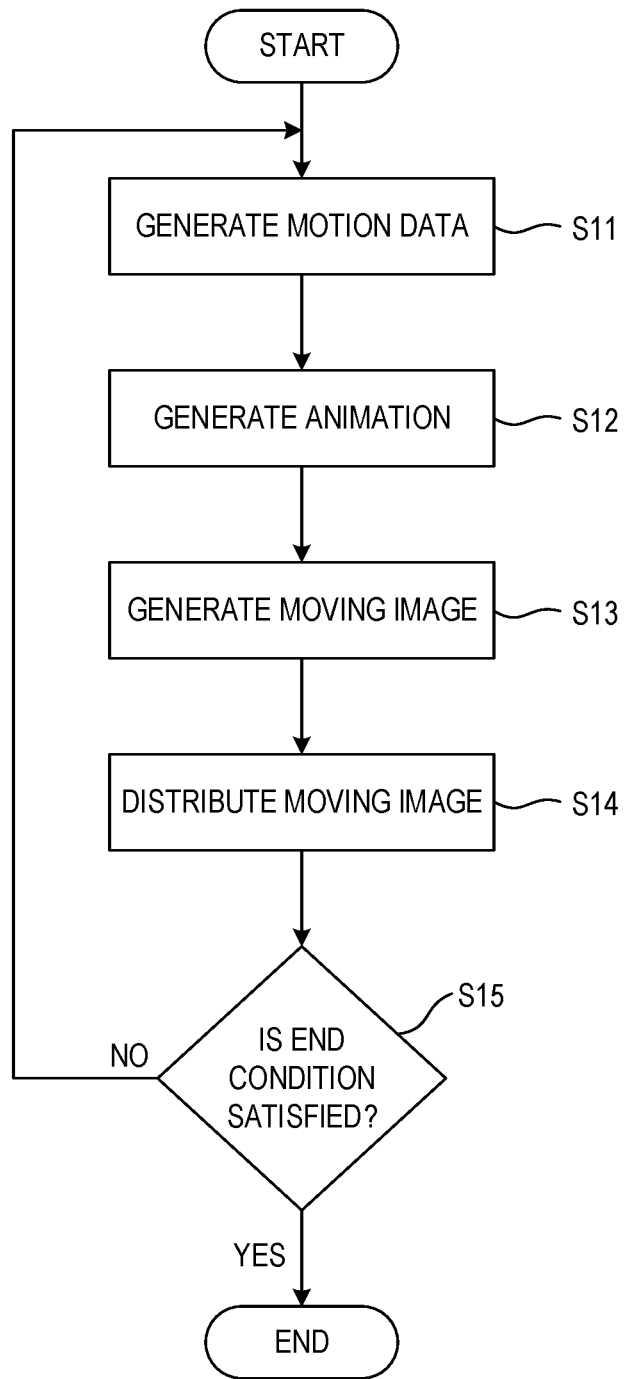
FIG. 11 is a flowchart illustrating a flow of moving image distribution processing according to one embodiment.

Next, moving image distribution processing according to one aspect will be described with reference to FIG. 11. FIG. 11 is a flowchart illustrating a flow of moving image distribution processing in one embodiment; In the moving image distribution processing that is described with reference to FIG. 11, it is assumed that the moving image generated based on the face motion data that is acquired by the distribution user Ub with the distribution user device 20b is distributed.

First, in step S11, the face motion data that is the digital expression of the face motion (the neutral expression) of the distribution user Ub is generated. The face motion data, for example, is generated by a face notion data generation unit 121b of the distribution user device 20b. In the distribution user device 20b, the sound data may be generated based on the sound input from the distribution users Ua and Ub. The face motion data and the sound data that are generated are transmitted to the server device 60.

Next, in step S12, the face motion data is applied to the model data for the distribution user Ub from the distribution user device 20b, and thus, the animation of the character object 31 moving in synchronization with the motion of the neutral expression of the distribution user Ub is generated. The animation, for example, is generated by the animation generation unit 61a described above.

Next, in step S13, the moving image including the animation of the character object 31 of the distribution user Ub is generated. The moving image may be synthesized with the sound of the distribution user Ub. The animation of the character object 31 is displayed by being superimposed on the background image. The moving image, for example, is generated by the moving image generation unit 61b described above.

Next, the processing proceeds to step S14, and the moving image generated in step S13 is distributed. The moving image is distributed to the viewing user device 10, the other viewing user devices, and the distribution user device through the network 50. In a case where the distributed moving image is reproduced in the viewing user device 10, for example, the moving image as illustrated in FIG. 5 is displayed on the viewing user device 10. The moving image is continuously distributed over a predetermined distribution period. The distribution period of the moving image, for example, can be set to 30 seconds, 1 minute, 5 minutes, 10 minutes, 30 minutes, 60 minutes, 120 minutes, and other arbitrary times. The moving image, for example, is distributed by the moving image distribution unit 61c described above.

Next, the processing proceeds to step S15, and whether or not an end condition for ending the distribution of the moving image is satisfied is determined. The end condition, for example, is a condition that it reaches a distribution end time, a condition that the distribution user Ub performs an operation for ending the distribution in the distribution user device 20b, or other conditions. The processing of step S11 to S14 is repeatedly executed insofar as the end condition is satisfied, the moving image including the animation synchronized with the motion of the distribution user Ub or the co-starring moving image in a case where the co-starring with the distribution user Ua is continuously performed is continuously distributed. In a case where it is determined that the end condition is satisfied with respect to the moving image, distribution processing of the moving image is ended.

Figure 12:
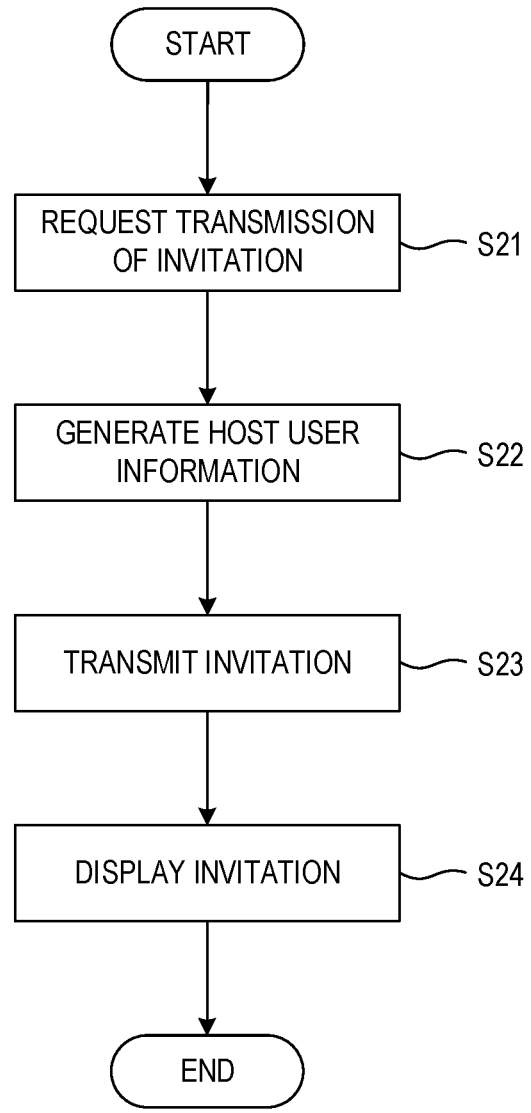
FIG. 12 is a flowchart illustrating a flow of invitation processing with respect to co-starring in one embodiment.

Next, processing for presenting an invitation to the invited user in one embodiment will be described with reference to FIG. 12. FIG. 12 is a flowchart illustrating a flow of processing for performing the invitation of the co-starring in the moving image with respect to the other distribution user from the distribution user distributing the moving image in one embodiment. In distribution processing of the co-starring moving image that is described with reference to FIG. 12, it is assumed that the invitation of the co-starring is performed the with respect to the distribution user Ua viewing the moving image including the character object of the distribution user Ub from the distribution user Ub. Invitation processing of co-starring may be performed in parallel with the distribution processing of the moving image that is illustrated in FIG. 11 or may be performed before the distribution processing of the moving image that is illustrated in FIG. 11 is started.

First, in step S21, the invitation request is transmitted to the server device 60, before the distribution of the moving image including the character object of the distribution user Ub is started or during the distribution. The invitation, request is transmitted to the server device 60 from the distribution user device 20b, in accordance with the operation of the distribution user Ub. Transmission processing of the invitation request, for example, is performed by the invitation request unit 21b2.

Next, in step S22, the host user information of the distribution user Ub is generated based on the invitation request from the distribution user Ub. As described above, the host user information is generated with reference to at least one of the user information 63c and the co-starring moving image information 63d that are stored in the storage 63. Generation processing of the host user information, for example, is performed by the invitation processing unit 61d described above.

Next, in step S23, the invitation for inviting to the co-starring in the moving image of the distribution user Ub is transmitted to one or a plurality of distribution user devices including the distribution user device 20a of the distribution user Ua. In addition, the host user information of the distribution user Ub is transmitted in association with the invitation. Transmission processing of the invitation and the host user information, for example, is performed by the invitation processing unit 61d described above.

Next, in step S24, the invitation is received in the distribution user device 20a of the distribution user Ua. The letter string indicating that the invitation is received from the distribution user Ub, such as "Receive invitation from Ub", and the host user information of the distribution user Ub are displayed on the distribution user device 20a. As described above, the host user information is information that is generated based on the user information 63c, and preferably, is an index representing the attractivity of the distribution user Ub as the co-starring partner. The host user information, for example, is displayed by the invitation presentation unit 21a2 described above. The distribution user Ua is capable of determining whether or not to perform the co-starring application based on the host user information of the distribution user Ub that is displayed on the distribution user device 20a. The distribution user Ua is capable of performing the co-starring application by selecting the co-starring application button 37b that is displayed on the distribution user device 20a, along with the host user information.

Figure 13:
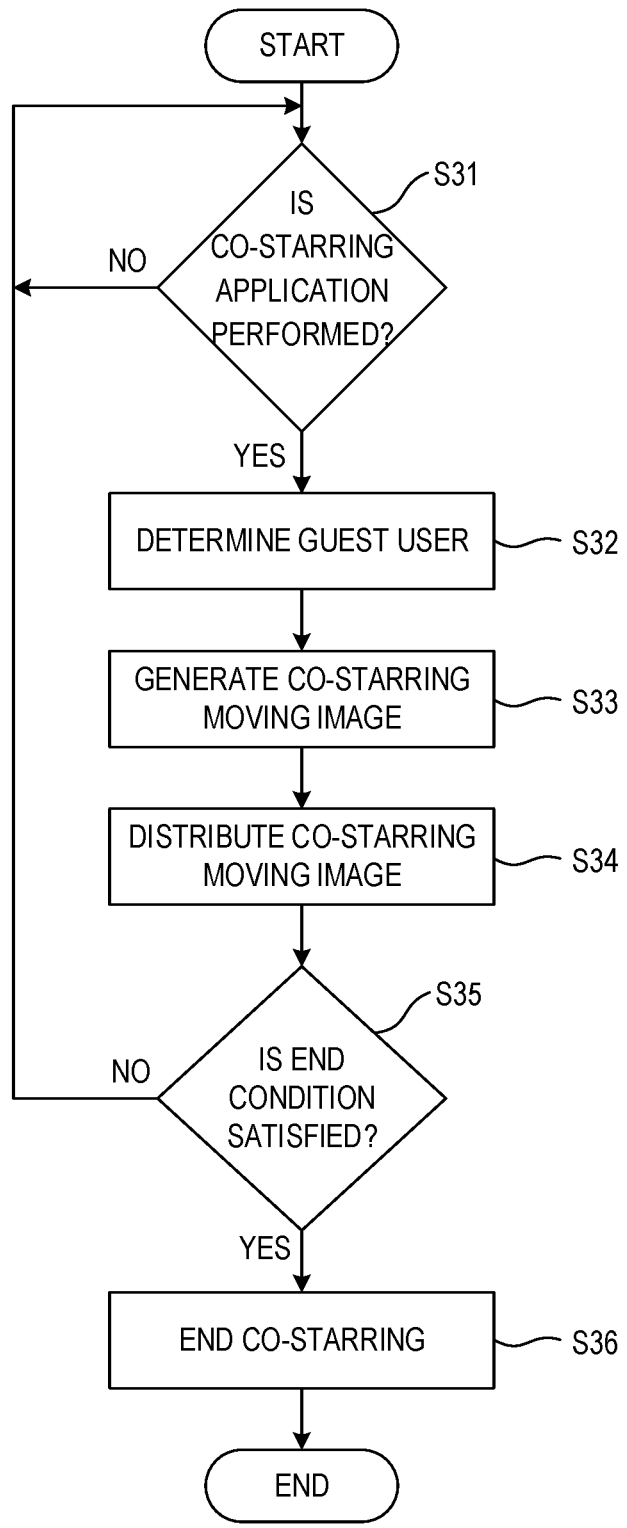
FIG. 13 is a flowchart illustrating a flow of processing for distributing the co-starring moving image in one embodiment.
Figure 14:
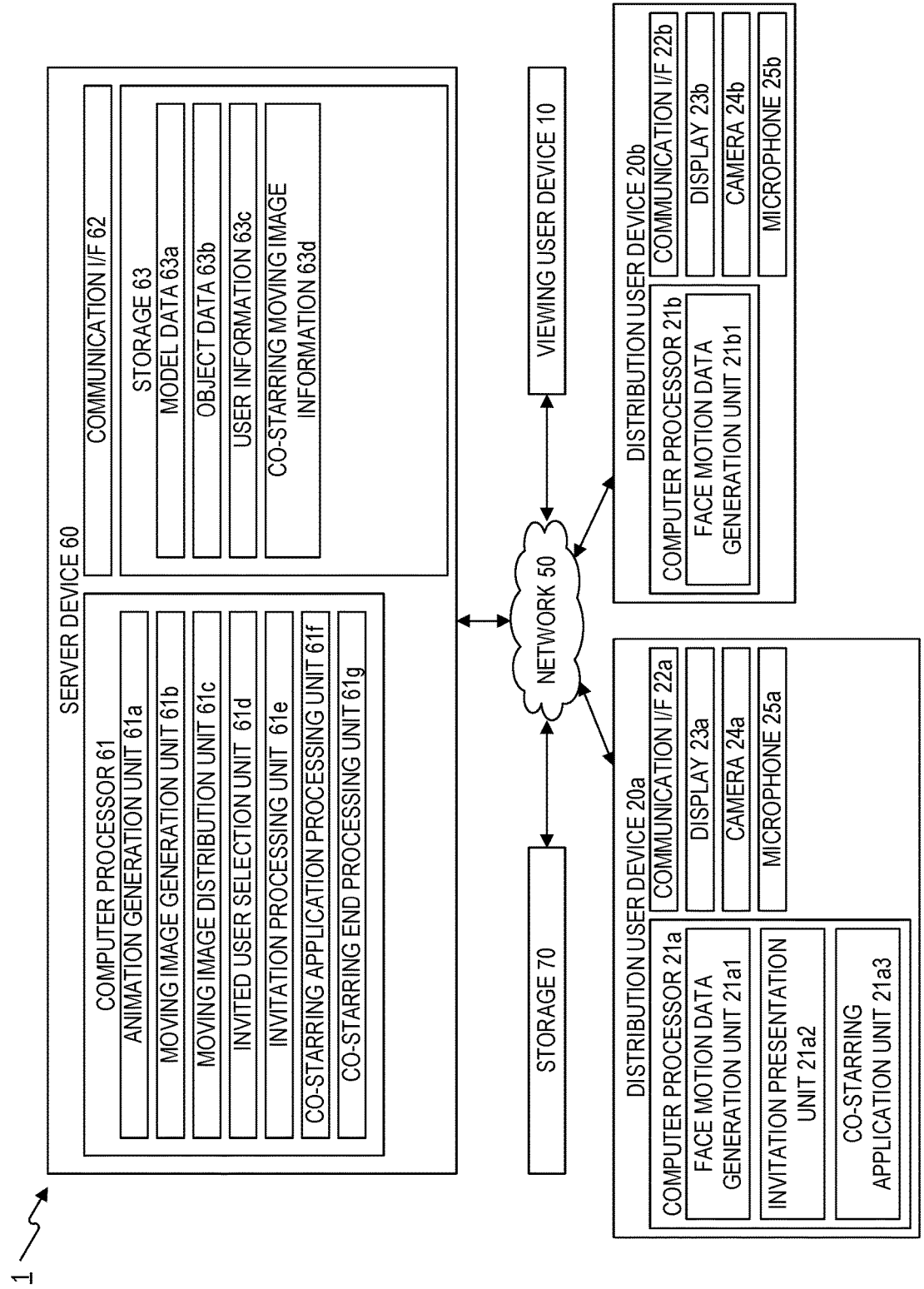
FIG. 14 is a block diagram illustrating a moving image distribution system according to one embodiment.
Figure 15:
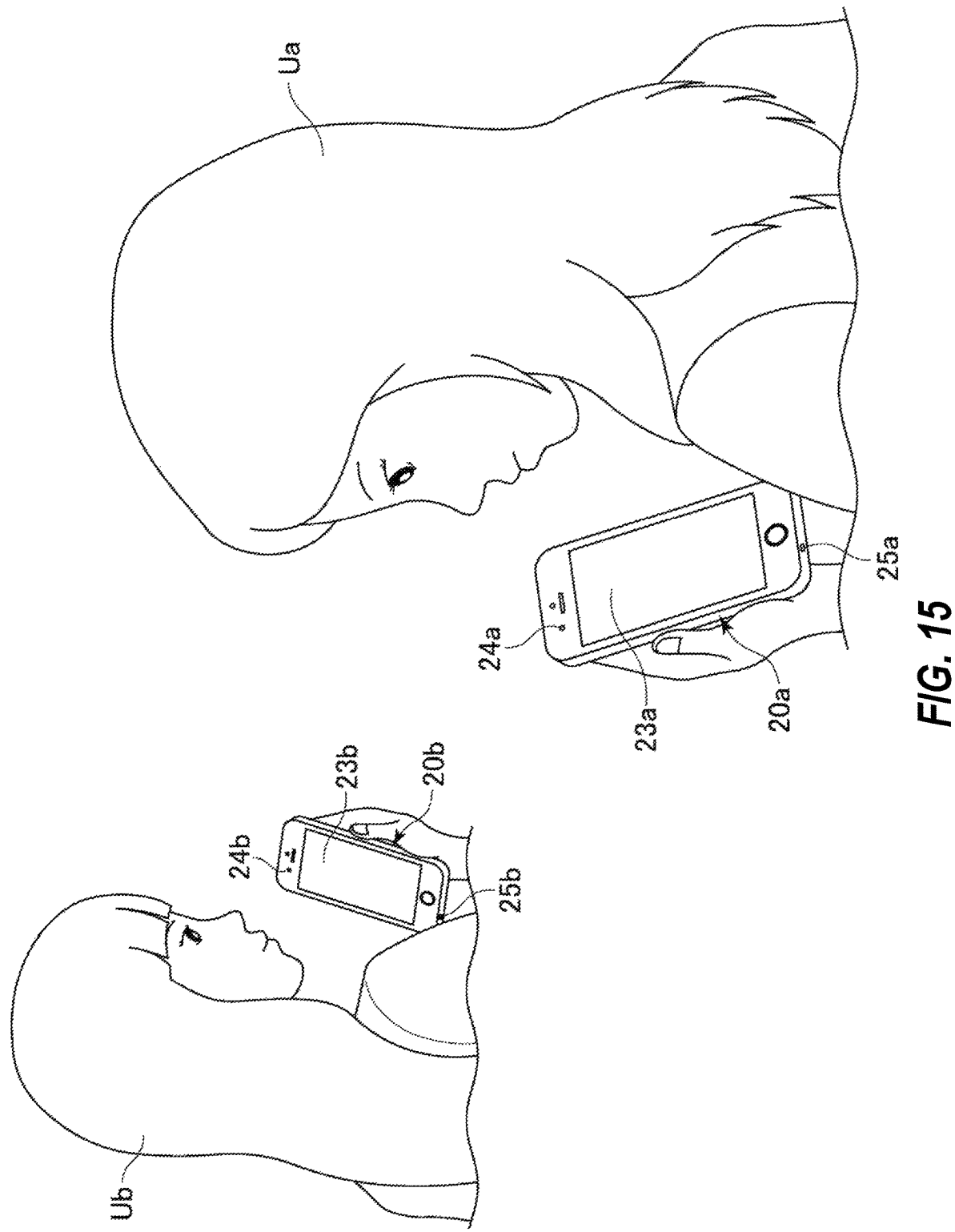
FIG. 15 is a schematic view schematically illustrating a distribution user distributing a moving image that is distributed by the moving image distribution system of FIG. 14 and a distribution user device that is used by the distribution user.
Figure 18:
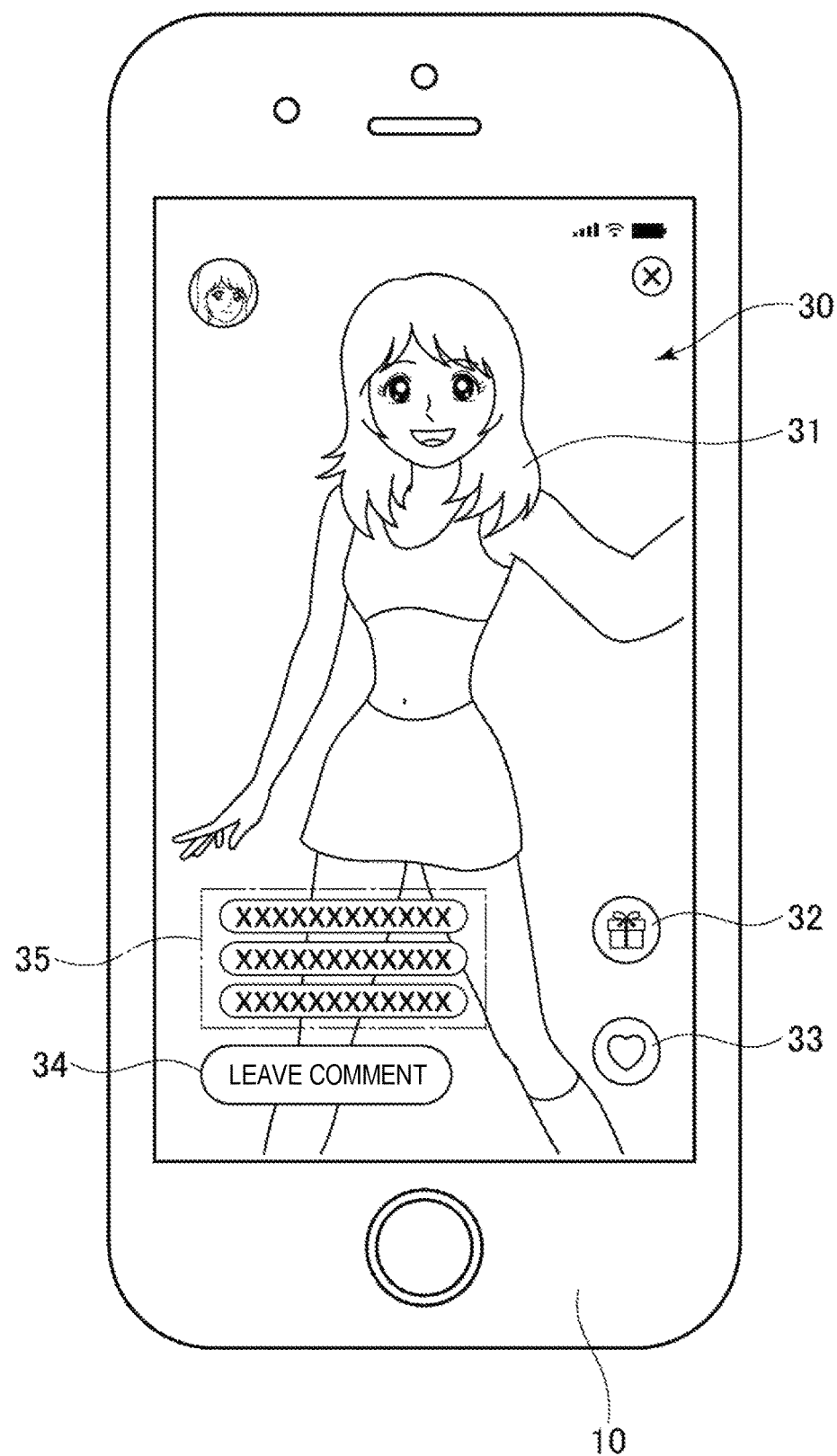
FIG. 18 is a diagram illustrating an example of a display screen that is displayed on a viewing user device in one embodiment.
Figure 19A:
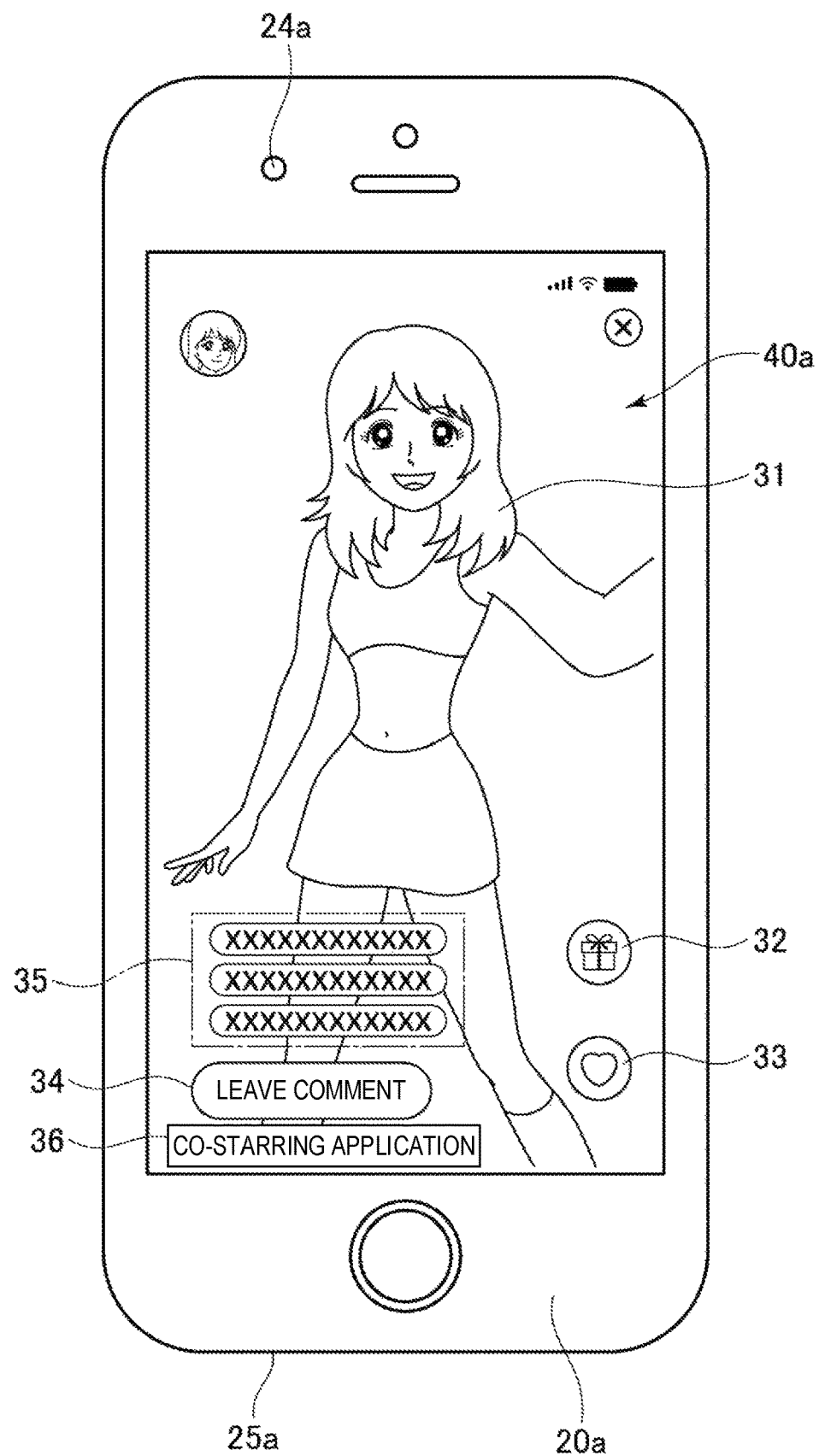
FIG. 19A is a diagram illustrating an example of a display screen that is displayed on a distribution user device in one embodiment.
Figure 19B:
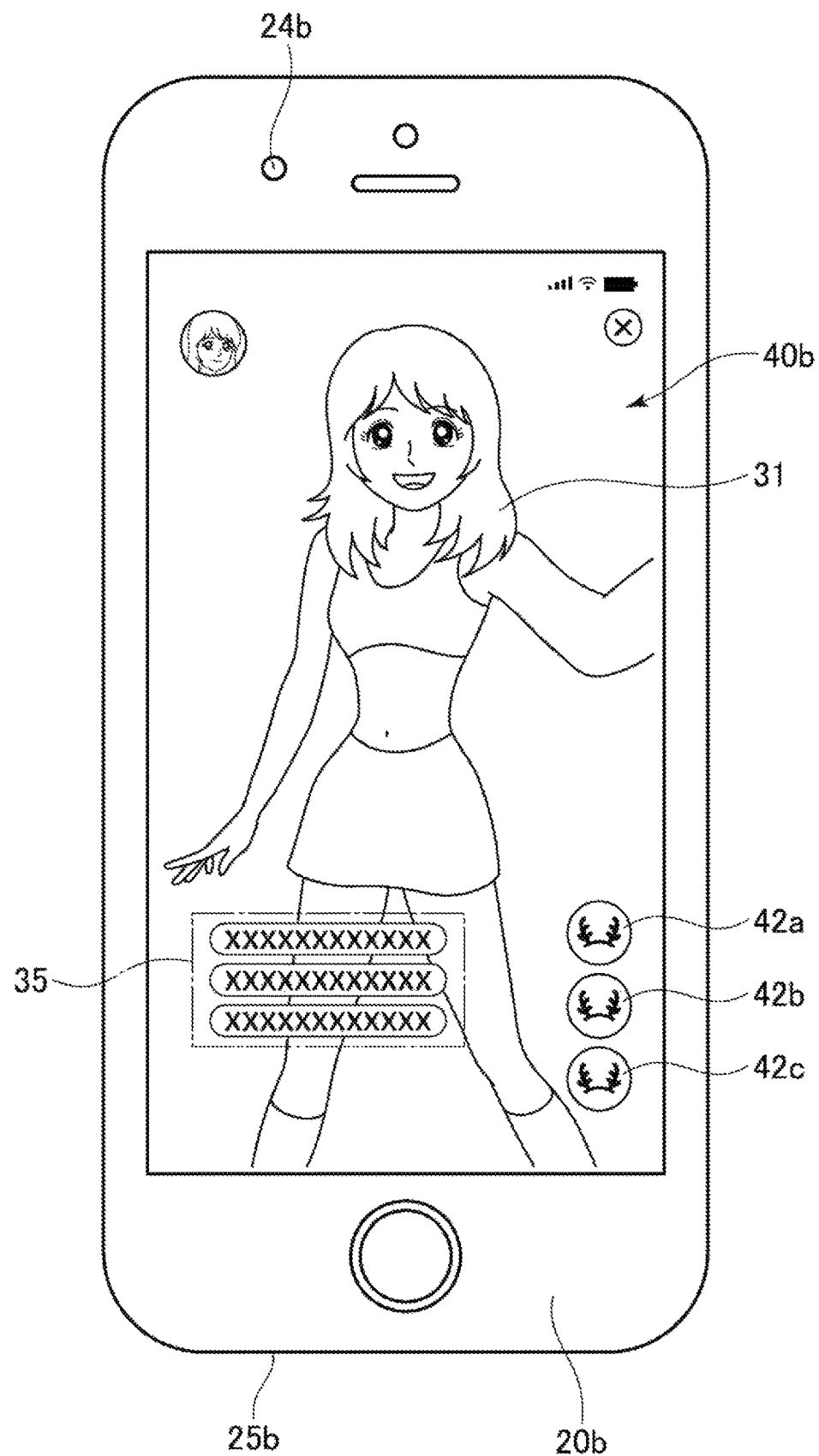
FIG. 19B is a diagram illustrating an example of a display screen that is displayed on a distribution user device in one embodiment.
Figure 20:
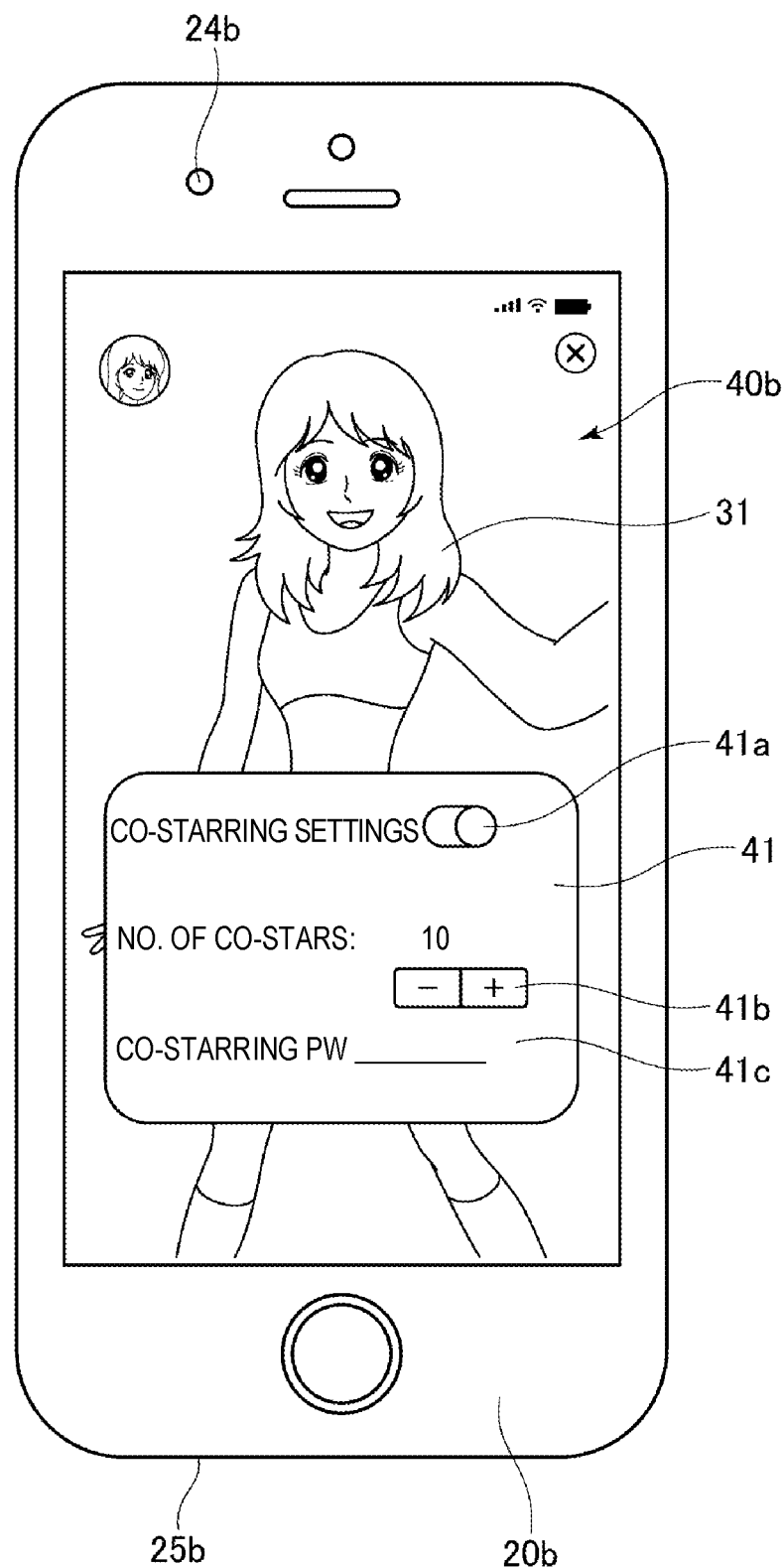
FIG. 20 is a diagram illustrating a setting window that is displayed on the distribution user device.
Figure 21:
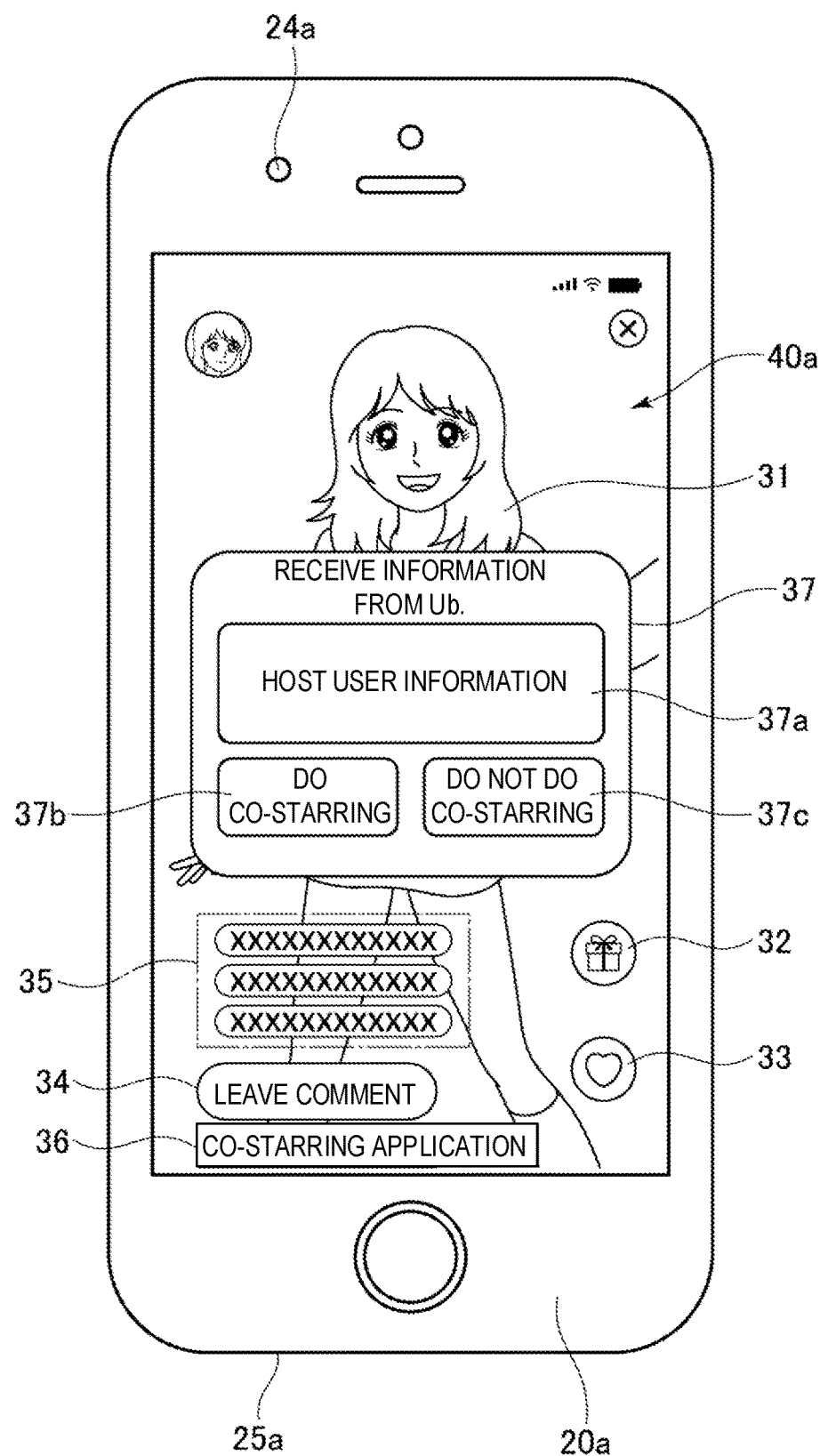
FIG. 21 is a diagram illustrating a display example of an invitation of the distribution user device receiving the invitation.
Figure 22:
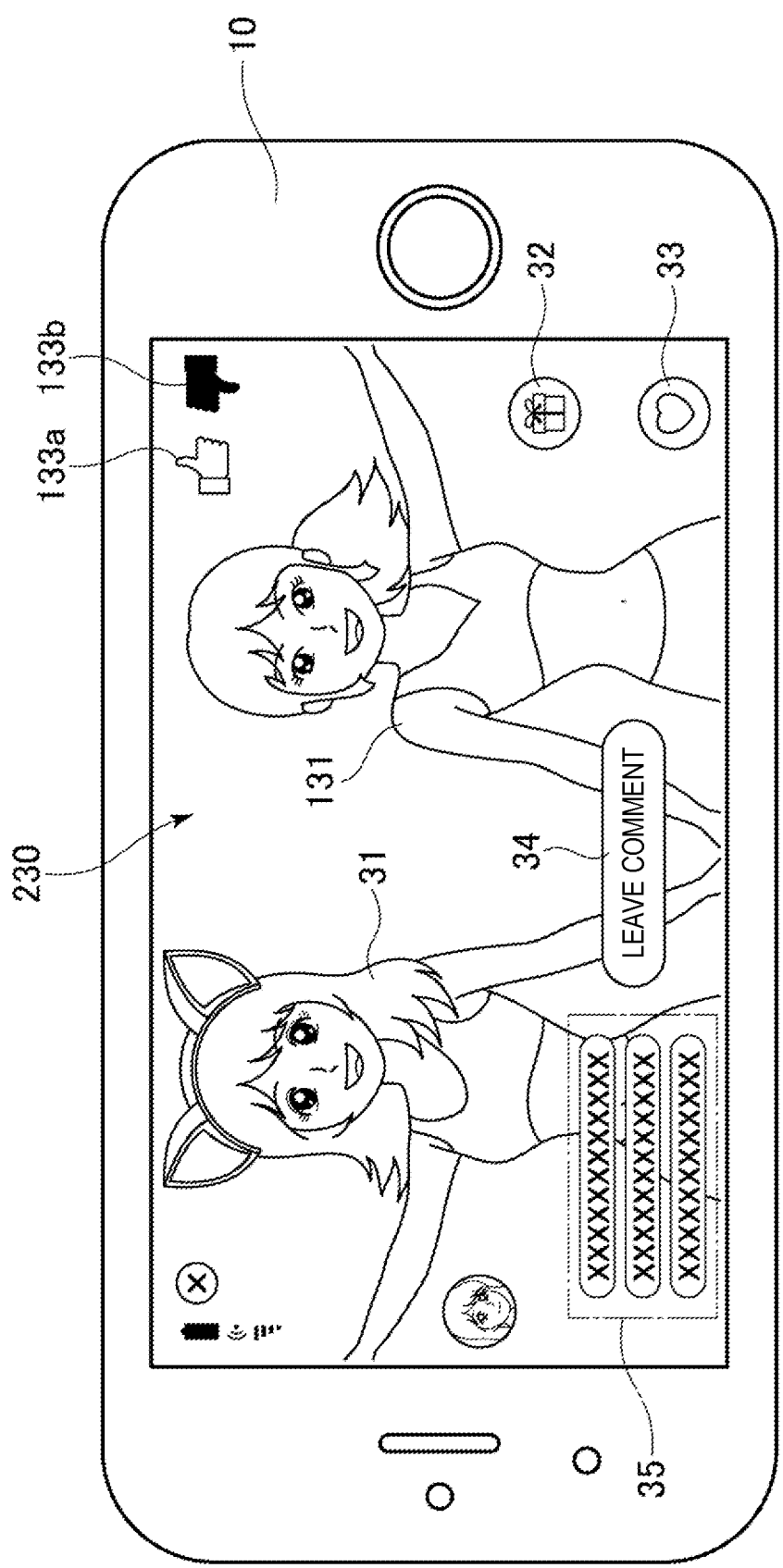
FIG. 22 is a diagram illustrating an example of a display screen of a co-starring moving image that is displayed on the viewing user device in one embodiment.
Figure 23A:
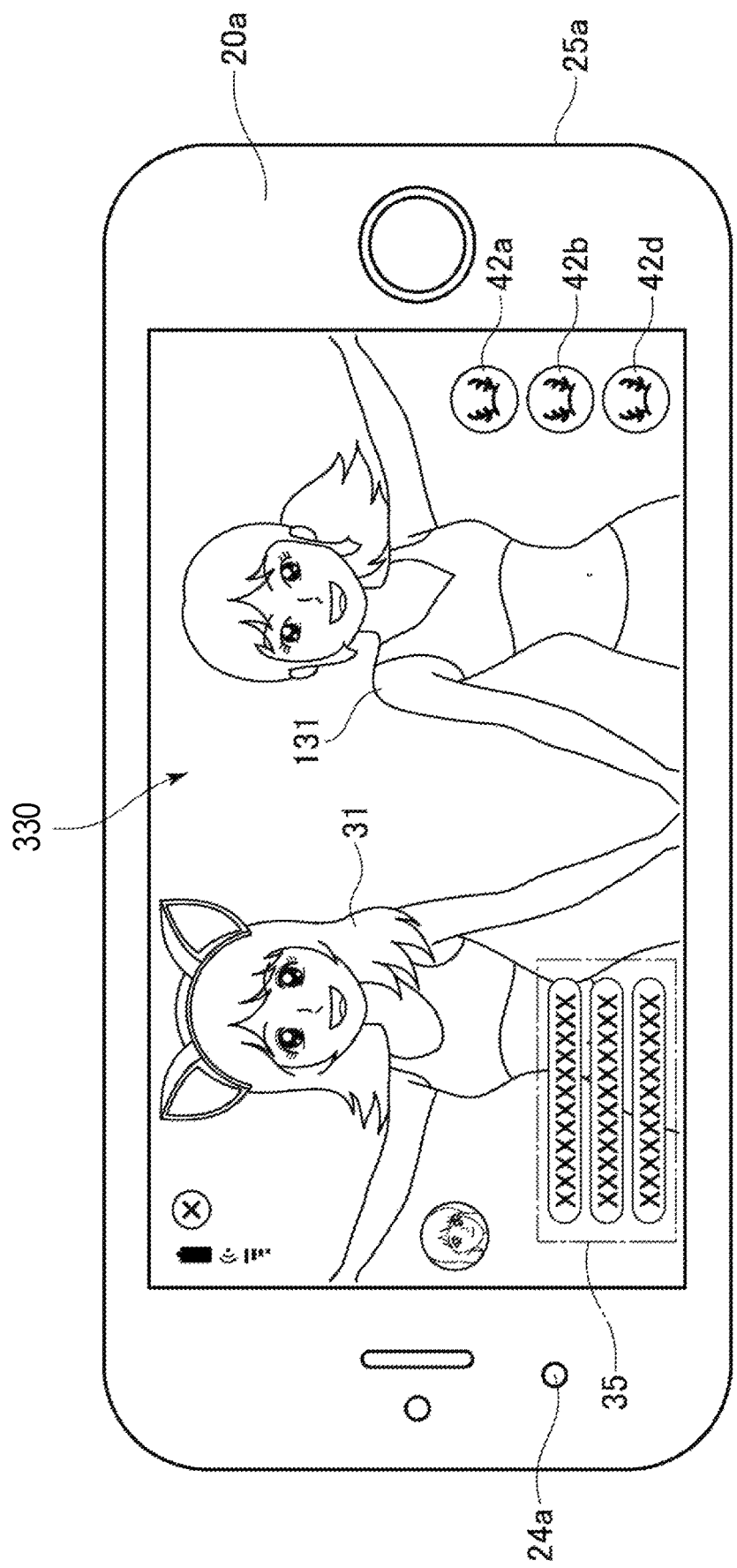
FIG. 23A is a diagram illustrating a display screen of a co-starring moving image that is displayed on the distribution user device in one embodiment.
Figure 23B:
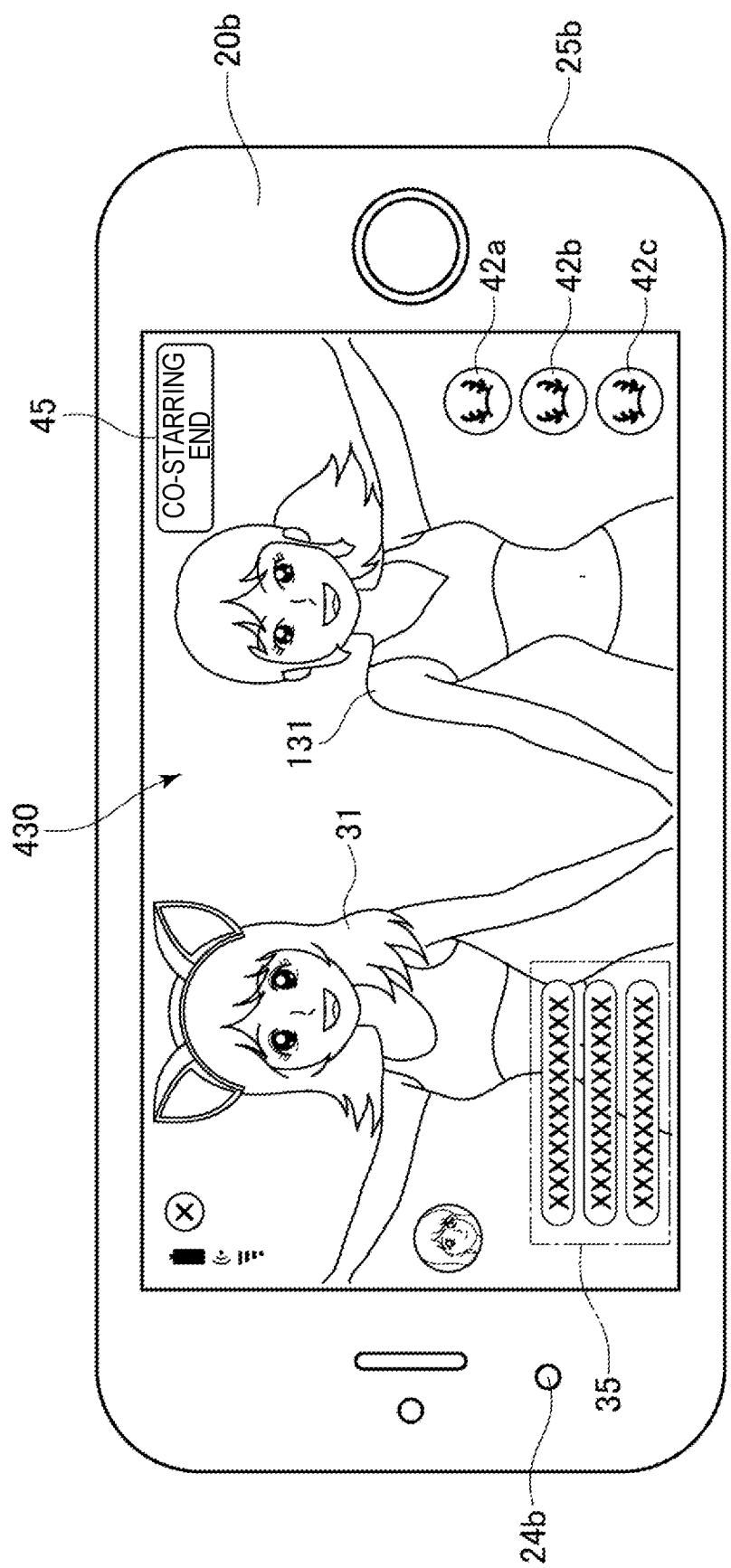
FIG. 23B is a diagram illustrating an example of a display screen of a co-starring moving image that is displayed on the distribution user device in one embodiment.
Figure 24:
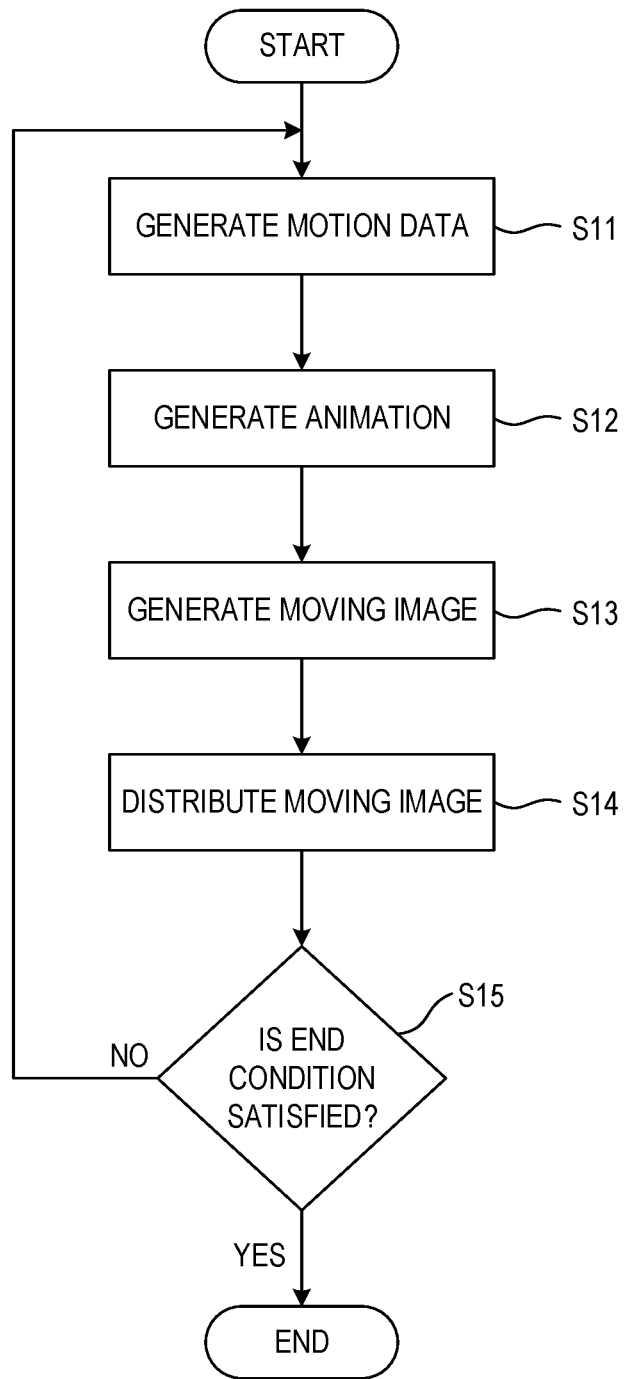
FIG. 24 is a flowchart illustrating a flow of moving image distribution processing according to one embodiment.
Figure 25:
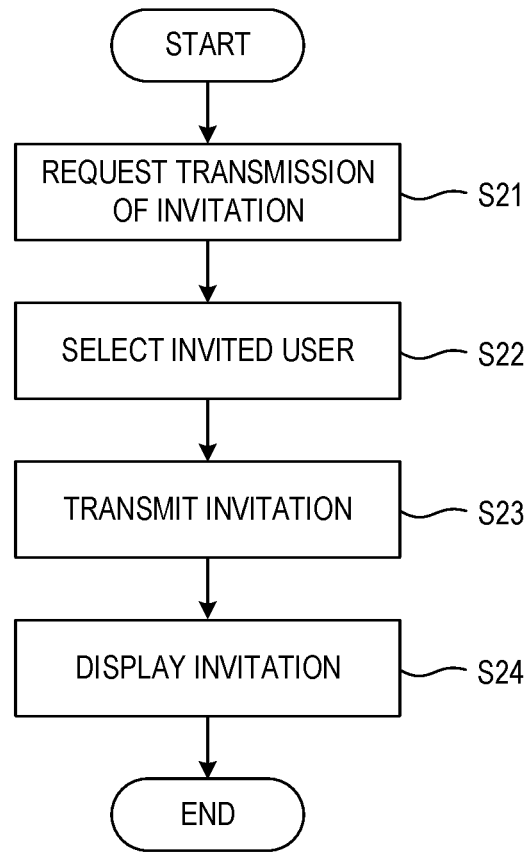
FIG. 25 is a flowchart illustrating a flow of invitation processing with respect to co-starring in one embodiment.
Figure 26:
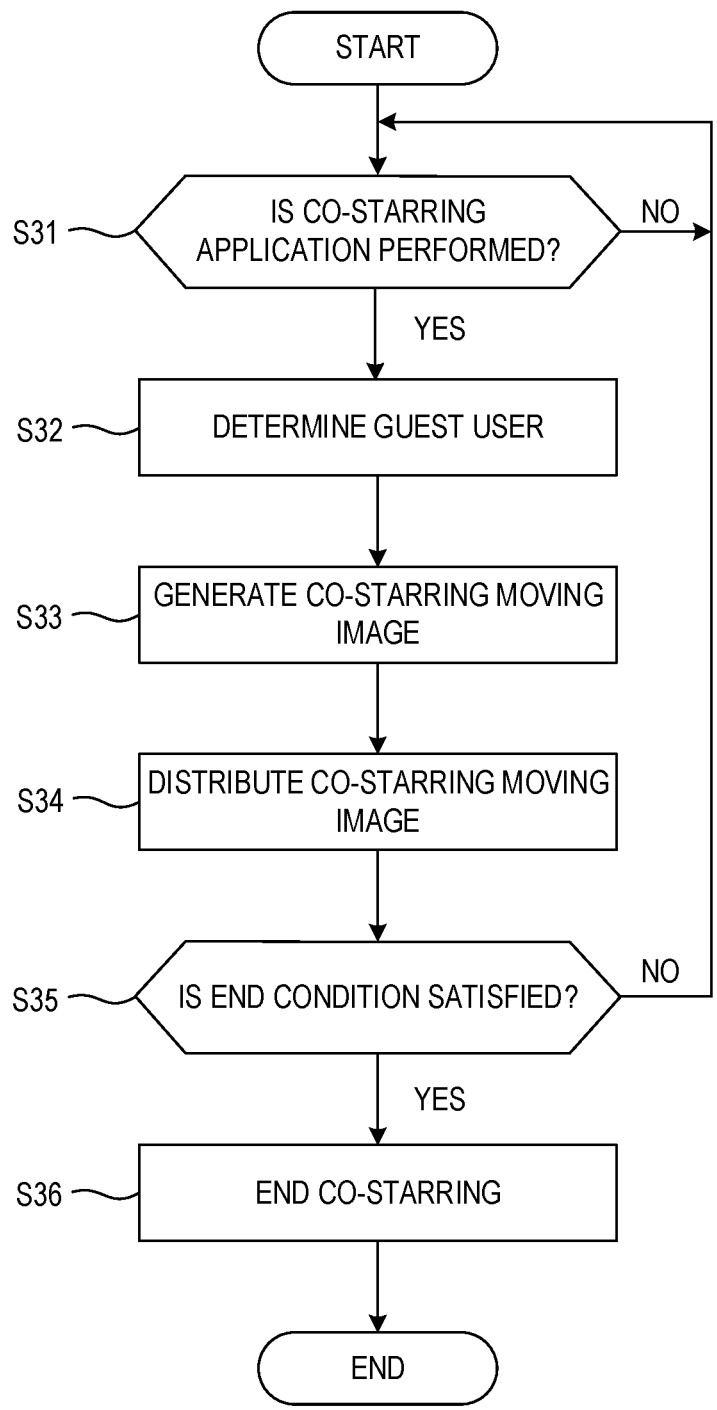
FIG. 26 is a flowchart illustrating a flow of processing for distributing the co-starring moving image in one embodiment.
Figure 27:
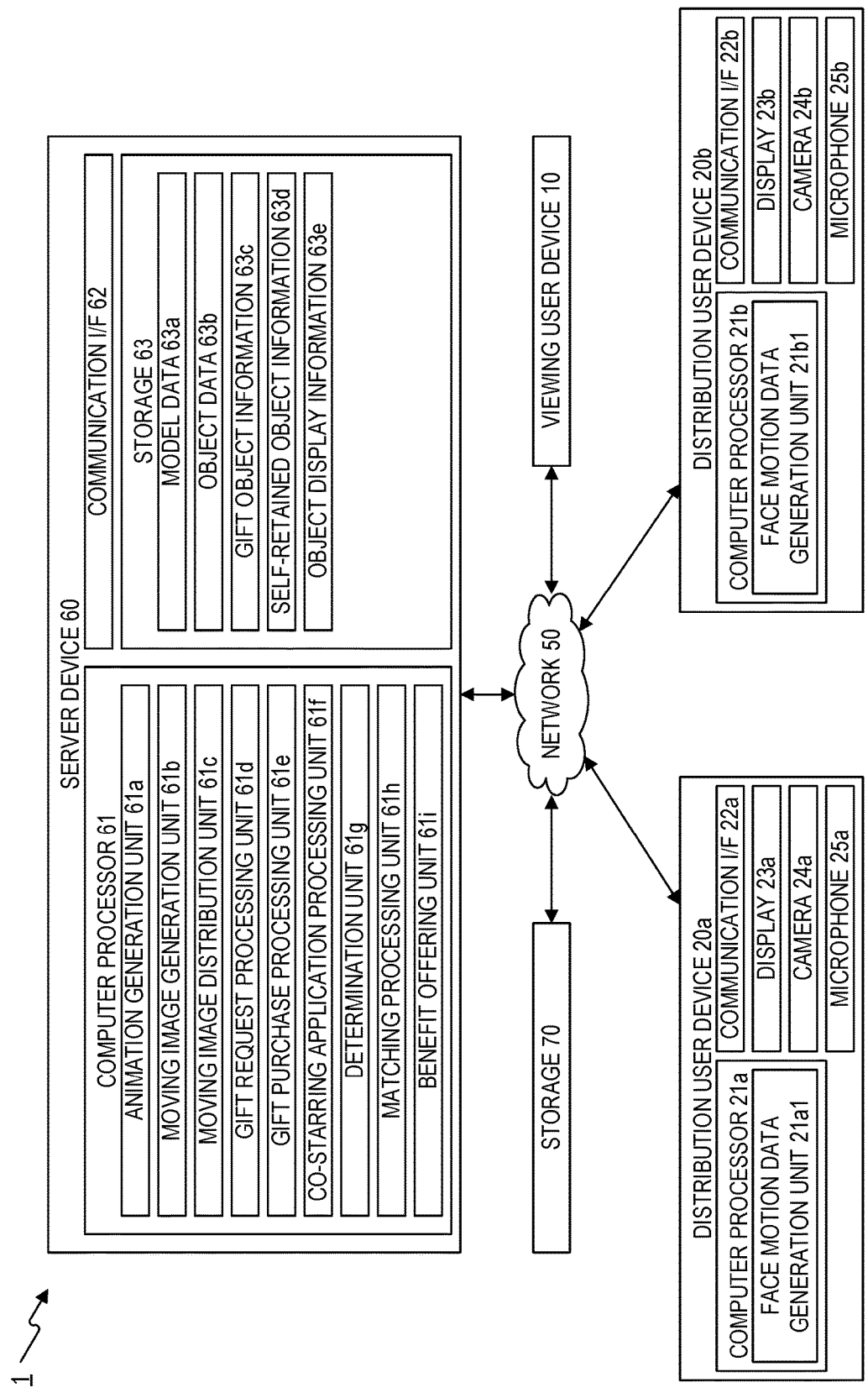
FIG. 27 is a block diagram illustrating a moving image distribution system according to one embodiment.
Figure 28:
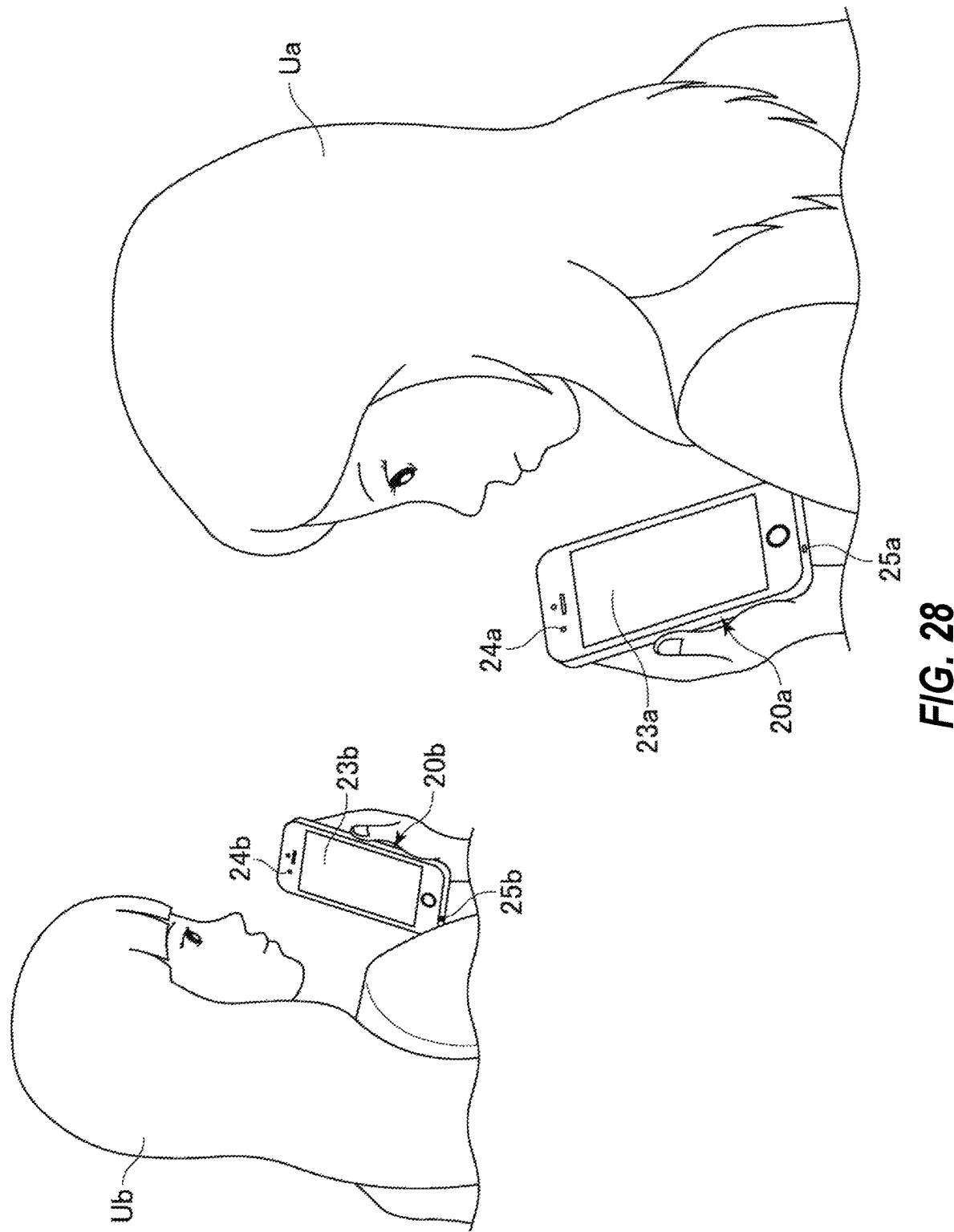
FIG. 28 is a schematic view schematically illustrating a distribution user distributing a moving image that is distributed by the moving image distribution system of FIG. 27 and a distribution user device that is used by the distribution user.
Figure 32:
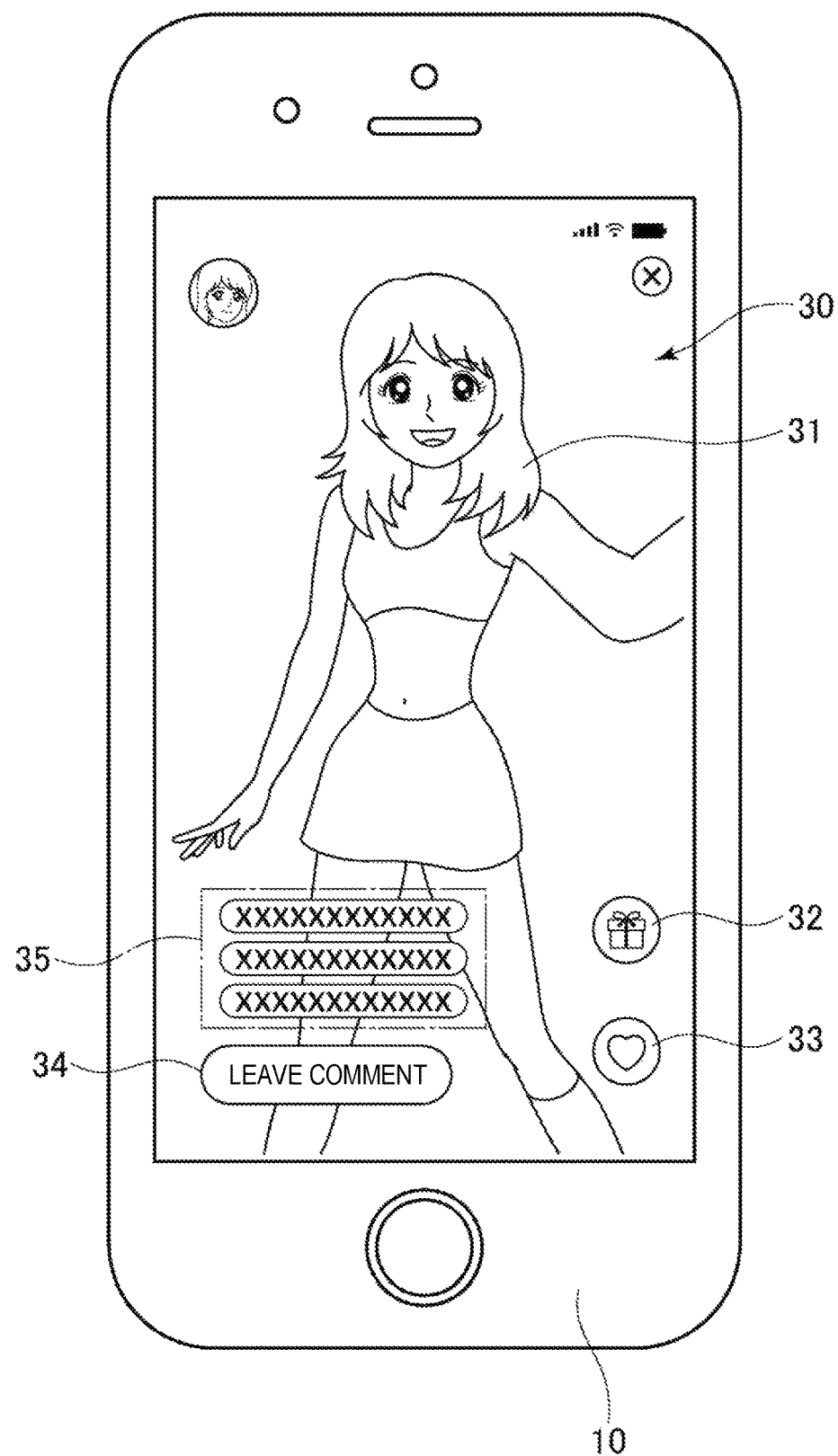
FIG. 32 is a diagram illustrating an example of a moving image that is displayed on a viewing user device in one embodiment.
Figure 33A:
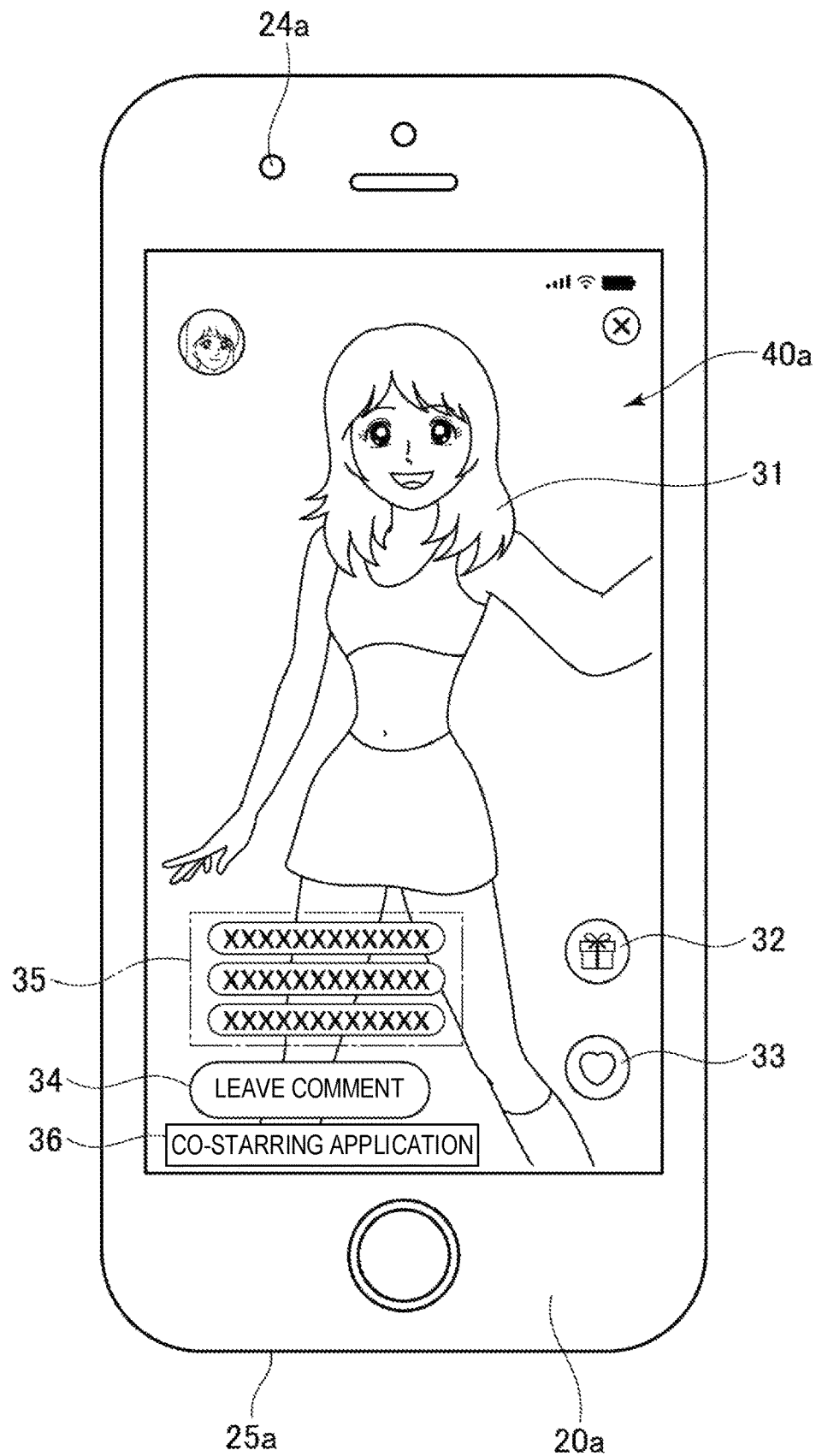
FIG. 33A is a diagram illustrating an example of a moving image that is displayed on a distribution user device in one embodiment.
Figure 33B:
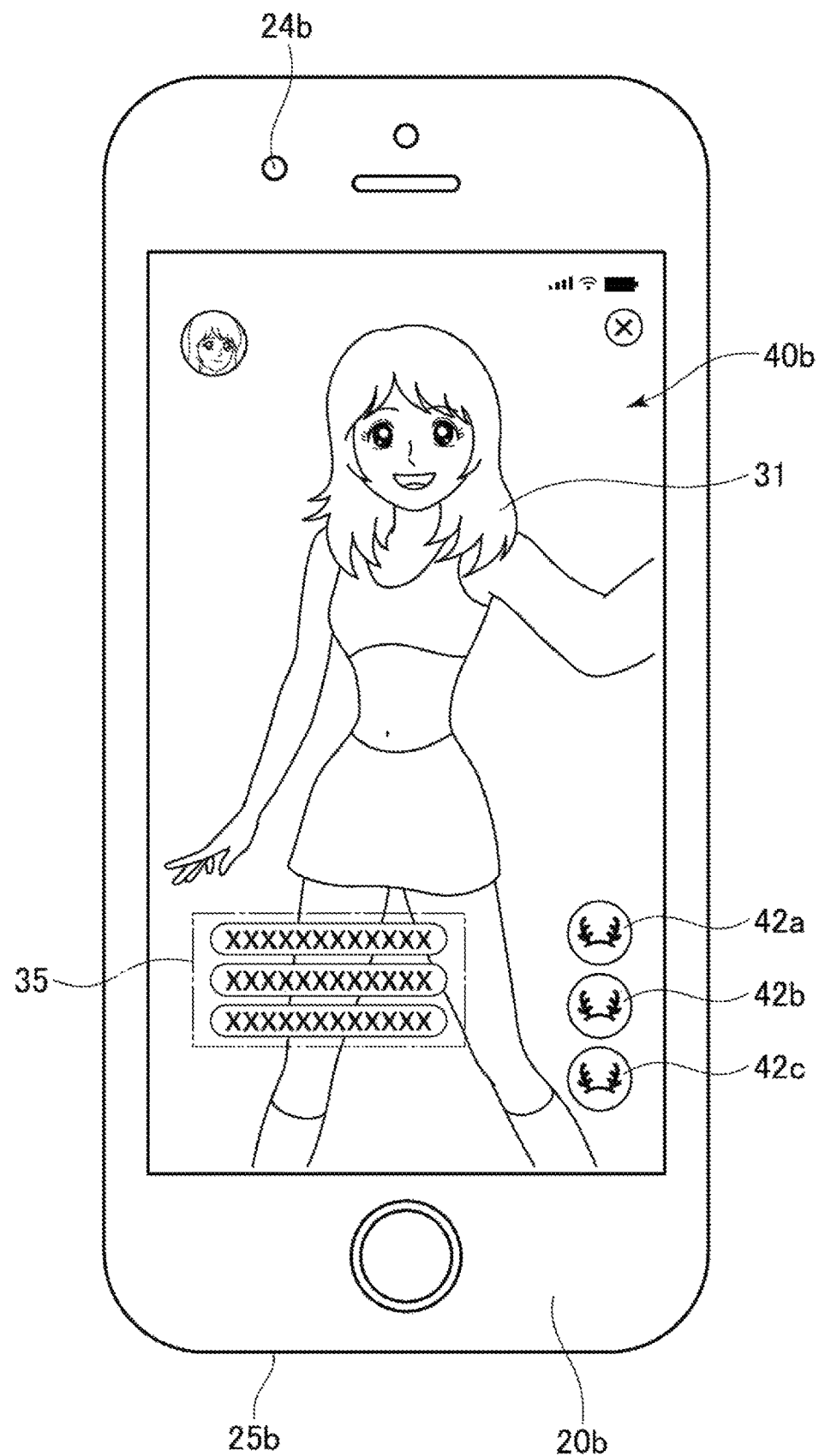
FIG. 33B is a diagram illustrating an example of a moving image that is displayed on a distribution user device in one embodiment.
Figure 34:
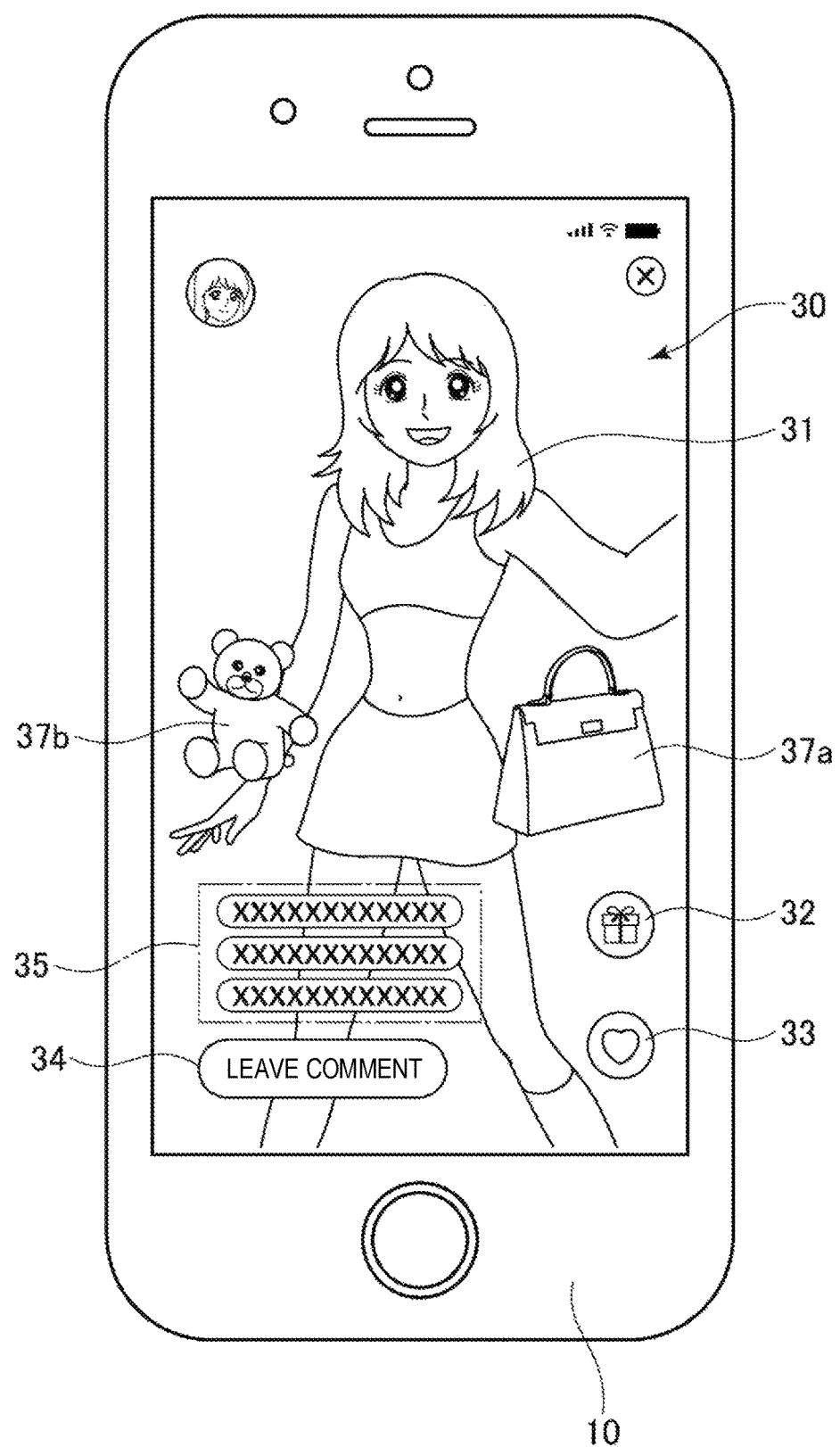
FIG. 34 is a diagram illustrating an example of the moving image that is displayed on the viewing user device in one embodiment.
Figure 35:
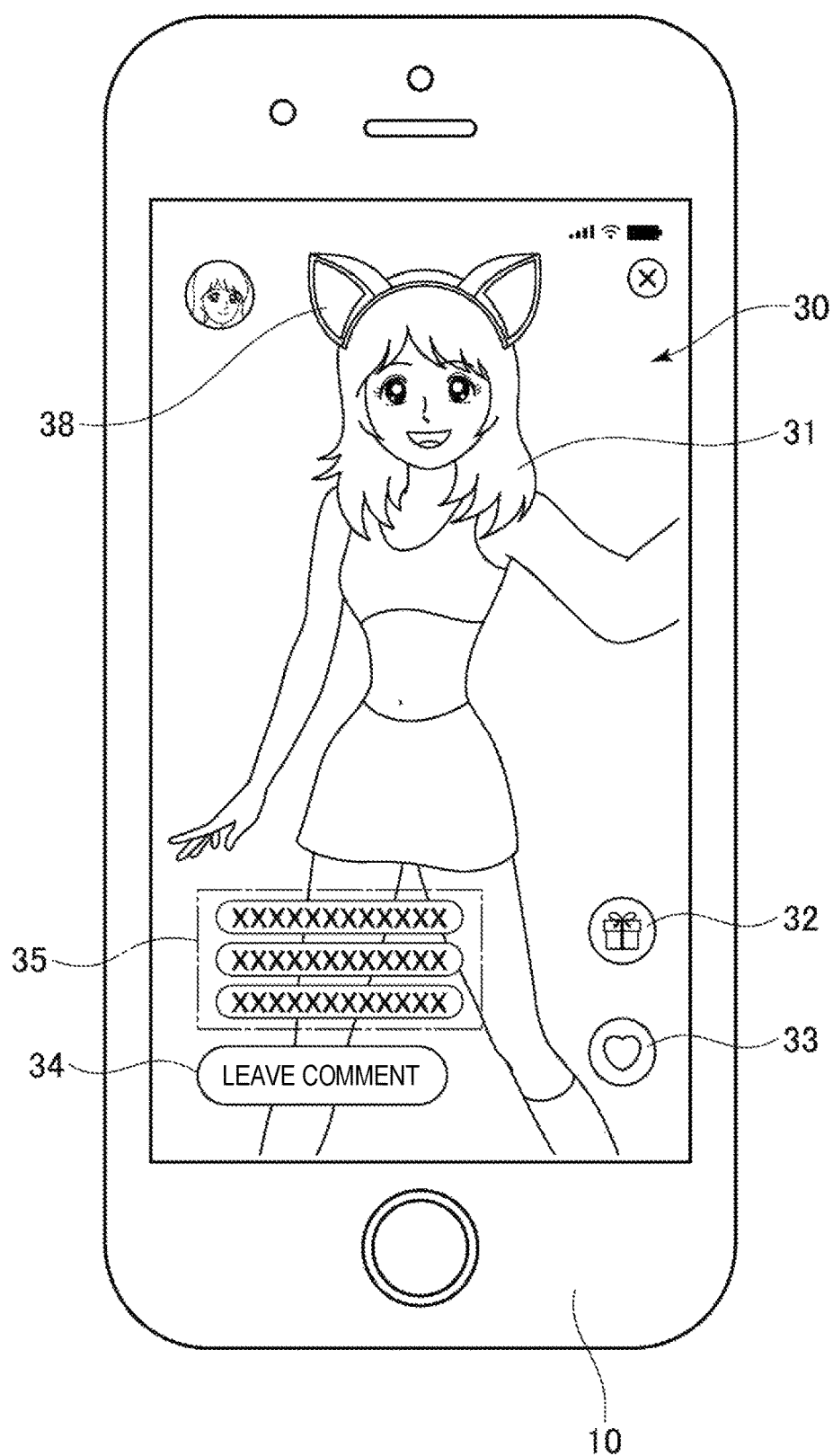
FIG. 35 is a diagram illustrating an example of the moving image that is displayed on the viewing user device in one embodiment.
Figure 36A:
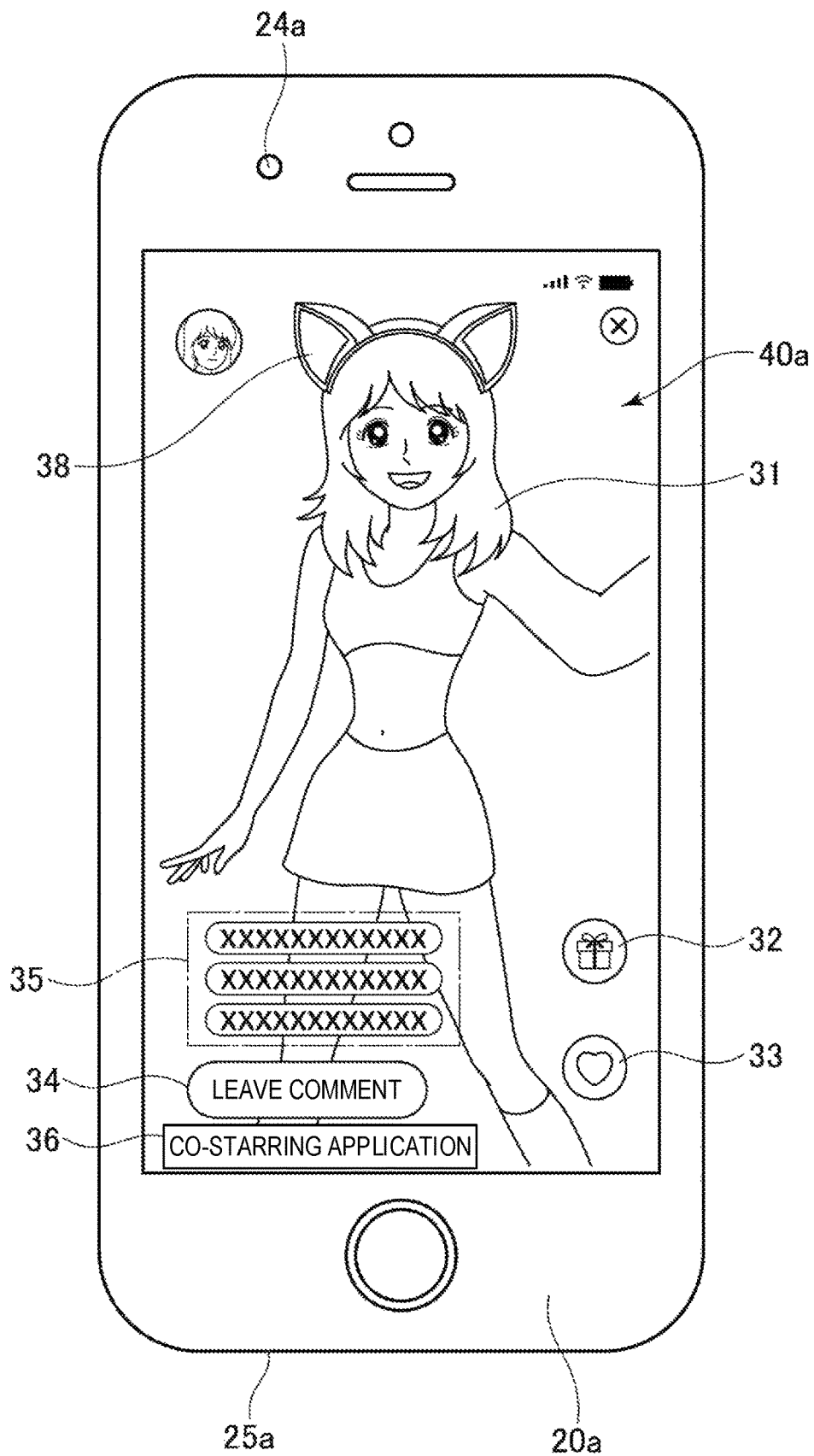
FIG. 36A is a diagram illustrating an example of the moving image that is displayed on the distribution user device in one embodiment.
Figure 36B:
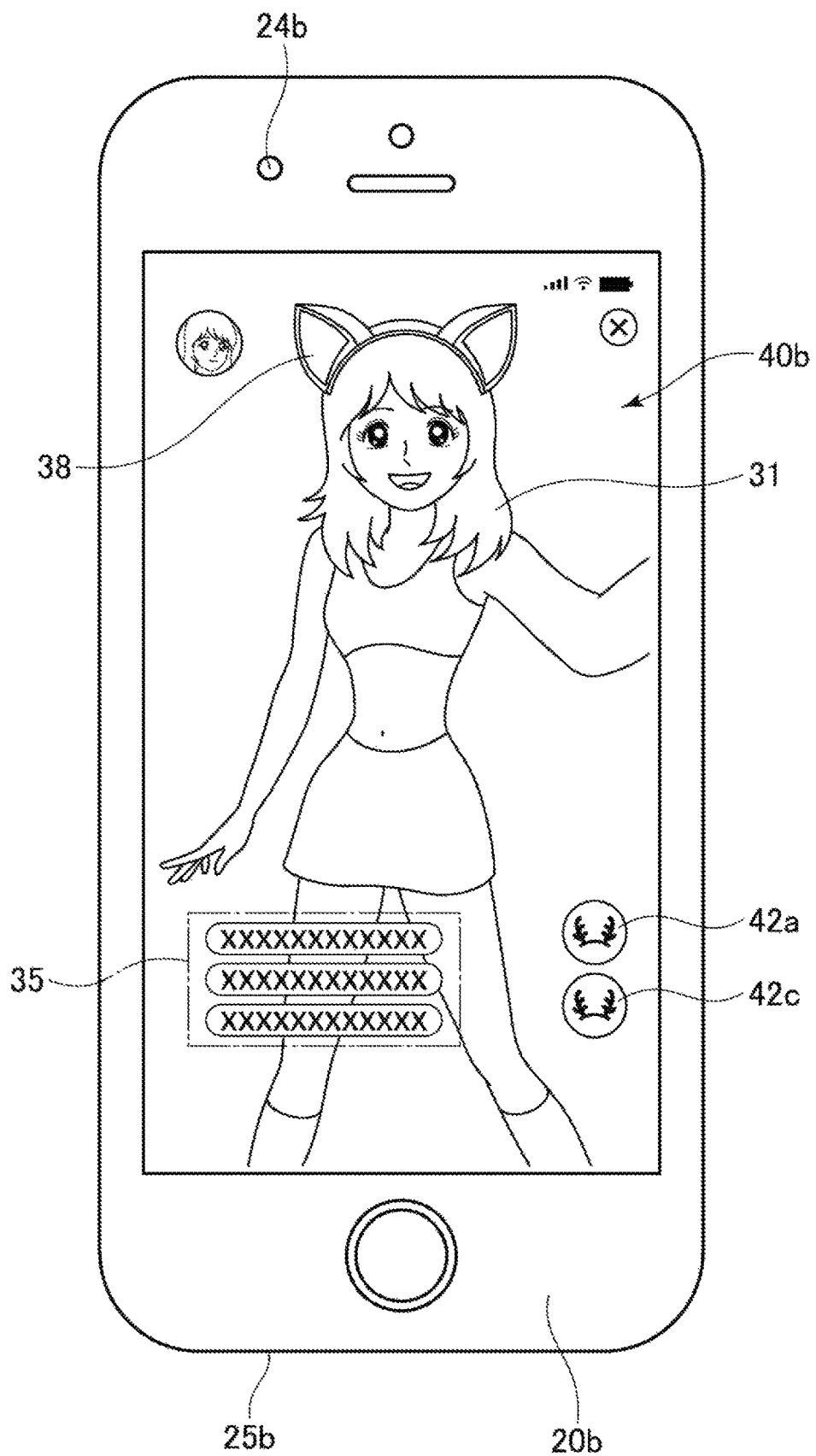
FIG. 36B is a diagram illustrating an example of the moving image that is displayed on the distribution user device in one embodiment.
Figure 37:
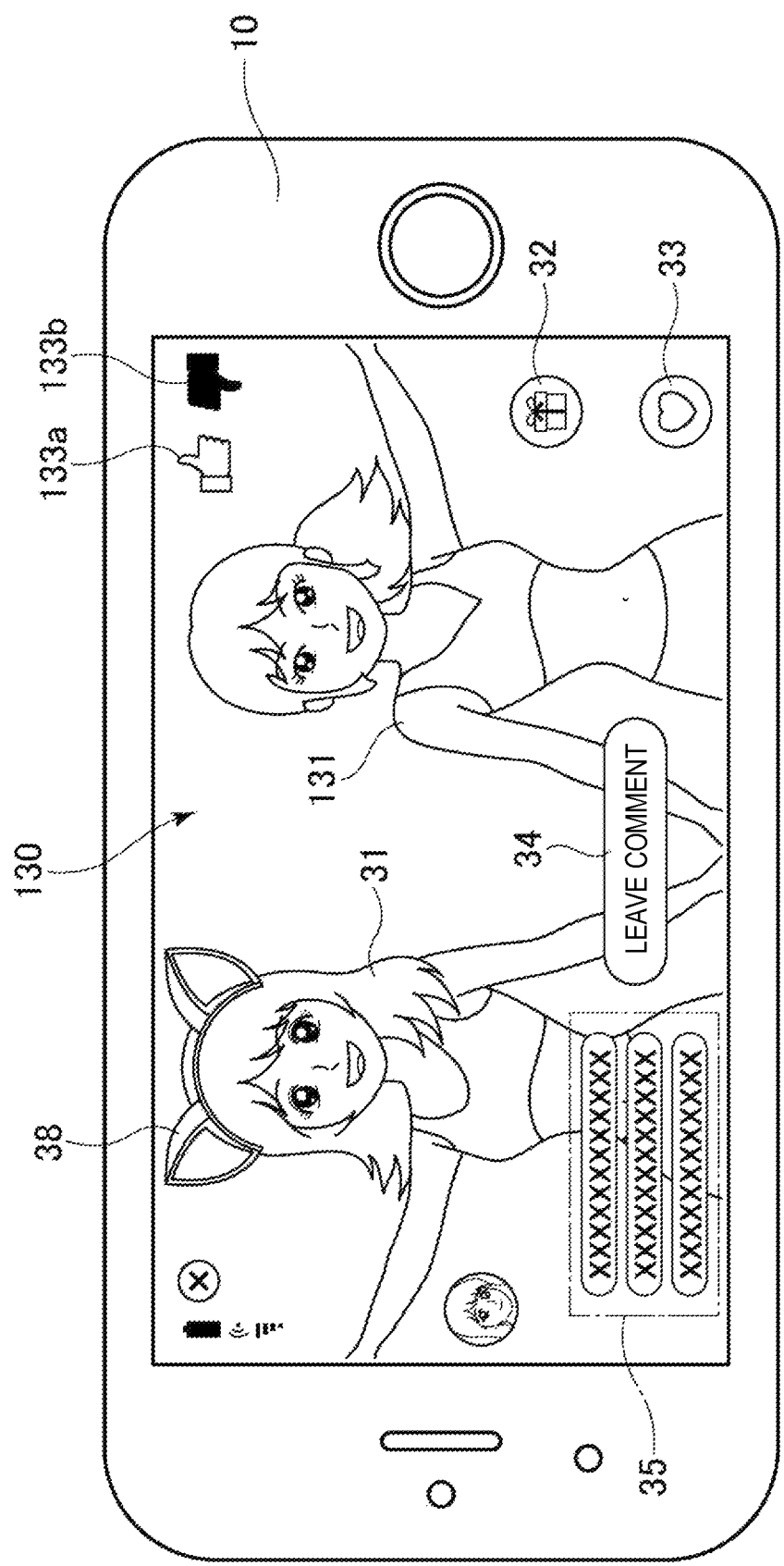
FIG. 37 is a diagram illustrating an example of a co-starring moving image that is displayed on the viewing user device in one embodiment.
Figure 38A:
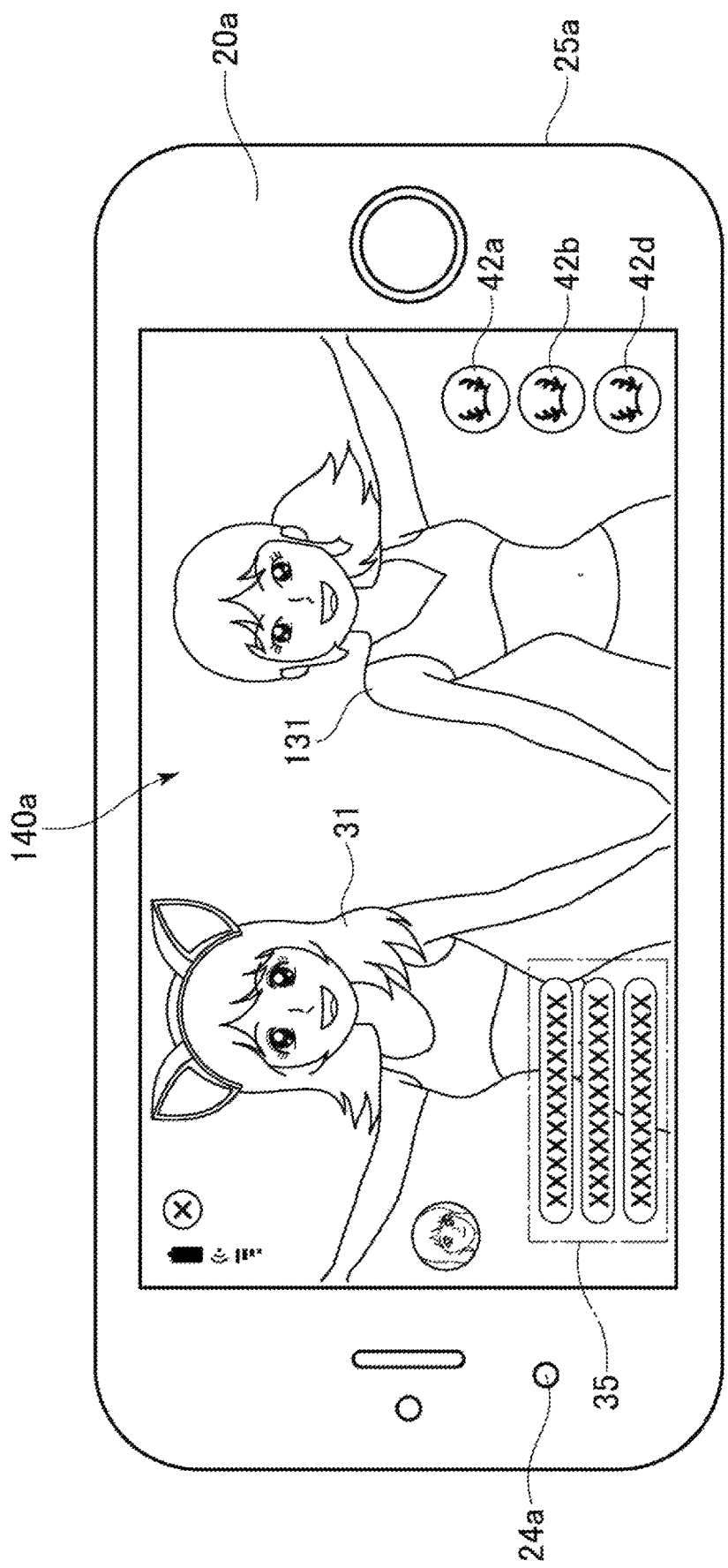
FIG. 38A is a diagram illustrating an example of a co-starring moving image that is displayed on the distribution user device in one embodiment.
Figure 38B:
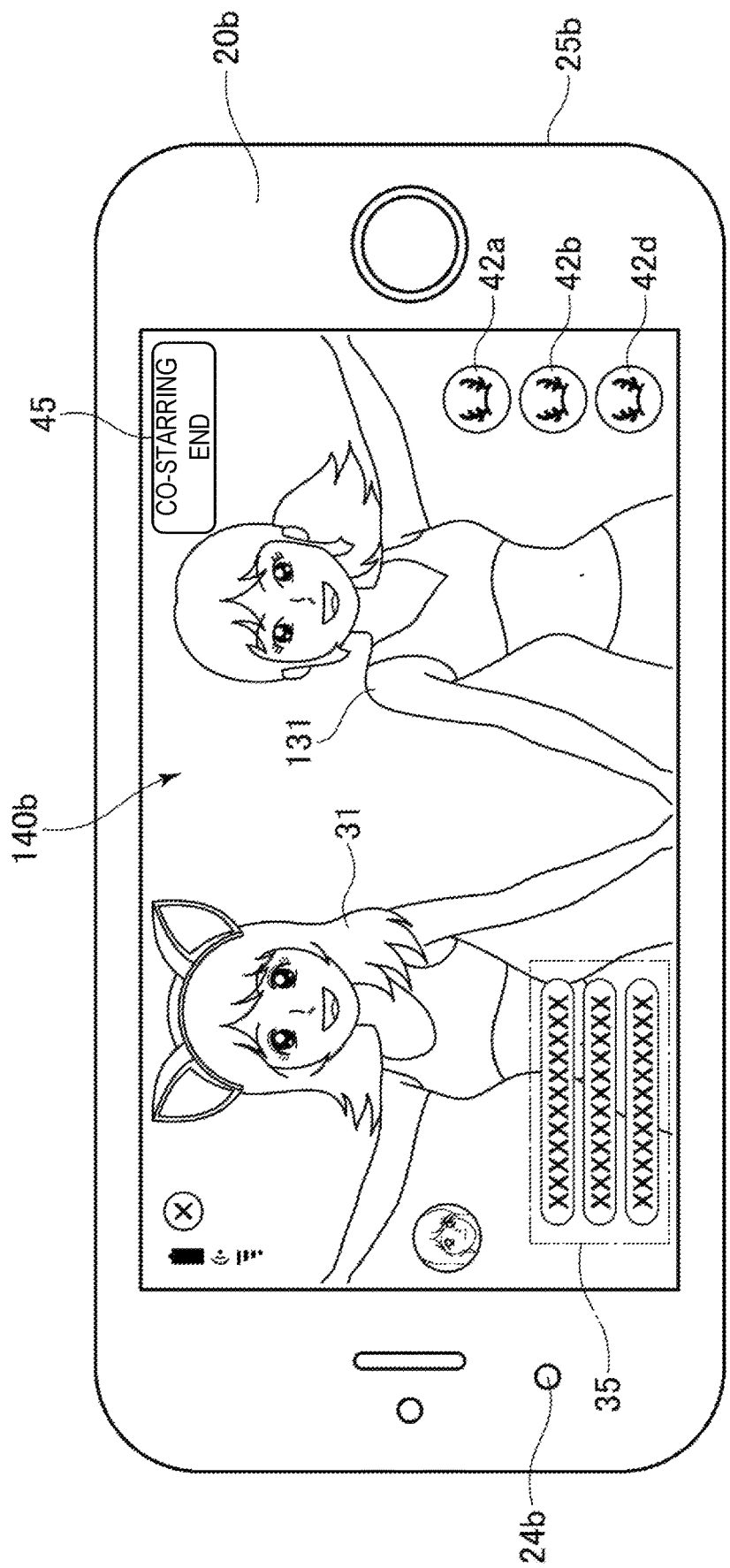
FIG. 38B is a diagram illustrating an example of a co-starring moving image that is displayed on the distribution user device in one embodiment.
Figure 39:
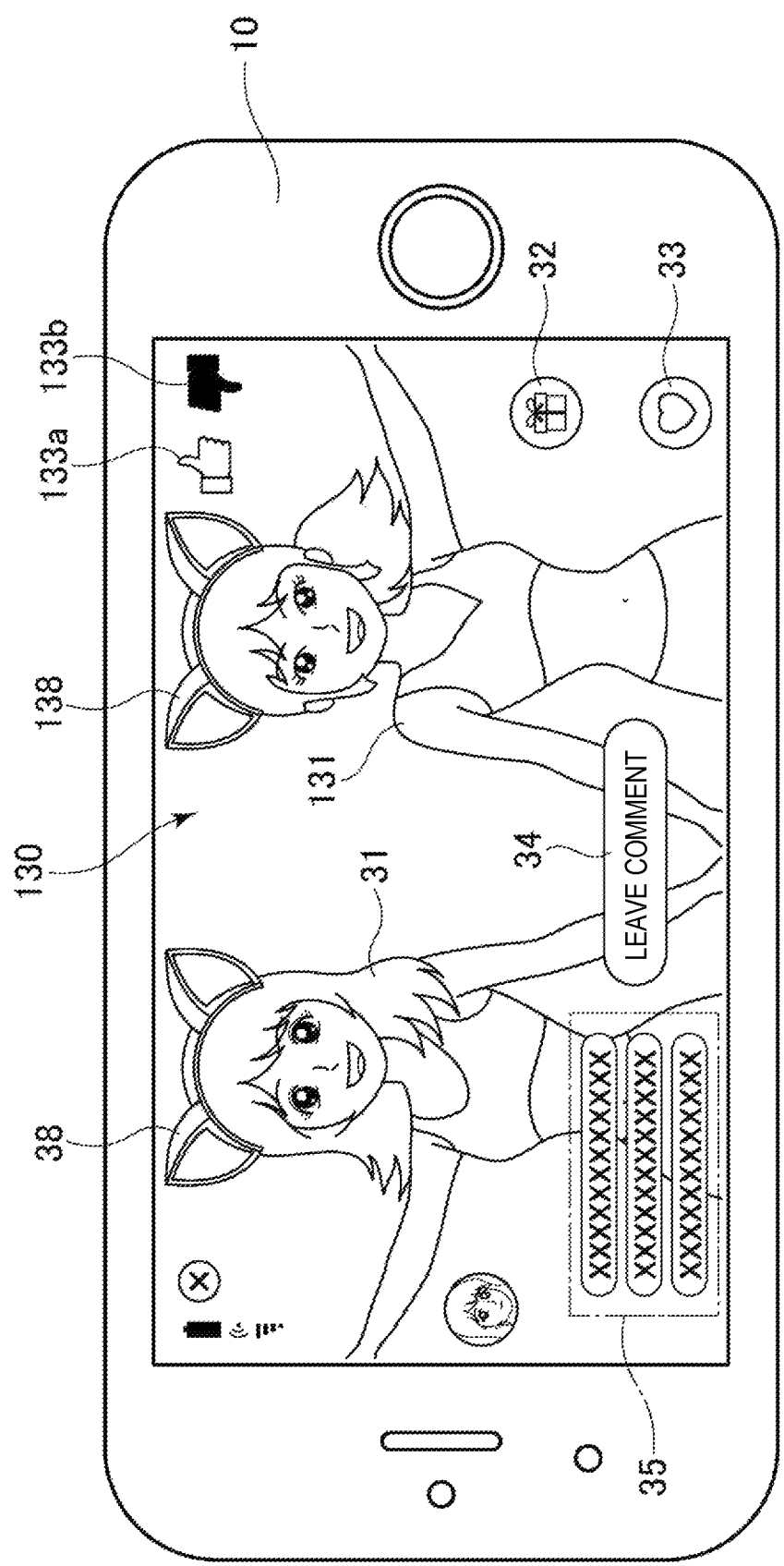
FIG. 39 is a diagram illustrating an example of the co-starring moving image that is displayed on the viewing user device in one embodiment.
Figure 40:
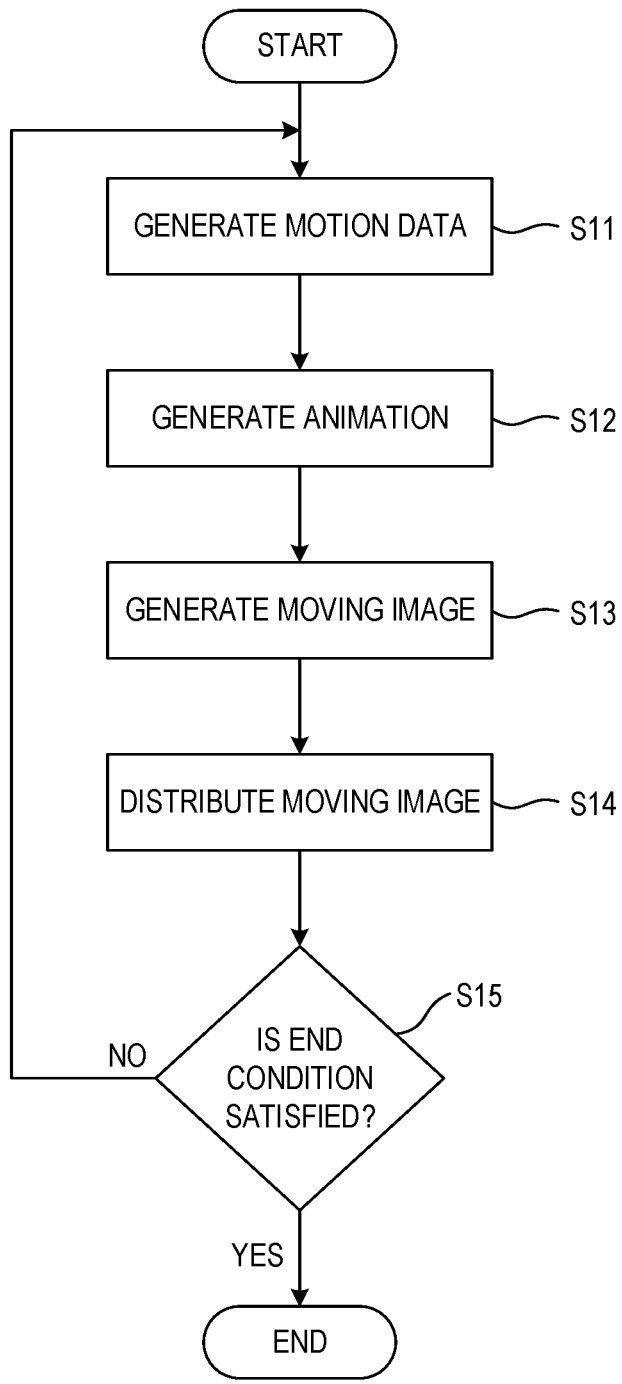
FIG. 40 is a flowchart illustrating a flow of moving image distribution processing in one embodiment.
Figure 41:
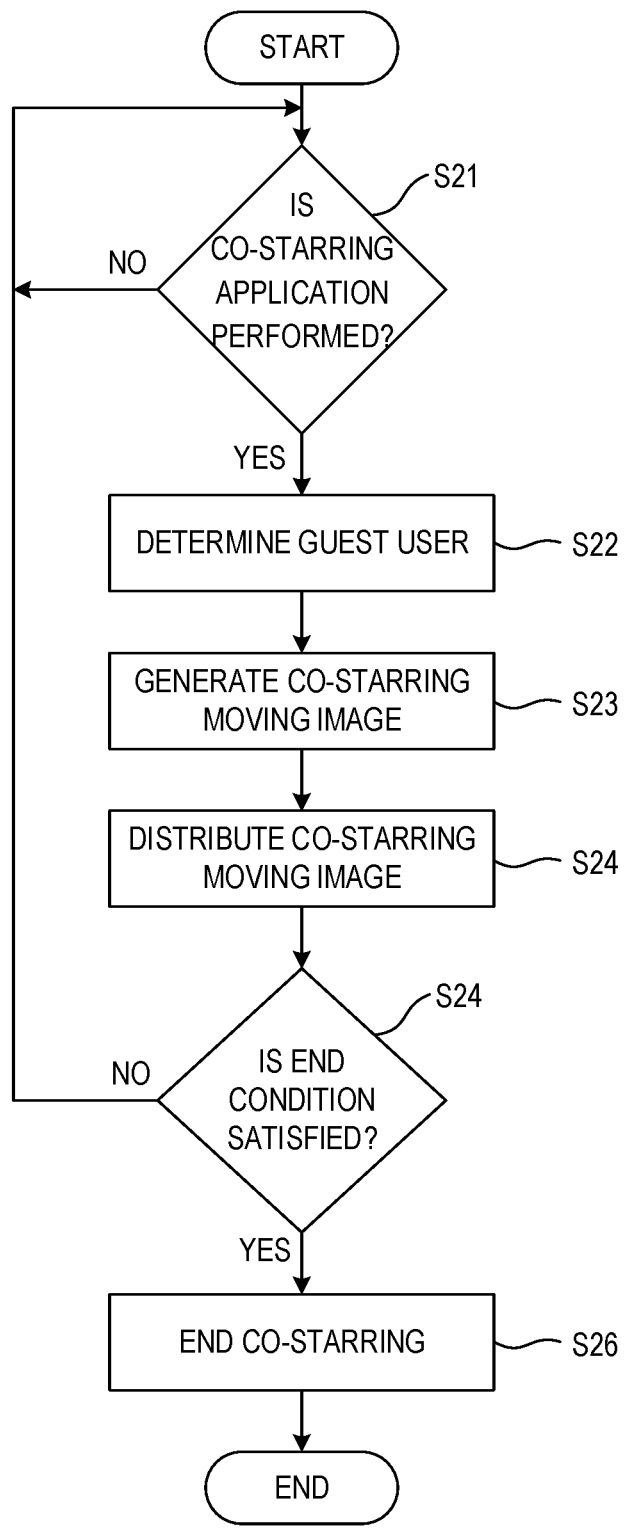
FIG. 41 is a flowchart illustrating a flow of processing for distributing a co-starring moving image in one embodiment.
Figure 42:
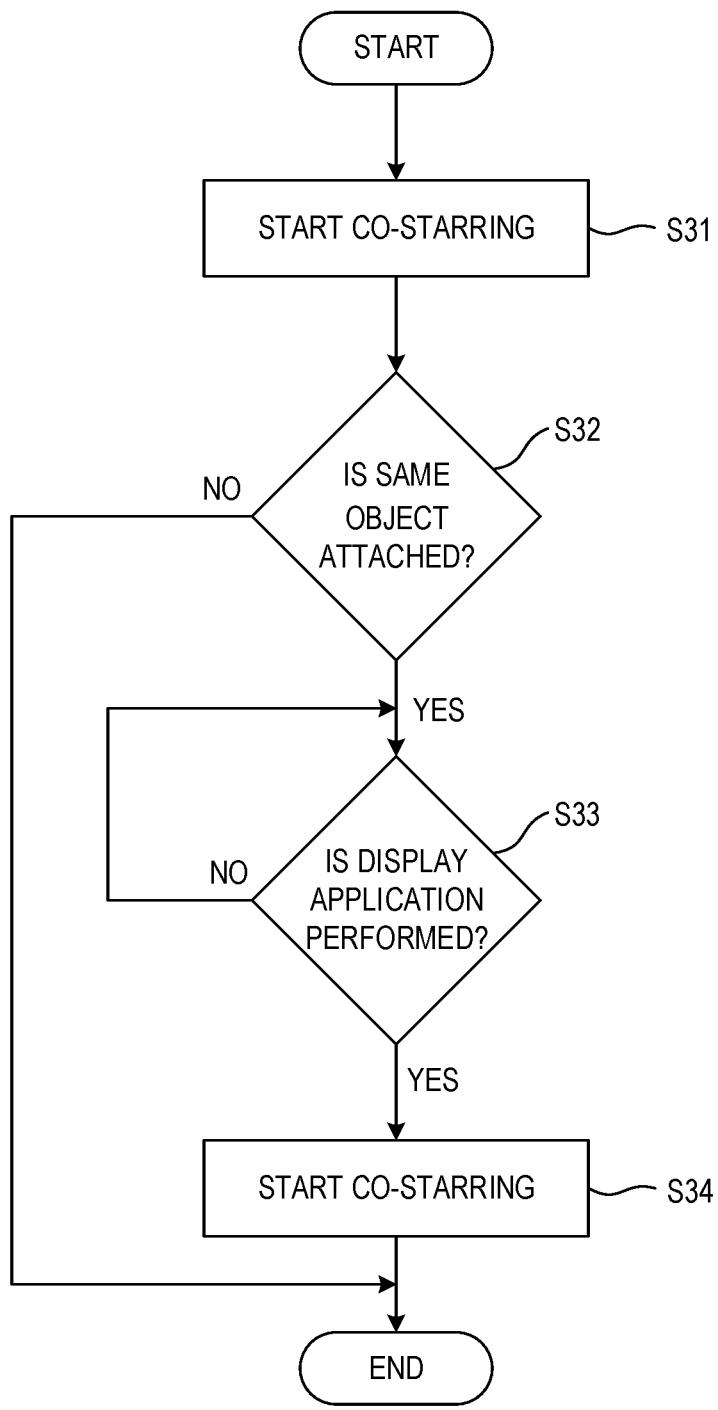
FIG. 42 is a flowchart illustrating a flow of processing for displaying a matching object in one embodiment.

In a case where the co-starring application is performed, the distribution processing of the co-starring moving image is subsequently performed. The distribution processing of the co-starring moving image in one embodiment will be described with reference to FIG. 13. FIG. 13 is a flowchart illustrating a flow of processing for distributing the co-starring moving image in one embodiment. In the distribution processing of the co-starring moving image that is described with reference to FIG. 13, it is assumed that the co-starring application is performed with respect to the distribution user Ub from the distribution user Ua viewing the moving image including the character object of the distribution user Ub. The distribution processing of the co-starring moving image is performed in parallel with the distribution processing of the moving image that is illustrated in FIG. 11.

First, in the distribution of the moving image including the character object of the distribution user Ub, in step S31, whether or not the co-starring application is performed from the user other than the distribution user Ub is determined. The co-starring application, for example, is performed from the distribution user Ua. As described above, the distribution user Ua is capable of performing the co-starring application by selecting the co-starring application button 37b that is displayed on the distribution user device 20a after the invitation is received. The co-starring application may be performed by selecting the co-starring application button 36. The co-starring application may be performed before the invitation is received, or may be performed by a user who has not received the invitation. In a case where the co-starring application is performed before the invitation is received or in a case where the co-starring application is performed by the user who has not received the invitation, the input of the co-starring password is requested, and the co-starring application may be performed only in a case where a correct co-starring password is input. In a case where the co-starring application is performed by the distribution user Ua, the processing proceeds to step S32. The co-starring application can also be performed by one or a plurality of distribution users other than the distribution user Ua.

In step S32, the guest user performing the co-starring in the moving image of the distribution user Ub is selected in the users performing the co-starring application. There may be a single guest user to be selected, or there may be a plurality of guest users to be selected. In a case where an upper limit of the number of co-stars is set, the guest user is selected until the number of co-stars reaches the upper limit.

In step S32, in a case where the distribution user Ua is selected as the guest user, the processing proceeds to step S33. In step S33, the animation of the character object 131 of the distribution user Ua is generated based on the face motion data of the distribution user Ua. Then, the co-starring moving image is generated by adding the animation of the character object 131 of the distribution user Ua to the moving image (the moving image including the character object 31 of the distribution user Ub) that is being distributed. The processing in step S33, for example, is performed by the co-starring application processing unit 61e described above.

Next, the processing proceeds to step S34. In step S34, the co-starring moving image generated in step S33 is distributed. The co-starring moving image is distributed to the viewing user device 10, the other viewing user devices, and the distribution user device through the network 50. The co-starring moving image, for example, as illustrated in FIG. 9, and FIG. 10A and FIG. 10B, includes the animation of the character object 131 of the distribution user Ua and the animation of the character object 31 of the distribution user Ub.

Next, the processing proceeds to step S35. In step S35, it is determined whether or not a co-starring end condition is satisfied. For example, in a case where the character object 131 of the distribution user Ua who is the guest user is in the non-active state, in a case where the guest user evaluation point is less than or equal to a predetermined threshold value, in a case where the co-starring end instruction is received from the distribution user Ub who is the host user, in a case where the co-starring end instruction is received from the distribution user Ua who is the guest user, in a case where a predetermined time or longer has elapsed from the start of the distribution of the co-starring moving image, or in a case where other conditions for ending the co-starring are satisfied, it is determined that the co-starring end condition is satisfied. In a case where the co-starring end condition is satisfied, the processing proceeds to step S36.

In step S36, processing for ending the distribution of the co-starring moving image is performed. For example, the character object 131 of the distribution user Ua who is the guest user is excluded from the co-starring moving image, and thus, the co-starring of the distribution user Ua and the distribution user Ub is ended. Even in a case where the co-starring is ended, the moving image may be continuously distributed. The moving image that is distributed after the co-starring is ended does not include the character object 131 of the distribution user Ua. The processing for determining the co-starring end condition and the processing for ending the co-starring, for example, are performed by the co-starring end processing unit 61f.

Subsequently, an example of a function effect of the embodiment described above will be described. According to one embodiment described above, the other distribution user (for example, the distribution user Ua) receiving the invitation from the distribution user Ub is capable of determining whether or not to perform the co-starring application with respect to the distribution user Ub, based on the host user information of the distribution user Ub that is associated with the invitation. Therefore, the user who has received the invitation is capable of determining whether or not to perform the co-starring application after understanding the distribution user Ub to be the host user. In a case where the processing of the co-starring application is performed based on the invitation, the viewing user receives a plurality of invitations from unknown distribution users, and thus, there is a possibility that it is difficult for the viewing user to determine which distribution user the co-starring is performed with. As described above, there is a concern that only using the invitation hinders the use of the co-starring function. In the embodiment described above, the host user information of the distribution user is presented to the other distribution user in association with the invitation from the distribution user, and thus, the user receiving the invitation is capable of selecting which distribution user the co-starring is performed with, based on the host user information of the distribution user.

According to one embodiment described above, in a case where the distribution user Ub wants to perform the co-starring with the other user in the moving image that is distributed by the distribution user Ub, it is possible to accelerate the co-starring application from the other distribution user by transmitting the invitation including the user's own host user information.

According to one embodiment described above, it is possible to receive the co-starring application only from the invited user receiving the invitation. For example, the co-starring application buttons 36 and 37b are displayed only on the distribution user device receiving the invitation. Accordingly, the co-starring application from the viewing user not receiving the invitation is not received, and thus, it is possible to reduce the processing load of the co-starring application. In particular, a popular distribution user is capable of preventing the reception of an excessive number of co-starring applications by adjusting the number of invited users to which the invitation is transmitted.

According to one embodiment described above, the host user information includes the viewership information of the viewers viewing the moving image the distribution user (for example, the distribution user Ub) transmitting the invitation. Accordingly, the user (for example, the distribution user Ua) receiving the invitation is capable of determining whether or not to apply the co-starring with the distribution user Ub, on the basis the number of viewing users of the moving image that is distributed by the distribution user Ub.

According to one embodiment described above, the host user information includes the viewership information of the viewers viewing the moving image the distribution user (for example, the distribution user Ub) transmitting the invitation. Accordingly, the user (for example, the distribution user Ua) receiving the invitation is capable of determining whether or not to apply the co-starring with the distribution user Ub, on the basis the number of viewing users of the moving image that is distributed by the distribution user Ub.

According to one embodiment described above, the host user information includes the user evaluation information of the distribution user (for example, the distribution user Ub) who has transmitted the invitation. Accordingly, the user (for example, the distribution user Ua) receiving the invitation is capable of determining whether or not to apply the co-starring with the distribution user Ub, based on the evaluation of the distribution user Ub. According to one embodiment described above, the host user information includes the moving image evaluation information of the distribution user (for example, the distribution user Ub) who has transmitted the invitation. Accordingly, the user (for example, the distribution user Ua) receiving the invitation is capable of determining whether or not to apply the co-starring with the distribution user Ub, based on the evaluation with respect to the moving image distributed by the distribution user Ub.

According to one embodiment described above, the host user information includes the host user evaluation information. The host user evaluation information reflects the positive or negative feedback from the viewing user with respect to the action as the host user in the co-starring moving image. The distribution user who has received the invitation is capable of performing the co-starring with an excellent host user by performing the co-starring application when the host user evaluation information of the distribution user who has transmitted the invitation is a high value (that is, in a case where the distribution user obtains high evaluation as the host user).

In the moving image distribution system 1 according to the embodiment described above, the distribution users Ua and Ub are capable of distributing the moving image including the character object moving in accordance with the user's own neutral expression by the distribution user device 20 provided with a camera, such as a smart phone. In this way, in the moving image distribution system 1, a facility for the distribution users Ua and Ub to distribute the moving image is simplified, and thus, a platform in which the distribution users Ua and Ub easily participate is attained.

In the processing procedure described in this specification, in particular, the processing procedure described by using the flowchart, it is possible to omit a part of the steps configuring the processing procedure, to add a step that is not clearly specified as the steps configuring the processing procedure, or to replace the order of the steps, and the processing procedure subjected to such omission, addition, and order change is also included in the scope of the present disclosure, unless departing from the spirit of the present disclosure.

At least a part of the functions to be attained by the computer processor 61 may be attained by a computer processor other than the computer processor 61 of the moving image distribution system 1. At least a part of the functions to be attained by the computer processor 61, for example, may be attained by the computer processor 21 of the distribution user device 20, or may be attained by the computer processor of the viewing user device 10. Specifically, a part or all of the functions the animation generation unit 61a and the moving image generation unit 61b may be executed in the distribution user device 20. For example, the moving image generated in the distribution user device 20 may be transmitted to the server device 60, and may be distributed to the viewing user device 10 from the server device 60.

In a case where the co-starring application with the distribution user Ub is performed from the distribution user Ua viewing the moving image including the character object 31 of the distribution user Ub, the animation of the character object 131 of the distribution user Ua performing the co-starring application may be generated by any of the server device 60, distribution user device 20a of the distribution user Ua, the distribution user device 20b of the distribution user Ub, and the viewing user device 10. In addition, the co-starring moving image including the character object 131 of the distribution user Ua, and the distribution moving image and the character object 31 of the distribution user Ub, which are generated, may be generated by any of the server device 60, distribution user device 20a of the distribution user Ua, the distribution user device 20b of the distribution user Ub, and the viewing user device 10. The co-starring moving image may be generated by being divided in the server device 60, the distribution user device 20a, the distribution user device 20b, the viewing user device 10, and other devices. In one example, in a case where the animation of the character object 131 of the distribution user Ua is generated by the distribution user device 20b of the distribution user Ub, the face motion data and the sound data of the distribution user Ua are transmitted to the distribution user device 20b of the distribution user Ub from the distribution user device 20a of the distribution user Ua. In a case where the gift object is included in the co-starring moving image, data for displaying the gift object may be transmitted to the distribution user device 20b from the distribution user device 20a or the server device 60. In the distribution user device 20b, the animation of the character object 131 is generated by applying the face motion data and the sound data of the distribution user Ua that are received from the distribution user device 20a to the model data for the distribution user Ua. The model data for the distribution user Ua may be transmitted to the distribution user device 20a from the server device 60. In another example, in a case where the animation of the character object 131 of the distribution user Ua is generated by the viewing user device 10, the face motion data and the sound data of the distribution user Ua are transmitted to the viewing user device 10 from the distribution user device 20a of the distribution user Ua, and the face motion data and the sound data of the distribution user Ub are transmitted to the viewing user device 10 from the distribution user device 20b of the distribution user Ub. In the viewing user device 10, the animation of the character object 131 may be generated by applying the face motion data and the sound data of the distribution user Ua that are received from the distribution user device 20a to the model data for the distribution user Ua, and the animation of the character object 31 may be generated by applying the face motion data and the sound data of the distribution user Ub that are received from the distribution user device 20b to the model data for the distribution user Ub. The model data for the distribution user Ua and the model data for the distribution user Ub may be transmitted to the viewing user device 10 from the server device 60. In a case where the gift object is included in the co-starring moving image, data for displaying the gift object may be transmitted to the viewing user device 10 from the distribution user device 20a, the distribution user device 20b, or the server device 60. As described above, the co-starring moving image including the animation of the character object of the distribution user or the animation of the character object can be generated by an arbitrary device included in the moving image distribution system 1. The animation of the character object may be generated by a device that is not clearly specified in FIG. 1. The face motion data and the sound data of the distribution user Ua are transmitted to the device generating the animation of the character object from the distribution user device 20*a* of the distribution user Ua, and the face motion data and the sound data of the distribution user Ub are transmitted to the device from the distribution user device 20*b* of the distribution user Ub. The body motion may be transmitted in addition to the face motion.

The co-starring moving image may include the character objects of three or more distribution users. That is, three or more distribution users may virtually perform the co-starring in the moving image by using each of the character objects. An upper limit may be set in the number of distribution users capable of performing the co-starring. In a case where the number of distribution users capable of performing the co-starring reaches the upper limit, processing for not displaying the co-starring application button 36 in the image (for example, the image 40*a*) of the moving image that is viewed by the distribution user or processing for disabling the selection of the co-starring application button 36 in the image of the moving image that is viewed by the distribution user (disable processing) may be performed.

What is claimed is:

1. A moving image distribution system, comprising:
   a computer processor configured to
      distribute a moving image including an animation of a character object that is generated based on a motion of a first user and a co-starring application button for the first user, the first user being a distributor,
      cause the moving image to be displayed to a second user with one or more display instruction buttons,
      display to the first user a co-starring setting window for setting an invitation request, the co-starring setting window including a switch and a password setting region,
      transmit and display an invitation for co-starring associated with host user information relevant to the first user to the second user after the moving image is distributed, wherein the host user information comprises an index indicating a profile of the first user, the invitation including buttons for the second user to determine whether to perform the co-starring based on the index indicating the profile of the first user,
      after receiving the invitation by the first user, transmit a co-starring request to perform co-starring from the second user,
      generate, in response to receiving the co-starring request from the second user, a co-starring moving image in which the first user and the second user perform co-starring on a background of a virtual space that configures the co-starring moving image, wherein the generation of the co-starring moving image comprises generating a background image indicating the background and superimposing the character object on the background image, and
      distribute the co-starring moving image to a viewing user, by executing a computer-readable command,
      display the co-starring moving image with the one or more display instruction buttons to the first user and the second user,
      wherein a co-starring moving image information of the co-starring moving image comprises a co-starring time information indicating an elapse time from the start of the co-starring of the co-starring moving image, wherein the host user information is generated based on the co-starring time information.

2. The moving image distribution system according to claim 1,
   wherein the co-starring request is received only from an invited user who has received the invitation, and the invited user includes the second user.

3. The moving image distribution system according to claim 1,
   wherein the host user information includes user evaluation information indicating evaluation with respect to the first user.

4. The moving image distribution system according to claim 1,
   wherein the host user information includes viewership information indicating a number of viewing users of the moving image.

5. The moving image distribution system according to claim 4, wherein the host user information may be a score calculated by a predetermined algorithm based in part on the viewership information, wherein the index further comprises the score.

6. The moving image distribution system according to claim 1,
   wherein the host user information includes host user evaluation information indicating evaluation with respect to the first user in the co-starring moving image.

7. The moving image distribution system according to claim 1,
   wherein the host user information includes moving image evaluation information indicating evaluation with respect to the moving image.

8. The moving image distribution system according to claim 1,
   wherein the invitation includes first benefit information indicating a first benefit that is offered to the second user when the second user performs the co-starring.

9. The moving image distribution system according to claim 8,
   wherein the invitation includes second benefit information indicating a second benefit that is offered to the second user when the co-starring moving image in which the second user and the first user perform the co-starring is generated.

10. The moving image distribution system according to claim 9,
    wherein at least one of the first benefit and the second benefit is changed in accordance with evaluation with respect to the co-starring moving image.

11. The moving image distribution system according to claim 9,
    wherein at least one of the first benefit and the second benefit is changed in accordance with evaluation of the second user during distribution of the co-starring moving image.

12. The moving image distribution system according to claim 9,
    wherein at least one of the first benefit and the second benefit is an object capable of being used in the co-starring moving image by the second user.

13. The moving image distribution system according to claim 1,
    wherein the co-starring moving image includes a character co-starring moving image including a first character object that is generated based on the motion of the first user and a second character object that is generated based on a motion of the second user.

14. The moving image distribution system according to claim 13, wherein the co-starring moving image includes a sound co-starring moving image including the first character object that is generated based on the motion of the first user and a sound of the second user.

15. The moving image distribution system according to claim 14,
wherein the co-starring moving image is the character co-starring moving image including the first character object that is generated based on the motion of the first user and the second character object that is generated based on the motion of the second user or the sound co-starring moving image including the first character object that is generated based on the motion of the first user and the sound of the second user, and
the character co-starring moving image and the sound co-starring moving image are capable of being alternately switched.

16. The moving image distribution system according to claim 1,
wherein the second user is one of a plurality of viewing users.

17. The moving image distribution system according to claim 1, wherein the invitation is transmitted by the first user to the second user separately from the distribution of the moving image by the first user.

18. The moving image distribution system according to claim 1, wherein the index further indicates the attractivity of the first user to the second user.

19. A moving image distribution system, comprising:
a computer processor configured to
distribute a moving image including an animation of a character object that is generated based on a motion of a first user and a co-starring application button for the first user, the first user being a distributor,
cause the moving image to be displayed to a second user with one or more display instruction buttons,
display to the first user a co-starring setting window for setting an invitation request, the co-starring setting window including a switch and a password setting region,
transmit and display an invitation for co-starring from the first user to a viewing user viewing the moving image after the moving image is distributed, wherein the invitation comprises an index indicating a profile of the first user, the invitation including buttons for the viewing user to determine whether to perform the co-starring based on the index indicating the profile of the first user,
after the invitation is received by an invited user, receive a co-starring request only from the invited user,
generate, in response to receiving the co-starring request, a co-starring moving image in which the first user and a second user perform co-starring in accordance on a background of a virtual space that configures the co-starring moving image, wherein the generation of the co-starring moving image comprises generating a background image indicating the background and superimposing the character object on the background image, the invited user including the second user, and
distribute the co-starring moving image to the viewing user, by executing a computer-readable command,
display the co-starring moving image with the one or more display instruction buttons to the first user and the second user, wherein a co-starring moving image information of the co-starring moving image comprises a co-starring time information indicating an elapse time from the start of the co-starring of the co-starring moving image, wherein the host user information is generated based on the co-starring time information.

20. The moving image distribution system according to claim 19, wherein
the computer processor includes a plurality of computer processors,
the viewing user includes a plurality of viewing users, and
the invited user includes a plurality of invited users.

21. The moving image distribution system according to claim 19, wherein the invitation is transmitted by the first user to the viewing user separately from the distribution of the moving image by the first user.

22. A moving image distribution method to be executed by allowing a computer processor to execute a computer-readable command, the method comprising:
distributing a moving image including an animation of a character object that is generated based on a motion of a first user and a co-starring application button for the first user, the first user being a distributor;
causing the moving image to be displayed to a second user with one or more display instruction buttons;
displaying to the first user a co-starring setting window for setting an invitation request, the co-starring setting window including a switch and a password setting region;
transmitting and displaying an invitation for co-starring associated with host user information relevant to the first user to the second user after the moving image is distributed, wherein the host user information comprises an index indicating a profile of the first user, the invitation including buttons for the second user to determine whether to perform the co-starring based on the index indicating the profile of the first user;
after receiving the invitation by the first user, transmitting a co-starring request to perform co-starring from the second user;
generating, in response to receiving the co-starring request from the second user, a co-starring moving image in which the first user and the second user perform co-starring on a background of a virtual space that configures the co-starring moving image, wherein the generation of the co-starring moving image comprises generating a background image indicating the background and superimposing the character object on the background image; and
distributing the co-starring moving image to a viewing user,
displaying the co-starring moving image with the one or more display instruction buttons to the first user and the second user,
wherein a co-starring moving image information of the co-starring moving image comprises a co-starring time information indicating an elapse time from the start of the co-starring of the co-starring moving image, wherein the host user information is generated based on the co-starring time information.

23. The moving image distribution method according to claim 22, wherein the invitation is transmitted by the first user to the second user separately from the distribution of the moving image by the first user.

24. A non-transitory computer readable medium storing a moving image distribution program for allowing a computer processor to execute a method comprising:

distributing a moving image including an animation of a character object that is generated based on a motion of a first user and a co-starring application button for the first user, the first user being a distributor;

causing the moving image to be displayed to a second user with one or more display instruction buttons;

displaying to the first user a co-starring setting window for setting an invitation request, the co-starring setting window including a switch and a password setting region;

transmitting and displaying an invitation for co-starring associated with host user information relevant to the first user to the second user after the moving image is distributed, wherein the host user information comprises an index indicating a profile of the first user, the invitation including buttons for the second user to determine whether to perform the co-starring based on the index indicating the profile of the first user;

after receiving the invitation by the first user, transmitting a co-starring request to perform co-starring from the second user;

generating, in response to receiving the co-starring request from the second user, a co-starring moving image in which the first user and the second user perform co-starring on a background of a virtual space that configures the co-starring moving image, wherein the generation of the co-starring moving image comprises generating a background image indicating the background and superimposing the character object on the background image; and distributing the co-starring moving image to a viewing user, displaying the co-starring moving image with the one or more display instruction buttons to the first user and the second user, wherein a co-starring moving image information of the co-starring moving image comprises a co-starring time information indicating an elapse time from the start of the co-starring of the co-starring moving image, wherein the host user information is generated based on the co-starring time information.

25. The non-transitory computer readable medium storing a moving image distribution program according to claim 24, wherein the invitation is transmitted by the first user to the second user separately from the distribution of the moving image by the first user.

\* \* \* \* \*